US007437664B2

(12) United States Patent
Borson

(10) Patent No.: US 7,437,664 B2
(45) Date of Patent: Oct. 14, 2008

(54) COMPARING HIERARCHICALLY-STRUCTURED DOCUMENTS

(75) Inventor: Niklas Borson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 10/174,210

(22) Filed: Jun. 18, 2002

(65) Prior Publication Data
US 2003/0237047 A1 Dec. 25, 2003

(51) Int. Cl.
*G06F 15/00* (2006.01)
(52) U.S. Cl. ..................... 715/234; 715/209
(58) Field of Classification Search .............. 715/513, 715/514, 209, 234
See application file for complete search history.

(56) References Cited

U.S. PATENT DOCUMENTS

| 6,237,006 | B1 * | 5/2001 | Weinberg et al. ........ 707/103 R |
| 6,714,939 | B2 * | 3/2004 | Saldanha et al. ............ 707/102 |
| 6,732,102 | B1 * | 5/2004 | Khandekar .................. 707/10 |
| 6,848,078 | B1 * | 1/2005 | Birsan et al. ................. 715/511 |
| 7,096,421 | B2 * | 8/2006 | Lou ............................. 715/513 |
| 2003/0084424 | A1 * | 5/2003 | Reddy et al. ................. 717/105 |
| 2004/0250211 | A1 * | 12/2004 | Wakita et al. ............... 715/723 |
| 2005/0144598 | A1 * | 6/2005 | Sabadell et al. ............. 717/137 |
| 2006/0159272 | A1 * | 7/2006 | Ishiguro et al. ............. 380/280 |

OTHER PUBLICATIONS

Sleator, Daniel and Robert Tarjan, "A data structure for dynamic trees", Annual ACM Symposium of Theory of Computing, ACM Press, 1981,pp. 114-122.*
Chakrabarti, K and S. Mehrotra, "The Hybrid Tree: an index structure for high dimensional featurespaces", Mar. 23-26, 2999, pp. 440-447.*
Zhang et al., "Simple Fast Algorithms for the Editing Distance Between Trees and Related Problems" 1989 Society for Industrial and Applied Mathematics, vol. 18, No. 6, pp. 1245-1262, Dec. 1989.

* cited by examiner

*Primary Examiner*—Rachna Desai
(74) *Attorney, Agent, or Firm*—Workman Nydegger

(57) ABSTRACT

Described is a method and system for comparing two XML documents, usually represented as two logical dependency trees, and providing their differences as a set of tree operations. The set of tree operations may be used to transform one tree to the other. A first phase constructs an XML tree of nodes for each file, and a second, link tree construction phase builds a tree of link objects that relate nodes in the left tree to nodes in the right tree. Construction of the link tree generally operates by mapping equal subtrees in the left and right trees to each other, linking mapped subtrees to each other, removing any crossing links, linking groups, and filling gaps in the link tree. A third output phase uses the link tree to write an output file, such as comprising an XML document of change (e.g., insert and delete) operations.

41 Claims, 43 Drawing Sheets

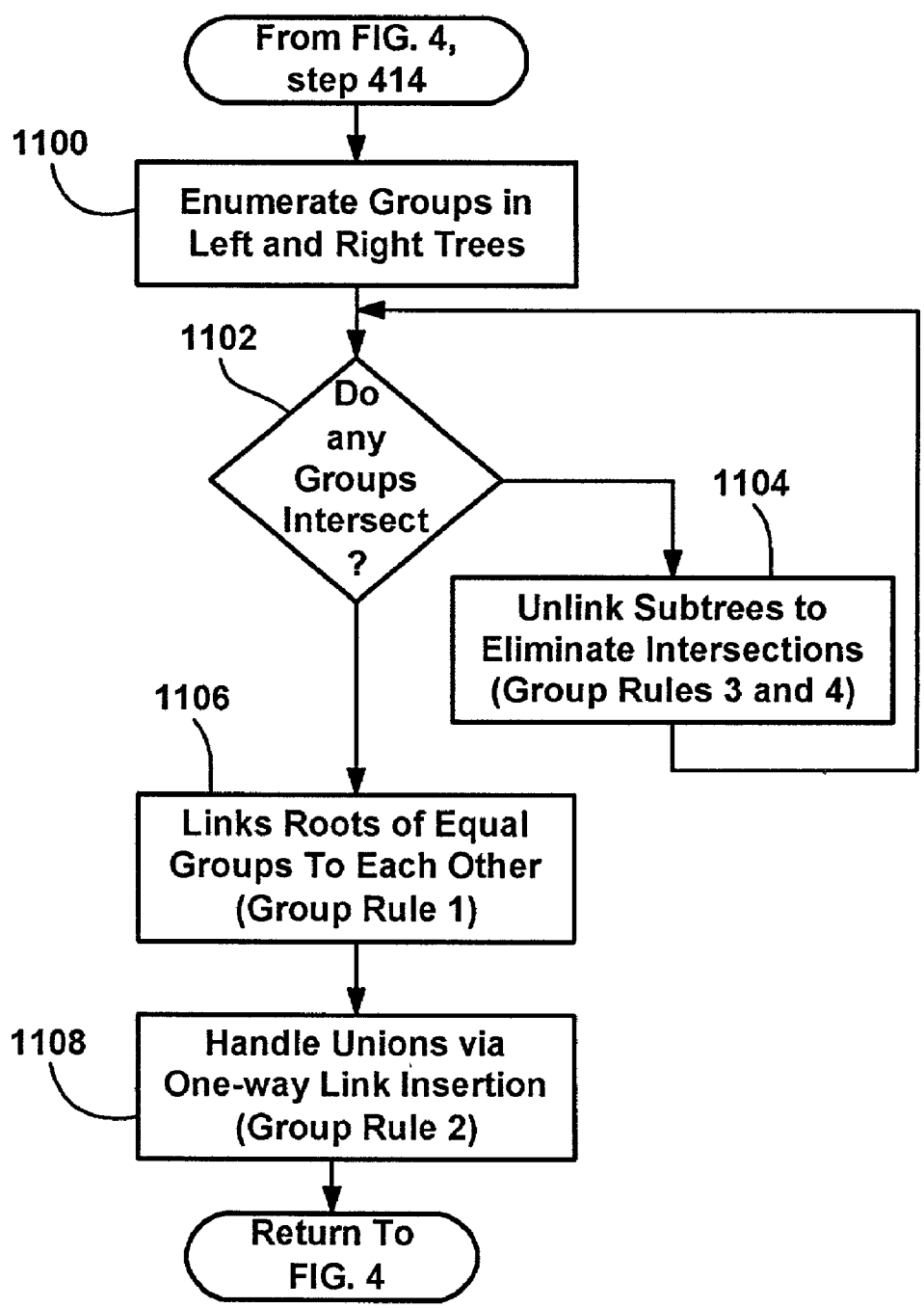

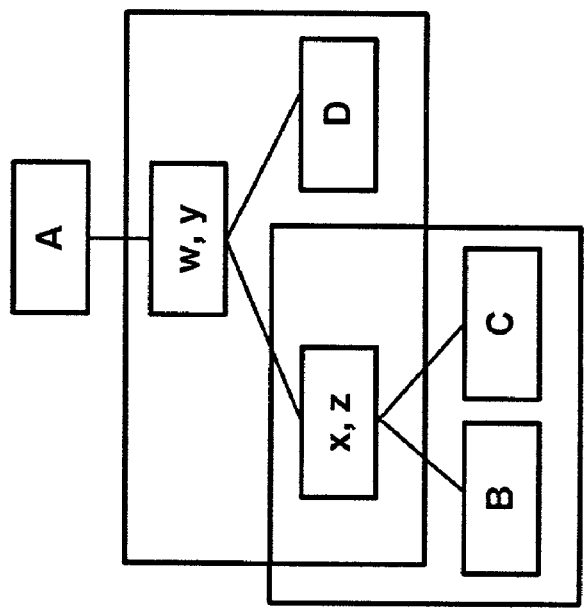
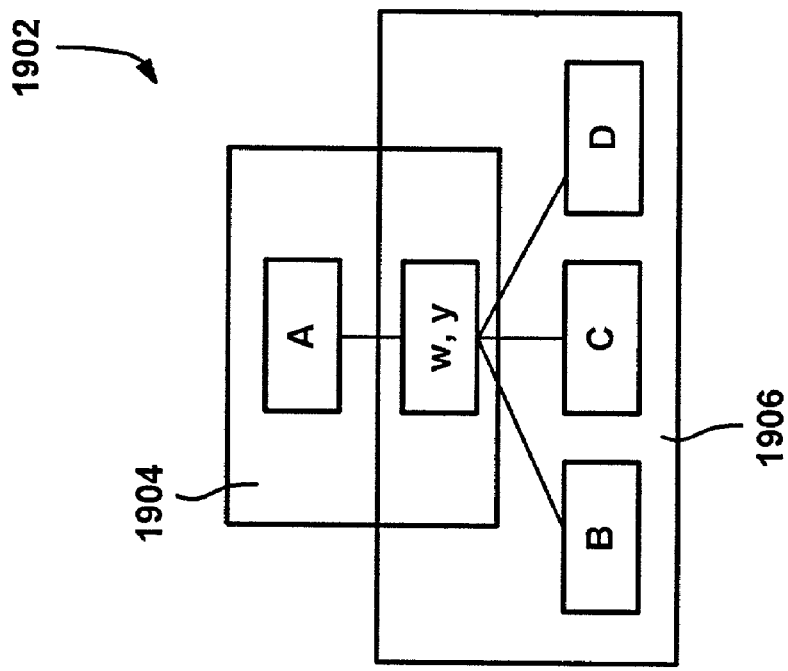
FIG. 19

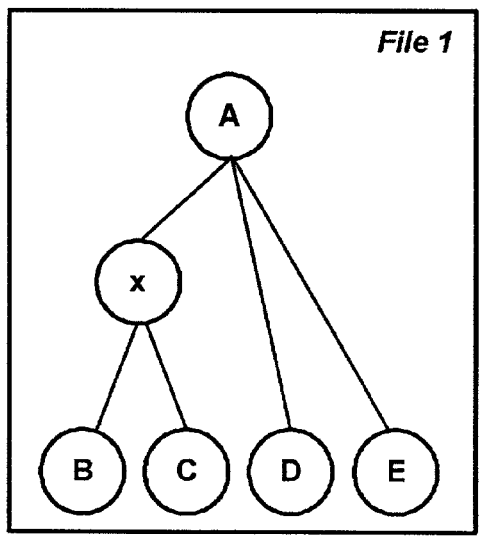 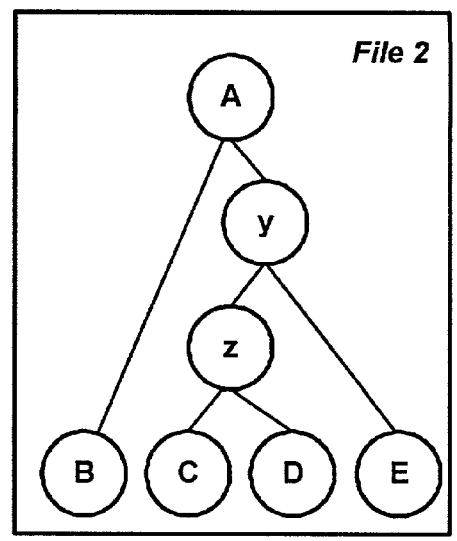
FIG. 34A
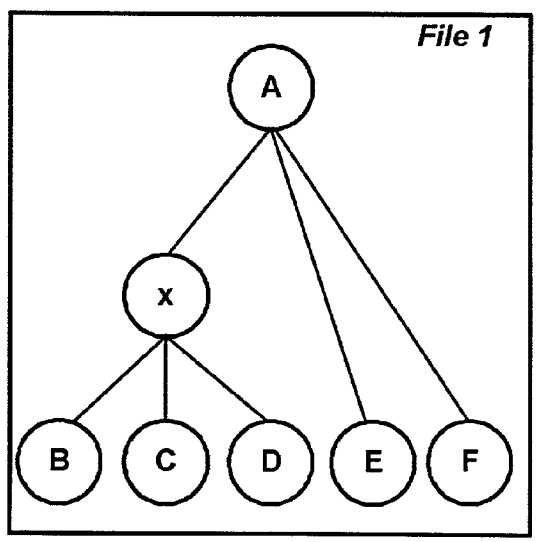 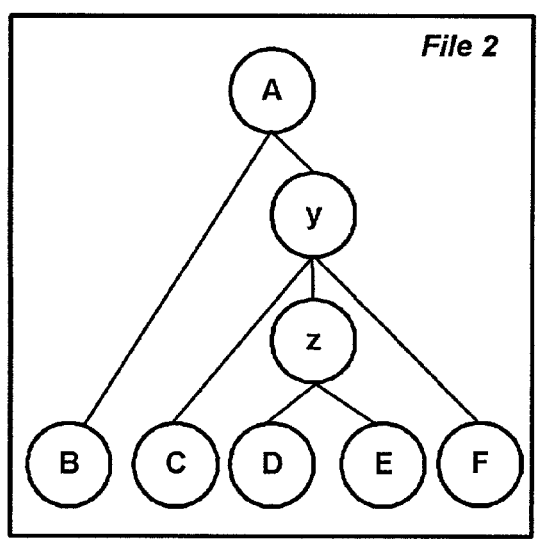
FIG. 34B

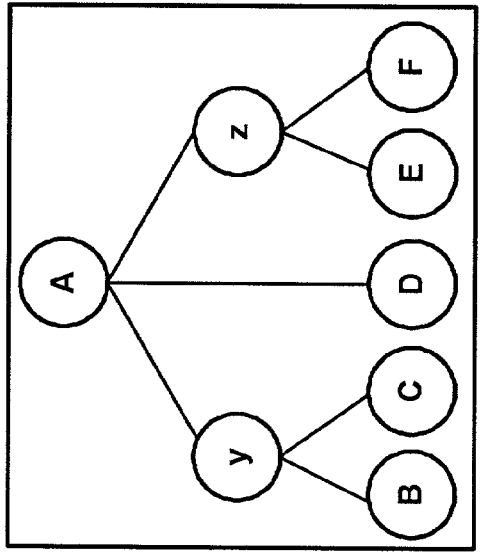
*FIG. 35A*
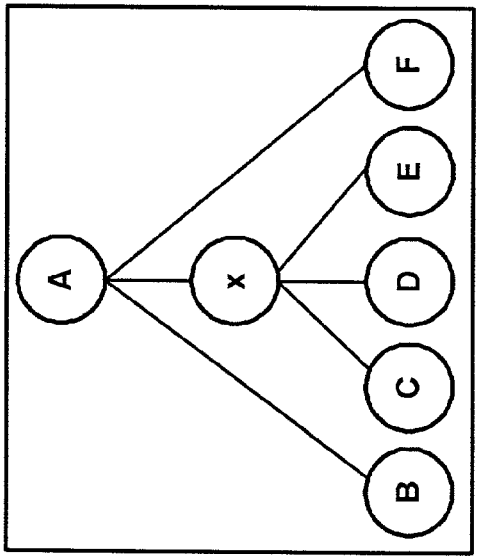
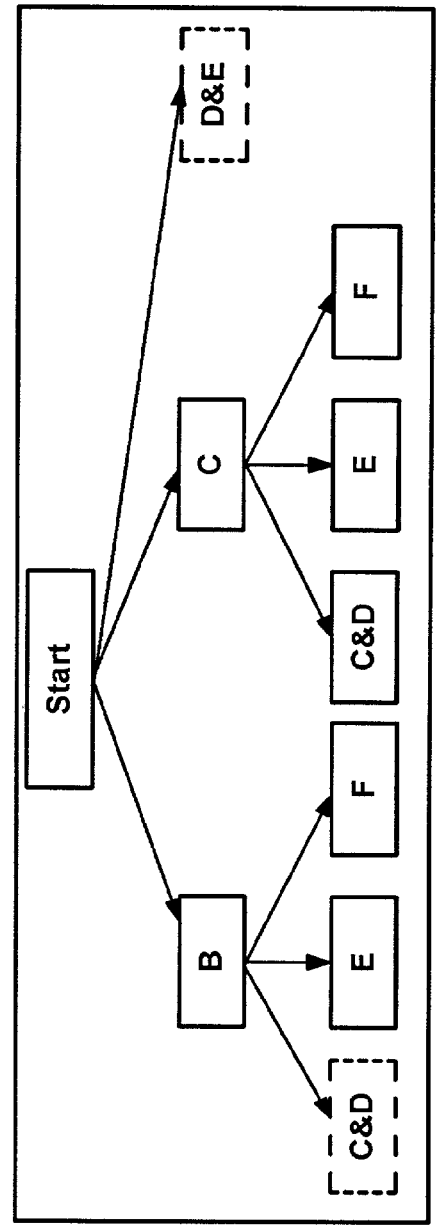
*FIG. 35B*

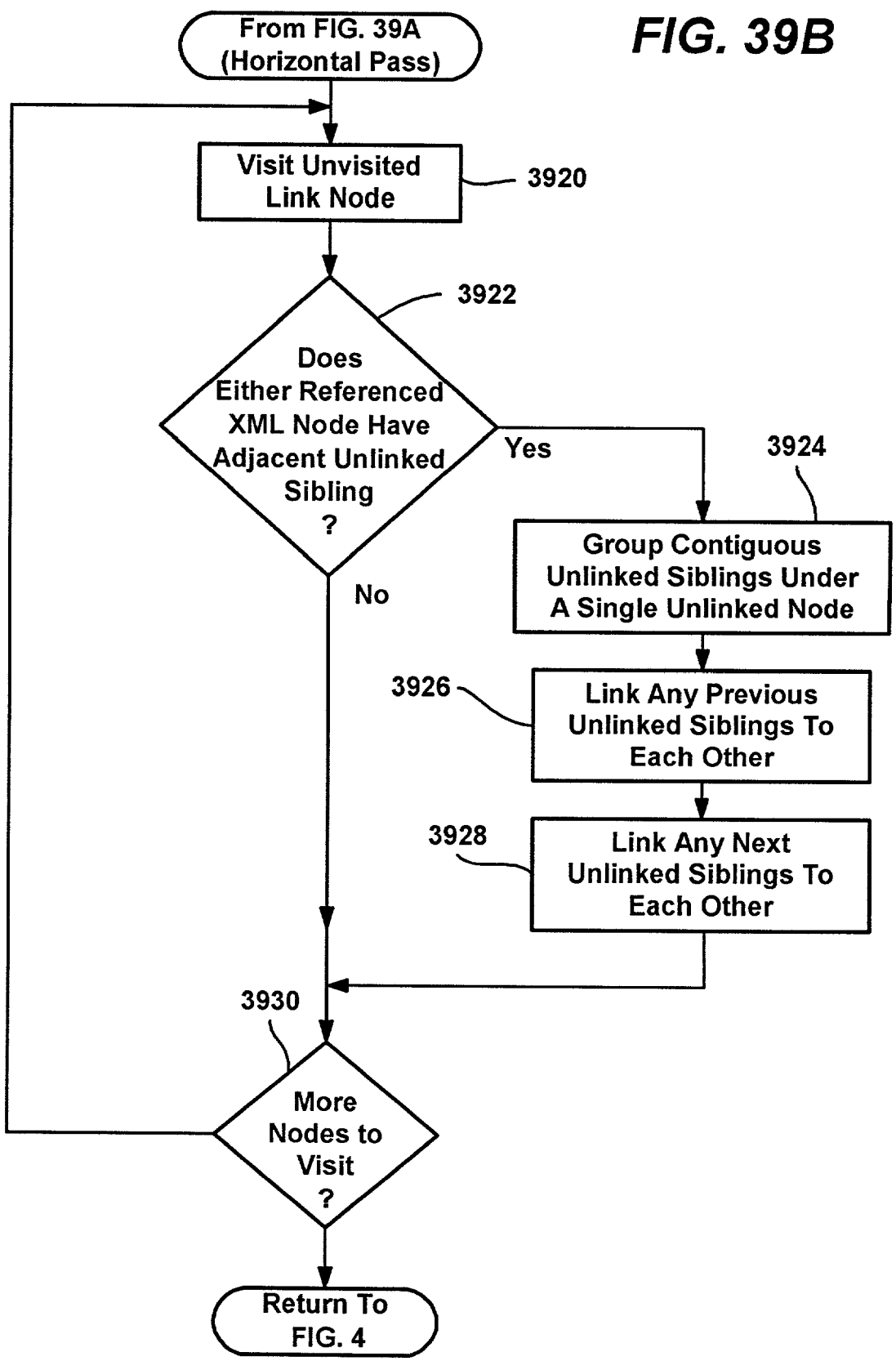

COMPARING HIERARCHICALLY-STRUCTURED DOCUMENTS

FIELD OF THE INVENTION

The present invention relates generally to computer systems, and more particularly to hierarchically-structured documents such as XML (eXtensible Markup Language) formatted documents.

BACKGROUND OF THE INVENTION

The eXtensible Markup Language (XML) is a markup language that allows users to describe data in hierarchically-structured documents or equivalent files. In general, the data is not only present in an XML document, but is described in some way. For example, various sets of text in an XML document might be tagged as separate paragraphs, whereby a program interpreting the document would know something about the text's organization.

XML is a simplified subset of SGML (Standard Generalized Markup Language) that removes some of SGML's more complex features to simplify programming. XML is a defined non-proprietary standard, so XML-formatted information is accessible and reusable by any XML-compatible software, in contrast to proprietary formats used by many conventional programs such as traditional word processors. In other words, XML can be used to store any kind of structured information in a manner that enables it to be communicated between computers, including those that are otherwise unable to communicate. The format is robust, persistable and verifiable.

XML allows the flexible development of user-defined document types that are stored, transmitted and/or processed in some manner, while providing information content that is richer and easy to use, (e.g., relative to HTML), because the descriptive and hypertext linking abilities of XML are much greater than those of HTML.

As XML and XML documents are becoming extremely popular, various tools are needed to work with XML technology. One such tool that would benefit users would provide a way to compare two XML documents. File comparison has a wide range of uses, generally known from word processor utilities and the like that perform line-oriented comparisons, such as those that compare text.

However, while such line-oriented comparisons systems are straightforward to implement, they are also rather limited, and do not fit the hierarchical nature of the structure of XML documents. What it needed is a comparison method and system that are tree-oriented, to match the hierarchical structure of structured documents such as XML documents.

SUMMARY OF THE INVENTION

Briefly, the present invention provides a tree-oriented comparison system and method that compares two XML (or other hierarchically-structured) documents and reports their differences as a set of tree operations. The tree operations may be stored in a well-formed XML document. A tree-oriented comparison is more useful than a line-oriented comparison because with tree operations, it is possible to selectively roll back changes in the original hierarchically structured documents, while still maintaining a well-formed tree. For example, an application may use a change document (e.g., an XML document) comprising tree operations that was created with the present invention to provide users with a tool that enables interactive acceptance or rejection of changes that had previously been made to one of the two XML input files.

To construct the set of tree operations, in a first phase referred to as an input phase, a comparison mechanism (and/or process) reads both input files into memory, and constructs an XML tree of nodes for each file, referred to as a left tree and a right tree, respectively. Once the left and right trees are built, a second, link tree construction phase builds a tree of link objects that relate nodes in the left tree to nodes in the right tree. Then, a third, or output phase uses the link tree to write an output file, such as comprising an XML document of change operations. With this change document, for example, a tool that applied all of the changes therein to the left tree would wind up with the right tree, or vice-versa, while in another application, a tool enables the changes to be individually viewed and selectively applied.

In general, in the input phase, the comparison mechanism reads both input files into memory, and converts them to a standard character encoding that is used internally. The comparison mechanism then constructs an XML tree of nodes for each input file. In one implementation, each node in an XML tree is an object of type XmlRoot, XmlElem, or XmlText, wherein the three node types are based on the abstract base class XmlNode, such that an XML tree may be thought of as a tree of XmlNode objects. Further, each node may have a beginning, zero or more children, and an end.

A second, link tree construction phase builds a tree of link objects that relates nodes in the left tree to nodes in the right tree, including subtrees, wherein a subtree is a node together with its descendants. Construction of the link tree generally operates by a number of steps, including mapping equal subtrees in the left and right trees to each other, linking mapped subtrees to each other, removing any crossing links, linking groups, and filling gaps in the link tree.

The mapping equal subtrees step finds subtrees of the left tree that equal subtrees of the right tree, and maps the corresponding nodes of the left and right subtrees to each other. Once equal subtrees are mapped, the other steps create the link tree, comprising a tree of link objects (or nodes), wherein each link object points to a node in the left tree, the right tree, or both; each node in the left and right trees may be associated with a link node, except for descendants of mapped nodes (as only the root nodes of mapped subtrees are linked to each other); and the order and hierarchy of the link nodes matches the order and hierarchy of the corresponding input tree (e.g., XML) nodes in both the left and right trees.

Because the mapped nodes in the two input trees may be equal but not in the same order, links may logically cross other links. Such crossing links are removed by comparing each pair of adjacent link nodes in the left tree to determine whether the nodes they point to in the right tree are in order. When two adjacent link nodes are not in order, one is unlinked, including unmapping the XML nodes in the corresponding subtrees. Since the crossing link may be removed by unlinking either of the adjacent nodes, a least-cost option is used to decide which to unlink.

When crossing links are removed, the order of the nodes in the link tree matches the order of the corresponding nodes in the left and right trees. Groups are then linked, wherein a group is a set of linked nodes in an XML tree that is defined by a common ancestor nearer than the root of the tree. The nearest common ancestor of all the nodes in the group is called the root of the group. A first step in processing groups enumerates the groups in the left and right trees, giving a left group tree and a right group tree.

Relationships between groups in the left tree and groups in the right tree are found, and group rules applied to each. For example, groups that intersect are found, and subtrees selectively unlinked until there are no intersecting groups. Another group rule links the roots of equal groups to each other. Then remaining groups are linked. Linking groups may include inserting one-way links into the link tree for the roots of groups that occur in one XML tree but not the other, wherein such groups are the unions of single- or multi-element groups in the other tree.

Application of the group rules provides an intermediate link tree. To complete the link tree, vertical and horizontal gaps are filled in by traversing the tree in separate passes, inserting link objects in the vertical pass, and linking unlinked siblings in a horizontal pass.

Once the link tree is fully constructed, an output (e.g., XML change) file is generated that describes differences between the two input files in terms of tree operations. For example, the change file may include insertion and deletion tags to represent the changes from one file to the other. In this manner, the change file is tree oriented to match the hierarchical structure of structured documents.

Other advantages will become apparent from the following detailed description when taken in conjunction with the drawings, in which:

BRIEF DESCRIPTION OF THE DRAWINGS

FIG. 11 is a flow diagram generally representing the linking of groups, in accordance with an aspect of the present invention;

FIGS. 16-19 are diagrams generally representing the linking of roots of equal groups, in accordance with an aspect of the present invention;

FIGS. 30-33, 34A, 34B, 35A and 35B are diagrams generally representing the handling of related intersecting groups, in accordance with an aspect of the present invention;

FIGS. 39A and 39B are flow diagrams generally representing the filling of gaps in the link tree in respective vertical and horizontal passes, in accordance with an aspect of the present invention.

DETAILED DESCRIPTION

Exemplary Operating Environment

Figure 1:
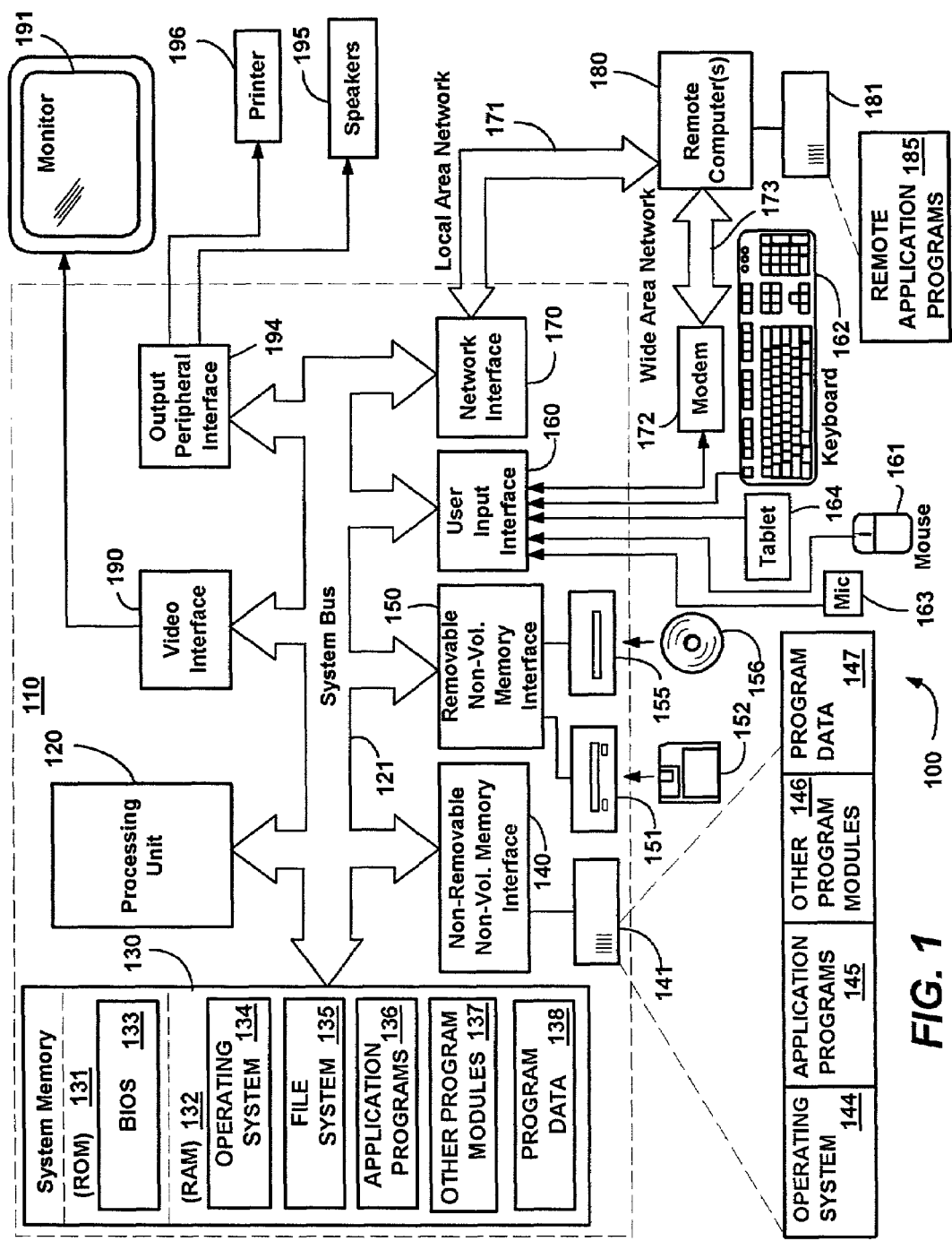
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137 and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Comparing Hierarchically-Structured Documents

Figure 2:
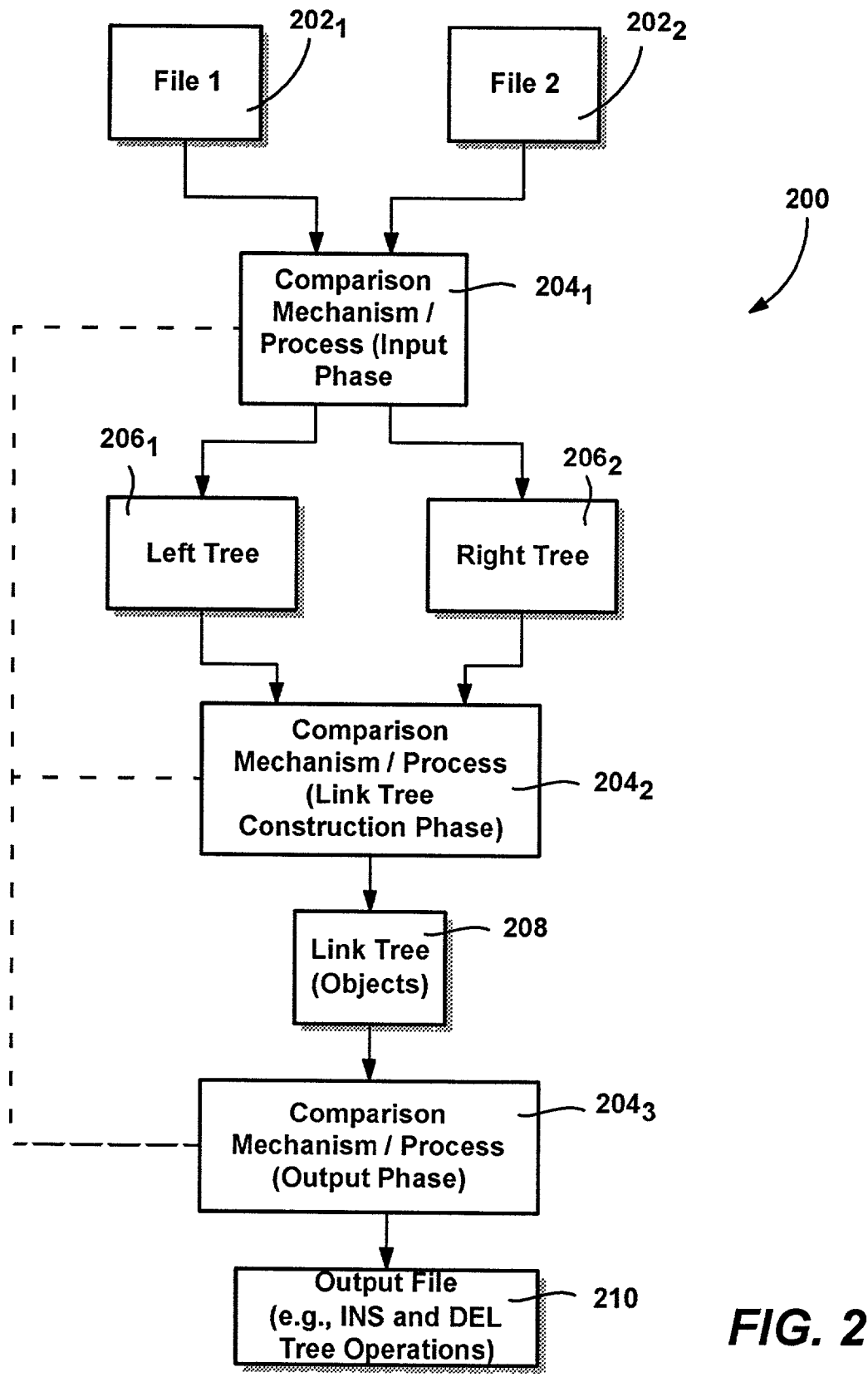
FIG. 2 is a block diagram generally representing components for constructing a link tree and an output file of tree operations from the link tree in accordance with an aspect of the present invention.

As generally represented in FIG. 2, the present invention is directed to a tree-oriented comparison system and method 200 that compares two XML (or similarly hierarchically-structured) document files $202_1$ and $202_2$, and reports their differences as a set of tree operations. To this end, in a first phase referred to as an input phase, a comparison mechanism (and/or process) $204_1$ reads both input files $202_1$ and $202_2$ into memory, and constructs an XML tree of nodes for each file. For purposes of description, the two XML trees that are constructed in the first phase are referred to as a left tree $206_1$ and a right tree $206_2$, respectively, although as can be readily appreciated, other names would be equivalent, e.g., first and second trees, current and previous trees (based on document versions), and so forth.

Some processing of the left and right trees may also be performed at this time. For example, to simplify later comparisons between the two trees, a hash computation is taken of each node, and a hash value associated with that node. To this end, the computation starts with each of the leaf nodes, computes a hash, and stores it in association with each respective leaf node. The hash of the leaf node is then used in computing a hash value for its parent node, and that hash for the next parent up, and so on. In this manner, each subtree has a hash value computed therefor that depends on its child nodes and their child nodes. If the hash value of a node equals the hash value of another node, then it is known that those nodes and the subtrees thereunder are equal. Other processing may be done at this time, such as to determine size, relative values and the like of each node, however such processing may be deferred until needed for a given node.

In accordance with one aspect of the present invention, a second, link tree construction phase $204_2$ builds a tree of link objects 208 that relates nodes in the left tree $206_1$ to nodes in the right tree $206_2$. The link tree 208 need not be an XML document, but rather is a temporary tree that is manipulated as described below to relate the left and right trees to one another. In general, the link tree 208 is built by walking the left and right trees $202_1$ and $202_2$, matching subtrees therein by their parent nodes' hash values, and maintaining pointers between equal subtrees. The link tree 208 is then manipulated according to various link group rules.

When the link tree 208 is complete, a third, or output phase of the comparison mechanism $204_3$ uses the link tree 208 to write an output file 210. In one implementation, the output file 210 comprises a well-formed XML document, also referred to as the change tree, or change document, since it is a tree structured document that contains the change operations that describe differences between the trees. Note that while in FIG. 2 a single comparison mechanism/process is shown as accomplishing the three phases, (as indicated in FIG. 2 by the dashed line connecting the blocks $204_1$-$204_3$), it is understood that the phases may be implemented by more than one component, e.g., a separate component may perform each phase.

Turning to a general explanation of the first, or input phase, in this phase the comparison mechanism $204_1$ reads both input files $202_1$ and $202_2$ into memory, such as the RAM 132 (FIG. 1) and converts them to a standard character encoding that is used internally. The comparison mechanism (phase $204_1$) then constructs the left and right XML tree of nodes $206_1$ and $206_2$ for each input file $202_1$ and $202_2$, respectively. Hash values and possibly size values may be determined at this time, as described above.

In one implementation, each node in the XML trees $206_1$ and $206_2$ is an object, either of type XmlRoot, XmlElem or XmlText, wherein the three node types are based on the abstract base class XmlNode, such that an XML tree may be thought of as a tree of XmlNode objects. Each node has a beginning, zero or more children, and an end.

The XmlRoot object represents the document as a whole, and its beginning comprises everything before the document element's start tag, as generally described below with reference to FIG. 3. In a typical XML document, this may include processing instructions, declarations, and white space. The XmlRoot object's end comprises everything after the document element's end tag, typically comprising any trailing white space. The only child of an XmlRoot object should be the XmlElem object for the document element. Note however, that XmlRoot objects may sometimes be used later, to combine multiple sibling elements into a single subtree; in such a case, the XmlRoot object represents the root of a subtree, rather than the root of the entire document.

An XmlElem object represents an XML element, and its beginning is the element's start tag, including any attributes. An XmlElem object's children are child elements and text nodes, and (later) possibly XmlRoot objects for nodes that have been grouped into subtrees. The XmlElem object's end comprises the end tag, if any. The start and end tags are converted to canonical form for comparison purposes.

An XmlText object represents a block of text, i.e., parsed character data. The XmlText object's beginning is the character data, which may be normalized according to a white space handling option. An XmlText object should have no children, and its end should be the empty string.

Figure 3:
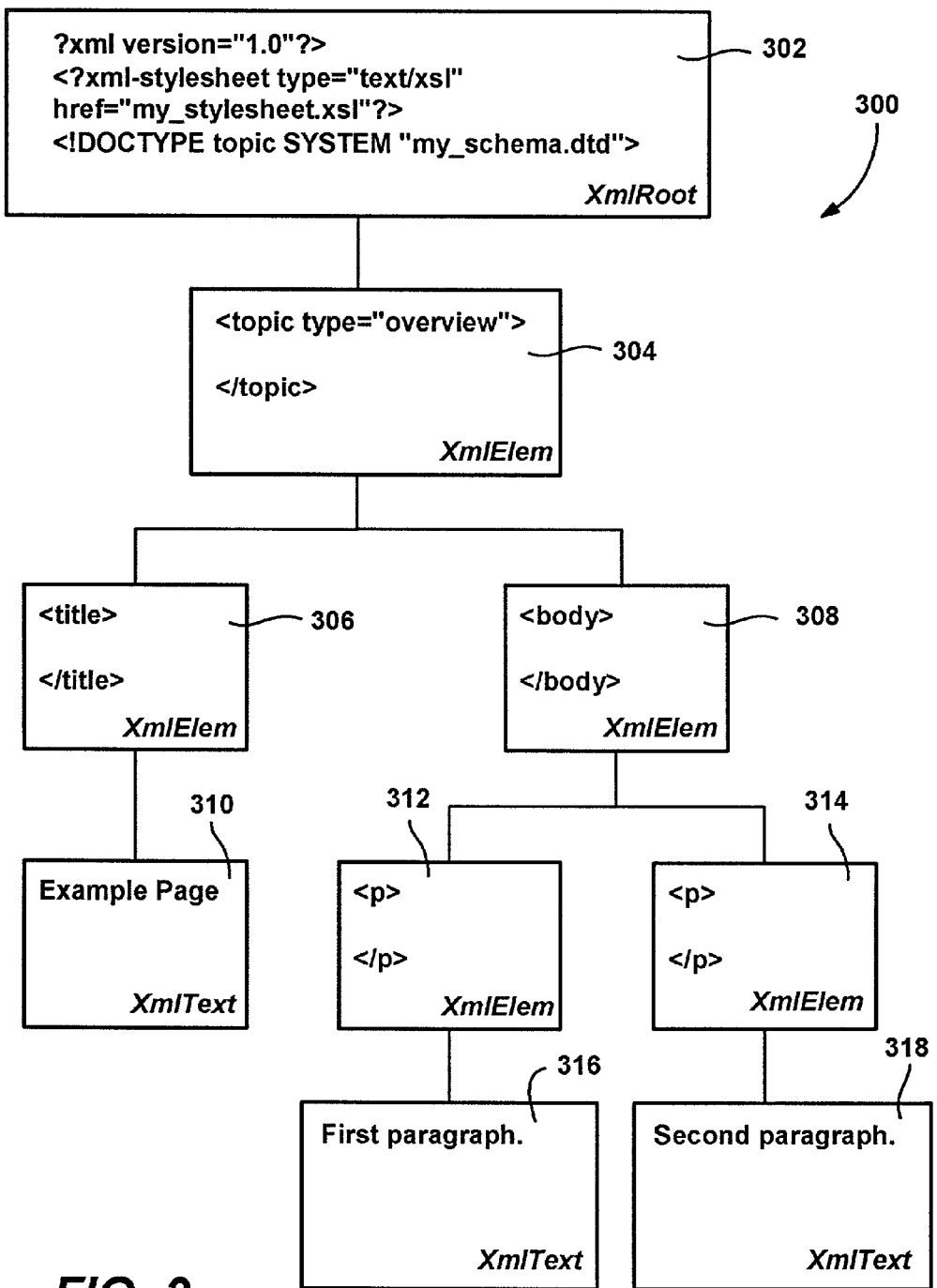
FIG. 3 is a representation of a tree constructed from an XML file.

FIG. 3, based on the example in the table below, shows how a document may be converted to an XML tree 300:

```
<?xml version="1.0"?>
<?xml-stylesheet type="text/xsl"
href="my_stylesheet.xsl"?>
<?DOCTYPE topic SYSTEM "my_schema.dtd">
<topic type="overview">
    <title>Example Page</title>
    <body>
        <p>First paragraph.</p>
        <p>Second paragraph.</p>
    </body>
</topic>
```

As represented in FIG. 3, the XmlRoot node 302 contains the information prior to the <topic> XmlElem node 304. Hierarchically below the <topic> XmlElem node 304 are <title> and <body> XmlElem nodes, 306 and 308, respectively. The <title> XmlElem node 306 has an example page XmlText node 310 as a child, while the <body> XmlElem node 308 has two paragraph XmlElem nodes as children, 312 and 314, each paragraph XmlElem node having respective first and second paragraphs 316 of text as XmlText children 318.

Figure 4:
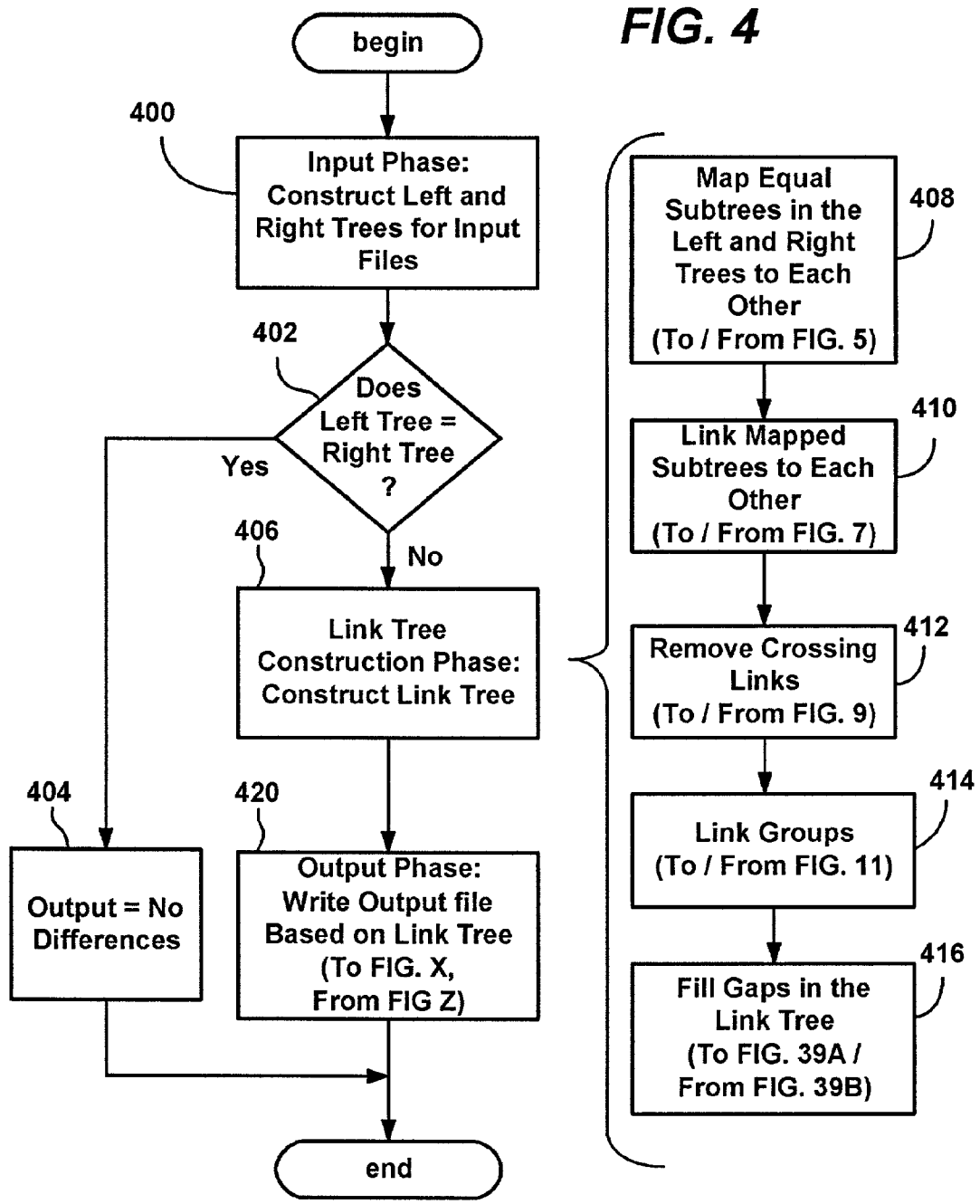
FIG. 4 is a flow diagram generally representing the overall construction process in accordance with an aspect of the present invention.

As represented in the flow diagram of FIG. 4, following completion of the input phase (step 400), the comparison mechanism compares the left and right trees $206_1$ and $206_2$, as represented by step 402. If the trees are equal, (e.g., as determined by equal hash values associated with their root nodes), an appropriate output indicating "no differences" is generated at step 404, and the comparison mechanism/process ends.

In the event that the left and right trees $206_1$ and $206_2$ are unequal, a link tree 208 is constructed at step 404 that relates the left tree $206_1$ and the right tree $206_2$. As will be understood, construction of the link tree 208 is typically the most significant part of the comparison mechanism, processing-wise, and is represented by steps 408, 410, 412, 414 and 416, each of which are further explained via corresponding FIGS. 5, 7, 9, 11 and 39A-39B, respectively. Thus, construction of the link tree 208 involves step 408, which maps equal subtrees in the left and right trees to each other, wherein a subtree is a node, together with its descendants. Step 410, described below, links mapped subtrees to each other, while step 412 removes crossing links. Step 414 links groups, while step 416 represents filling gaps in the link tree 208.

Figure 5:
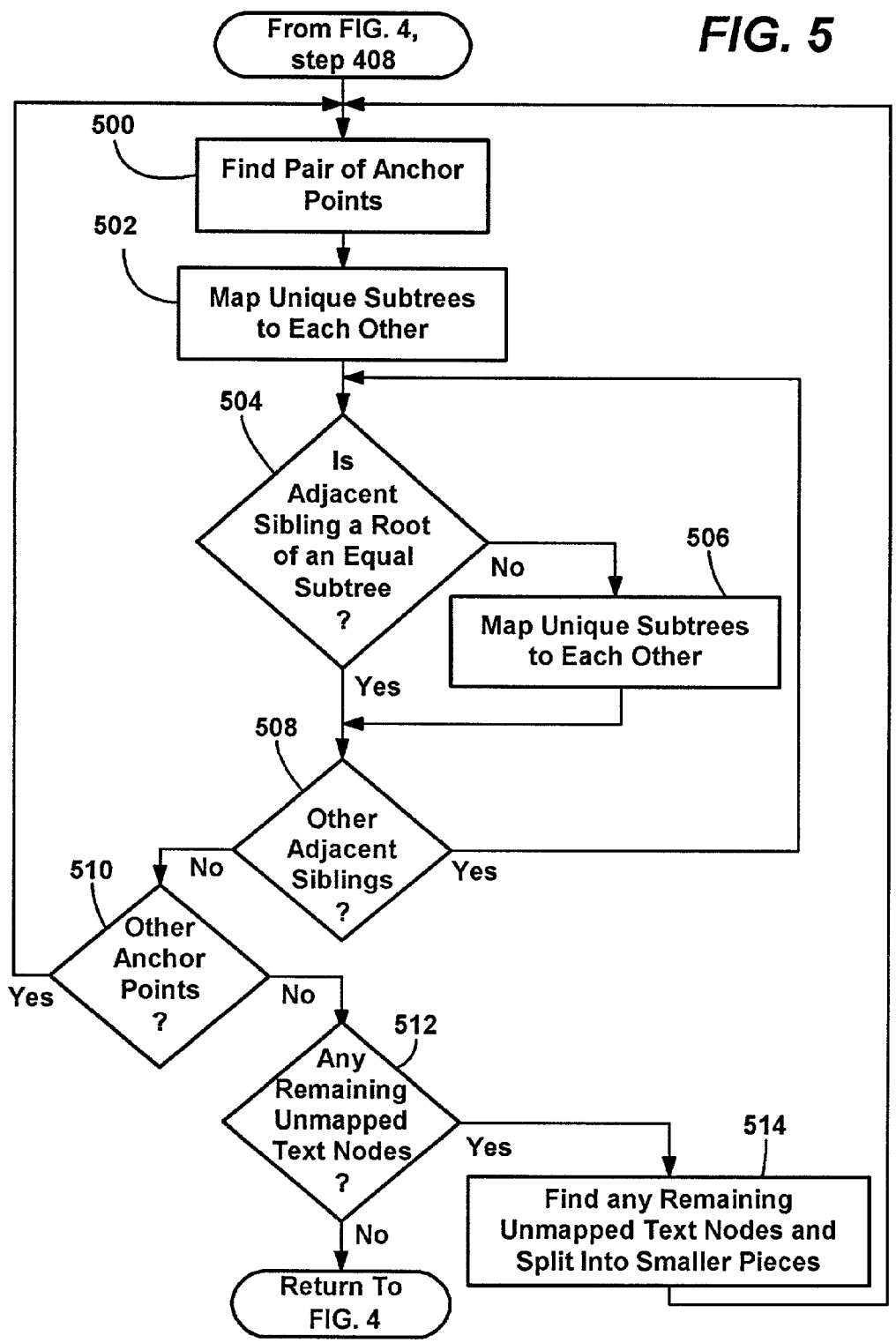
FIG. 5 is a flow diagram generally representing the mapping of equal subtrees in the left and right input trees to one another, in accordance with an aspect of the present invention.
Figure 6:
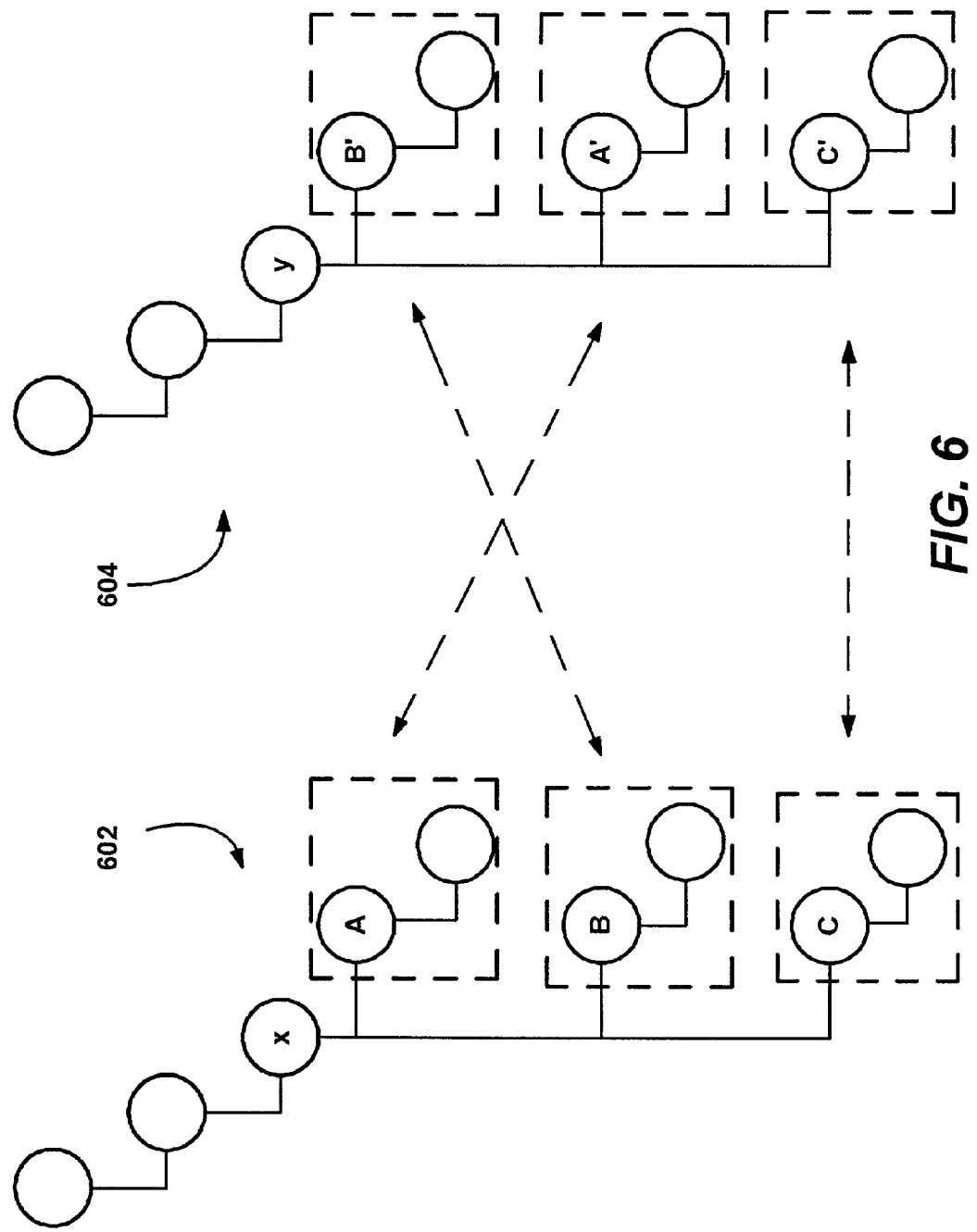
FIG. 6 is a diagram generally representing left and right trees constructed from hierarchical files and having logical links between mapped subtrees, in accordance with an aspect of the present invention.

As represented by step 408, the flow diagram of FIG. 5, and the example trees of FIG. 6, a general goal of mapping equal subtrees is to find subtrees of the left tree that equal subtrees of the right tree, and map the nodes of the left and right subtrees that correspond to each other. In an XML tree, a subtree may be a simple leaf node, such as a text node or empty element, or it may comprise an element together with the elements and/or text nodes it contains. Two subtrees are equal if their root nodes are equal, and their corresponding subtrees are equal. Note that this corresponds to a recursive comparison. The hash calculations facilitate the comparisons.

One way of mapping equal subtrees works as generally represented in FIGS. 5 and 6, wherein step 500 finds a pair of anchor points A and A', where A is the root of a unique subtree in the left tree 602, A' is the root of a unique subtree in the right tree 604, and subtree A equals subtree A'. In FIG. 6, unique subtrees in the trees 602 and 604 that have an equal counterpart subtree are each represented via a dashed box. A subtree is unique if the tree of which it is a part contains no other subtree equal to it.

Step 502 maps the subtrees A and A' to each other, such as via a data structure or the like that contains pointers to the root nodes (e.g., their offsets) of the subtrees. Step 502 entails mapping nodes A and A' to each other, and mapping the descendants of A and the corresponding descendants of A' to each other. In FIG. 6, links are represented by dashed arrows between the subtrees. Note that for purposes of clarity, individual links between mapped root nodes and mapped descendants are not shown.

Step 504 tests whether adjacent siblings of A and A', such as B and B', are the roots of equal (but not necessarily unique) subtrees. If so, step 504 branches to step 506 to map those subtrees to each other. Step 508 then repeats the above-described process for other adjacent siblings until none remain.

Once any adjacent siblings have been mapped, step 510 repeats the above process for other anchor points, until there are none remaining. When none remain, step 512 looks for any remaining unmapped text nodes, and if at least one is found, splits each into smaller pieces, e.g., one node per word (as delineated by whitespace), via step 514. Then the process is run again (e.g., once) to find additional matches among the smaller pieces.

At this time, the mapped subtrees are known, whereby a general goal of the remaining steps is to create the link tree 208 (FIG. 2). The link tree 208 is a tree of link objects in which each link node points to a node in the left tree $206_1$, the right tree $206_2$, or both. Each node in the left and right trees $206_1$ and $206_2$ is associated with exactly one link node, except for descendants of mapped nodes, that is, only the root nodes of mapped subtrees are linked to each other. The order and hierarchy of the link nodes matches the order and hierarchy of the corresponding XML nodes in both the left and right trees, $206_1$ and $206_2$, respectively.

These requirements can be expressed more formally:

Given two XML nodes A and B (in either the left or right tree), the link tree 208 must contain two nodes L(A) and L(B) that point to A and B respectively. Moreover, if A is an ancestor of B then L(A) must be an ancestor of L(B), and if A comes before B then L(A) must come before L(B). This may be expressed as follows (wherein an arrow with the head pointing toward the root is used to denote ancestry, and the inequality operators denote order):

For any two nodes A and B in an XML tree, $$A \leftarrow B \equiv L(A) \leftarrow L(B) \text{ and } A < B \equiv L(A) < L(B)$$

These requirements may be met via steps 410, 412, 414 and 416 of FIG. 4, which are each further described in corresponding FIGS. 5, 7, 9, 11 and 39A-39B, respectively. The following sections describe steps in the creation of the link tree 208.

The first part of the link tree 208 that is created is the root node, (represented in FIG. 7 by step 700), which points to the roots of the left and right trees. Note that the roots of the left and right trees are empty of content (except for the content outside the document element, which is not subject to comparison) and always compare equal.

Figure 7:
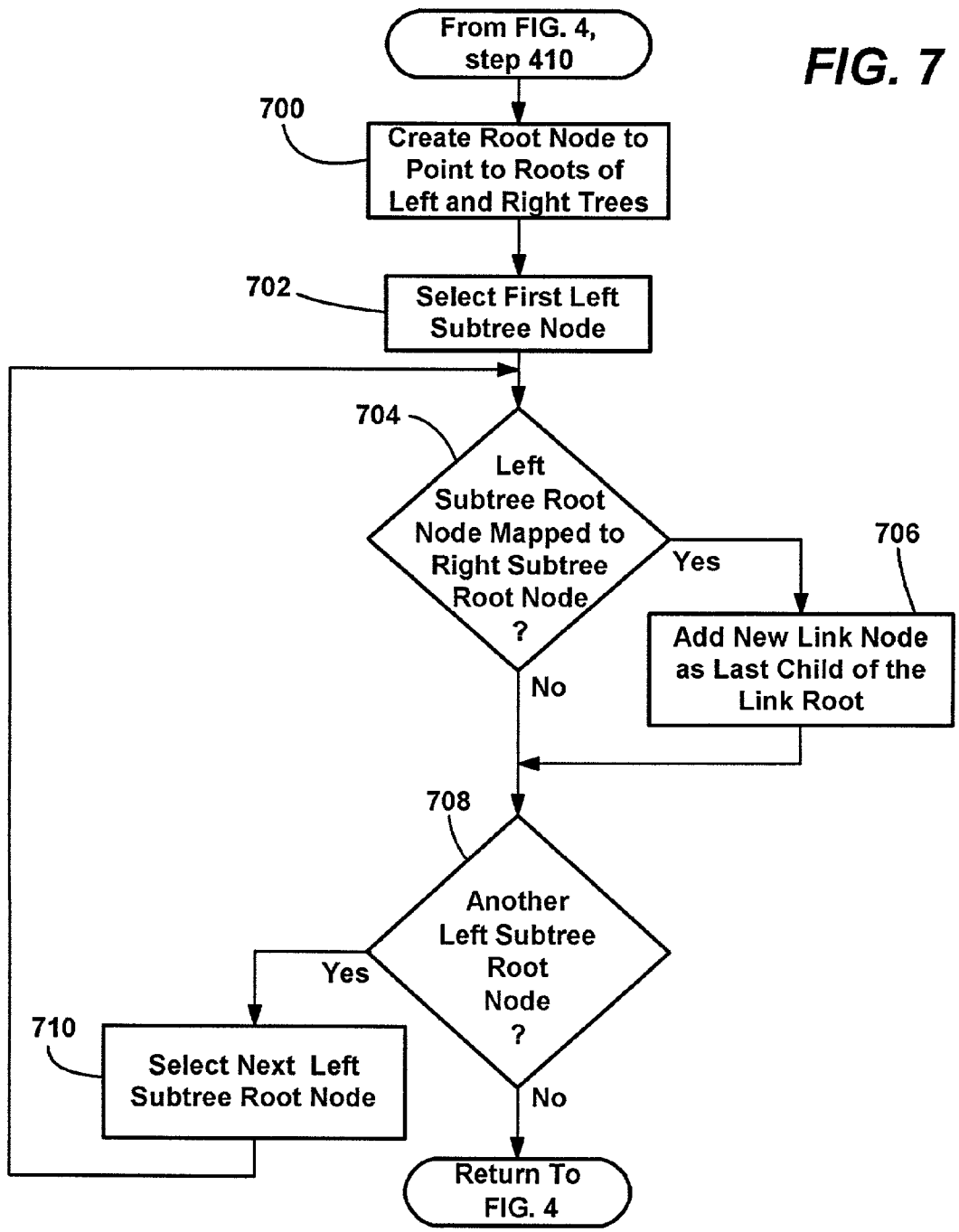
FIG. 7 is a flow diagram generally representing the linking of mapped subtrees to one another, in accordance with an aspect of the present invention.
Figure 8:
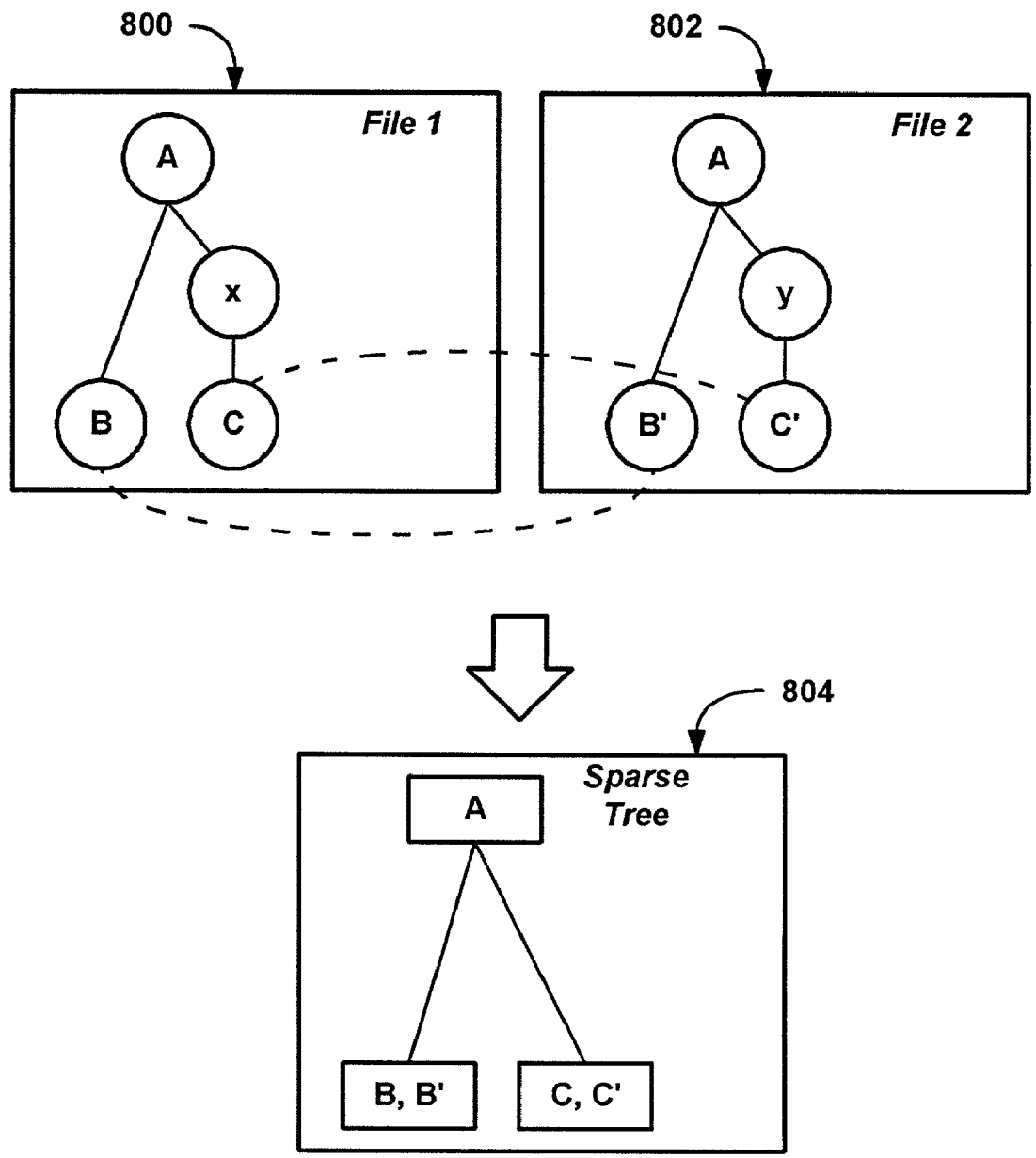
FIG. 8 is a diagram generally representing left and right trees used to build a sparse tree containing mapped subtrees, in accordance with an aspect of the present invention.
Figure 9:
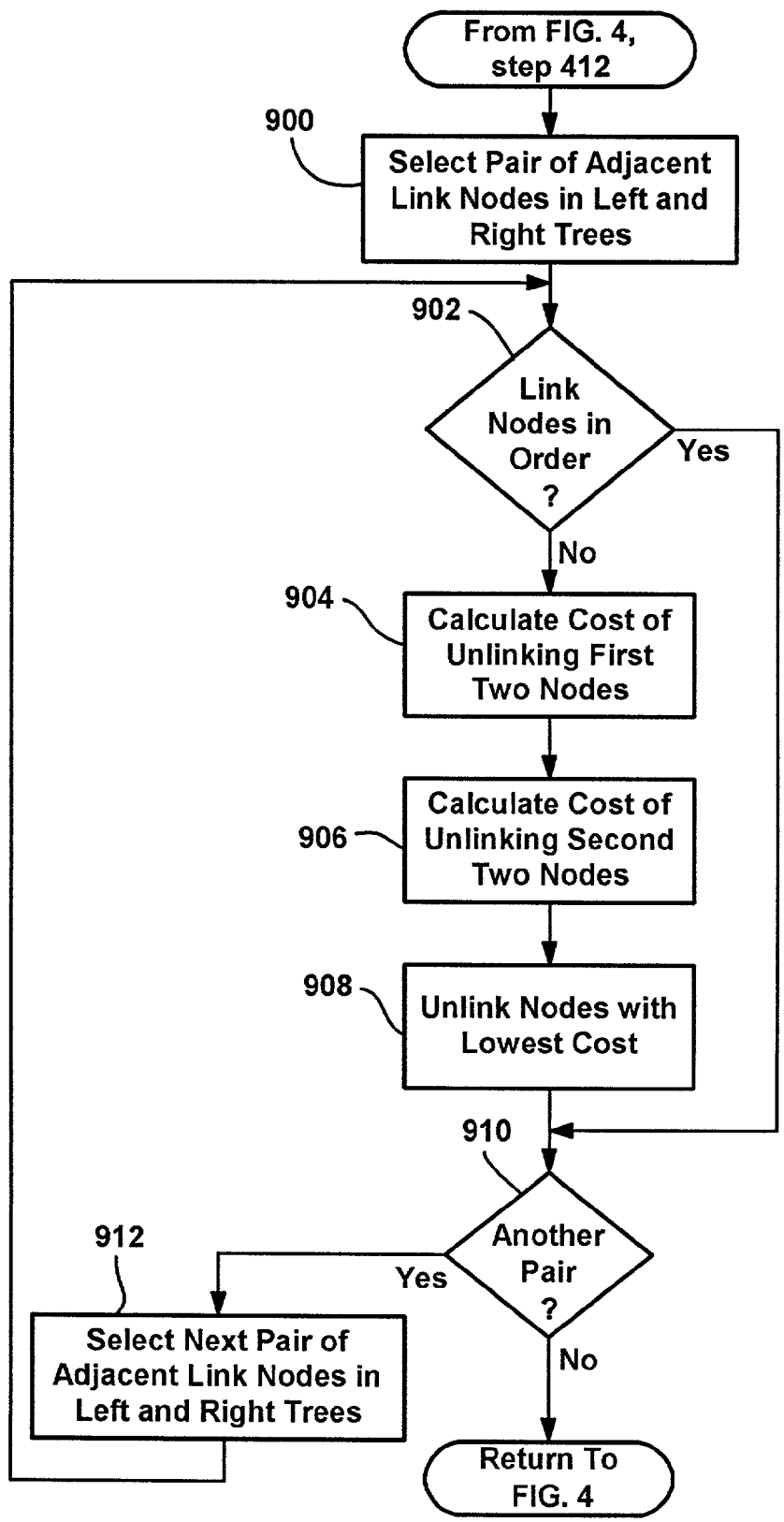
FIG. 9 is a flow diagram generally representing the removing of crossing links, in accordance with an aspect of the present invention.

In FIG. 7, the process iterates (via steps 702, 708, and 710) over the nodes of the left tree to find the root nodes of the mapped subtrees, essentially looking for whether each left subtree is mapped to a right subtree. For each left subtree that is mapped, step 704 branches to step 706 where a new link node is added to the link tree 208. For example, as represented in FIG. 8, if B is the root of a mapped subtree in the left tree 800 and B' is the node it is mapped to in the right tree 802, a new link node L(B, B') is added as the last child of the link root, where B and B' can be considered as the pointers to their respective nodes in the left and right trees 800, 802. Note that at the time that the subtrees have been mapped, the link tree 804 is "flat" (its height is two), and there are no one-way links, that is, every link points to nodes in both the left and right trees. Such a tree is referred to herein as a sparse tree 804, as it only contains mapped subtrees, not unmapped ones.

At this point, because the links were added in the order that the left tree was traversed, the order of the nodes in the link tree matches the order of the corresponding linked nodes in the left tree. However, the order of the link nodes does not necessarily match the order of the corresponding nodes in the right tree. This is because there may be crossing links, such as represented in the example of FIG. 6, where the link between the A and A' nodes/subtrees cross with the link between the B and B' nodes/subtrees. To find crossing links, each pair of adjacent link nodes is compared, shown in the flow diagram of FIG. 9 via steps 900 and 902. The link nodes are in order if the nodes they point to in the right tree are in order, that is, $L(A,A') < L(B,B') \equiv A' < B'$.

If two adjacent link nodes $L_n$ and $L_{n+1}$ are not in order at step 902, to remove the crossing link, either one can be unlinked, either $L_n$ or unlink $L_{n+1}$. To unlink a link node, the nodes in the corresponding subtrees are also unmapped. However, choosing to not unlink $L_n$ means that not only $L_{n+1}$ needs to be unlinked, but also one or more subsequent link nodes. Conversely, choosing to not unlink $L_{n+1}$ means that not only $L_n$ needs to be unlinked, but also one or more previous link nodes. To determine which is more optimal to unlink, in one implementation, the values of the subtree members that would have to be unlinked in each case are summed, (steps 904 and 906), with the least-cost option (lowest summed value) chosen as the solution at step 908. Note that the values may have been previously determined, or can be determined at the time of the unlink operation. Steps 910 and 912 repeat the process until no pairs remain to be checked for crossing links.

By way of example, consider the following fragments from the first and second XML files:

| Left File | Right File |
|---|---|
| <p>This paragraph gets moved. </p> | <p>This is the first paragraph of the rest of the document. </p> |
| <p>This is the first paragraph of the rest of the document. </p> | <p>This is the second paragraph of the rest of the document. </p> |
| <p>This is the second paragraph of the rest of the document. </p> | <p>This paragraph gets moved. </p> |

Figure 10A:
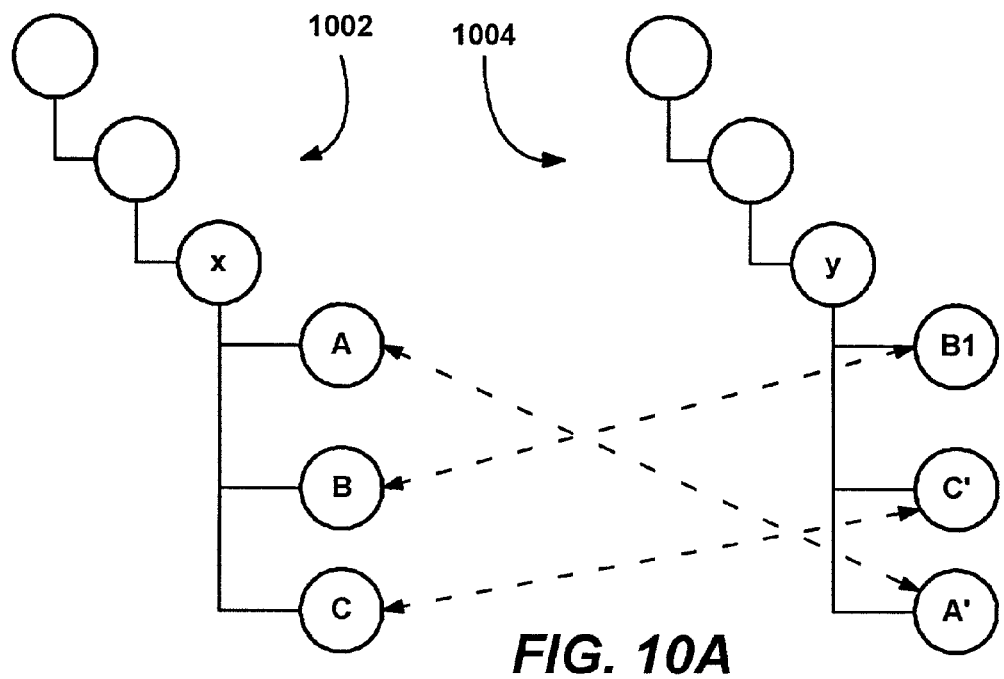
FIGS. 10A and 10B are diagrams generally representing the removal of crossing links in left and right trees constructed from hierarchical files and having logical links between mapped subtrees, in accordance with an aspect of the present invention.

FIG. 10A shows how this appears, e.g., when the comparison mechanism $204_2$ builds a link tree 1002 for the left file, an XmlElem node is created for each of the three <p> elements and a child XmlText node for the text within each <p> element. Similarly, the right tree 1004 would contain three XmlElem nodes, each with a child XmlText node (not shown). For purposes of the present example, the XmlElem nodes in the left tree are designated A, B, and C, and the elements to which they are mapped are designated A', B', and C', respectively, while the child text nodes are not shown.

When the comparison mechanism $204_2$ maps equal subtrees, each paragraph in the left tree is mapped to the matching paragraph in the right tree, as indicated by the dashed lines between the nodes. Thus, each XmlElem node is the root of a mapped subtree composed of two nodes (the other node being the XmlText node, not shown).

Figure 10B:
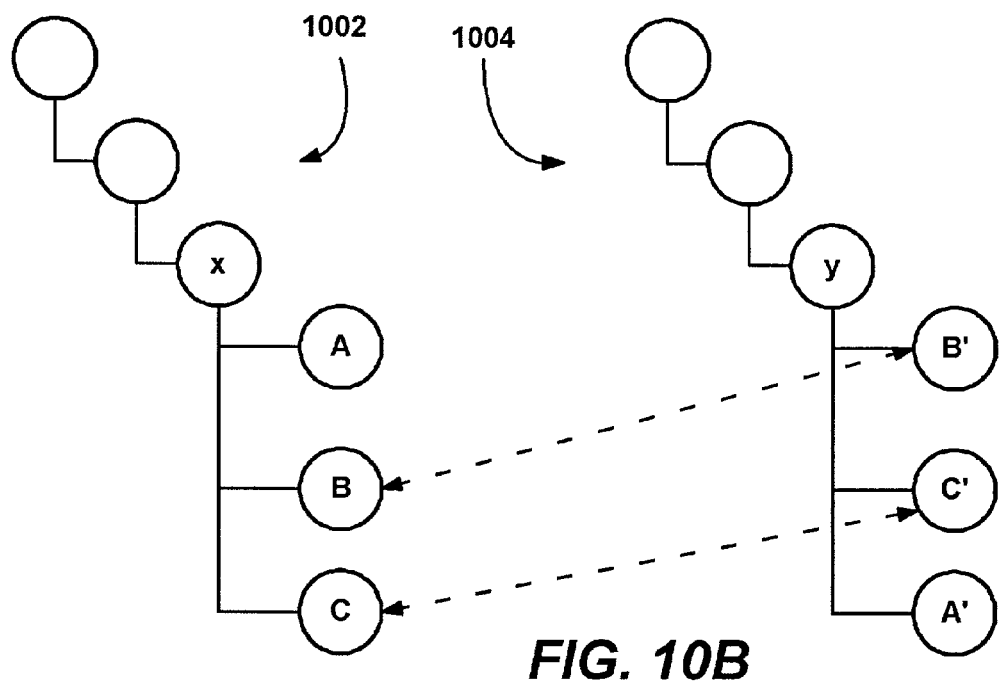

However, note that the order of the nodes in the right tree differs from those in the left three; i.e., A<B<C, but B'<C'<A'. As a result, after the comparison mechanism links the mapped subtrees, L(A,A'), L(B,B'), and L(C,C') are the link nodes. When the comparison mechanism compares the first two link nodes (step 902), they are found to be not in order, as A'>B' because A is the first paragraph if the left file, but A' is the last paragraph of the right file. Because A' is also greater than C', the two choices are to unlink L(A,A'), or unlink both L(B,B'), and L(C,C'). Choosing the least-cost solution via steps 904 and 906, the comparison mechanism unlinks L(A,A') and unmaps the corresponding nodes at step 908, resulting in the link being logically removed as represented in FIG. 10B.

At this time, the order of the nodes in the link tree matches the order of the corresponding nodes in the left and right trees. However, the hierarchical relationships between the nodes in the link tree need to match those between the corresponding nodes in the left and right trees. To this end, an evaluation of how linked nodes are grouped in each XML tree, by virtue of having common ancestors, is performed.

In general, and as described below with reference to FIGS. 12-38D, a group is a set of linked nodes in an XML tree that is defined by a common ancestor nearer than the root of the tree. The nearest common ancestor of the nodes in a group is called the root of the group. A group may be denoted as a function of its root, or by specifying its members using set notation, e.g., if the root of a group is node x and its members are B, C, and D, then G(x)={B,C,D}. Note that in the following examples, uppercase letters denote linked nodes while and lowercase letters denote other nodes.

It is possible for one group to contain other groups in the same file. For example, if G(x)={B,C}, and there is another node y that is an ancestor of both x and the linked node D, then G(y)={B,C,D}. In this case, G(y) contains G(x). In general, G(y) contains G(x) if and only if y←x. In some contexts, each linked node may be thought of as a single-element group in its own right, i.e., G(B)={B}. A linked node's first-order group is the smallest multi-element group of which it is a member.

To represent the groups in a subtree, a data structure is used. For each group, there are pointers to the first and last members (link objects), as well as a pointer to the root (an XMLNode object). Additional requirements follow from the need to be able to find equal groups, and, when splitting a subtree, from the need to be able to also split the corresponding set of groups. This may be done efficiently when the groups themselves are organized in a tree. Further, the process needs to be able to find groups that are subsets of other groups, and to find groups that intersect. These requirements can generally be met by the ability to find all groups that contain a given element. If groups are organized into a tree, and the primary group is found for an element, then ancestors of the primary group also contain that element. This can be tracked by adding a group pointer to each XMLNode object, or by creating a map relating XMLNodes to groups.

A first step in processing groups is to enumerate the groups in the left and right trees, as generally represented in the flow diagram of FIG. 11 at step 1100. To this end, for each XML tree, the comparison mechanism $204_2$ creates a group tree, containing one group object for each multi-element group in the XML tree. Each group object contains a pointer to the root of the group (an XmlNode object) and pointers to the first and last members of the group (Link objects). The hierarchical relationships between the root nodes of groups in the XML tree determine the hierarchy of the Group objects themselves in the group tree. Thus, G(x)←G(y)≡x←y≡G(x) contains G(y).

As another example of enumerating groups in a subtree and to build a tree of Group objects representing those groups, consider two adjacent linked child nodes B and C having a common ancestor x, where x !=A. G(x) is a group that contains B and C. Furthermore, G(x) is the primary group of A, B, or both. G(x) may contain other members in addition to B and C.

To create the groups for a subtree, the process iterates over linked child nodes except the last, and with each iteration, creates groups of which the current node is the first member. For each iteration, let b be the current linked node, let c be the next linked node, and let x be the nearest common ancestor of b and c. A group is created if and only if there is a group containing both b and c (thus x !=A) and b is the first member of that group (thus x--<pGroup==NULL). If these conditions are met, then a Group object is created for G(x), which is the primary group of b.

After creating a primary group, the process still needs to create any higher-order groups that begin with b, and insert the new groups into the tree of groups. To this end, let the most recently created group object be the current group. To find a higher-order group, the process looks for a common ancestor y of the current group's root, and the first linked child node not in the current group. If y is not A and does not already point to a group object, then a new object is created for the higher-order group. The new group becomes the current group and the previous current group is added as a child of the new group. If a higher-order group is found, but a group object already exists for it, (i.e., the group does not begin with b in this example), then the current group is added as a child of the existing group. At this point the process stops looking for higher-order groups because any higher order groups will necessarily contain members prior to b. Finally, if no higher-order group is found, then the current group is not a subgroup of any higher-order group, and it is inserted under the root of the group tree.

Once the groups in both files are enumerated, there is a left group tree and a right group tree. The process then finds relationships between groups in the left tree and groups in the right tree. To this end, the process first looks for groups that intersect, and selectively unlinks subtrees until there are no intersecting groups. Second, the roots of equal groups are linked to each other, and third, remaining groups are linked.

In one implementation, eliminating intersections is necessary to construct a valid link tree 208 that accurately reflects the hierarchical relationships between nodes in the left and right trees. Note that it is alternatively feasible to have a special node in a link "tree" that would allow multiple pointers into it, and thereby represent an intersection, however this would not be a valid tree and special processing would be needed to handle such a node when encountered.

In general, to eliminate an intersection between two groups, the process unlinks the nodes that belong to both groups, or the process unlinks the nodes that belong only to one group or the other, as generally represented via steps 1102 and 1104, and described below with reference to FIGS. 26A-33. This provides three options, and the process chooses the least costly one, i.e., the process minimizes the total value of the unlinked subtrees. In the case of multiple related intersections (e.g., G(x) intersects G(y), which intersects G(z)), the process finds the least costly set of nodes that can be unlinked to eliminate all of the related intersections. In the case where a group in one file intersects a group in another file and also intersects one or more of the latter group's ancestors, the process treats these as a set of related intersections.

After the intersections are eliminated, the process links the roots of equal groups to each other, as generally represented via step 1106 and described below with reference to FIGS. 16-19. For example, if G(x) in the left tree has the same members as G(y) in the right tree, then the process creates a new link object L(x,y). The link objects associated with the nodes in the equal groups are made children of the new link object, and the new link object is inserted into the link tree in their place.

Figure 21:
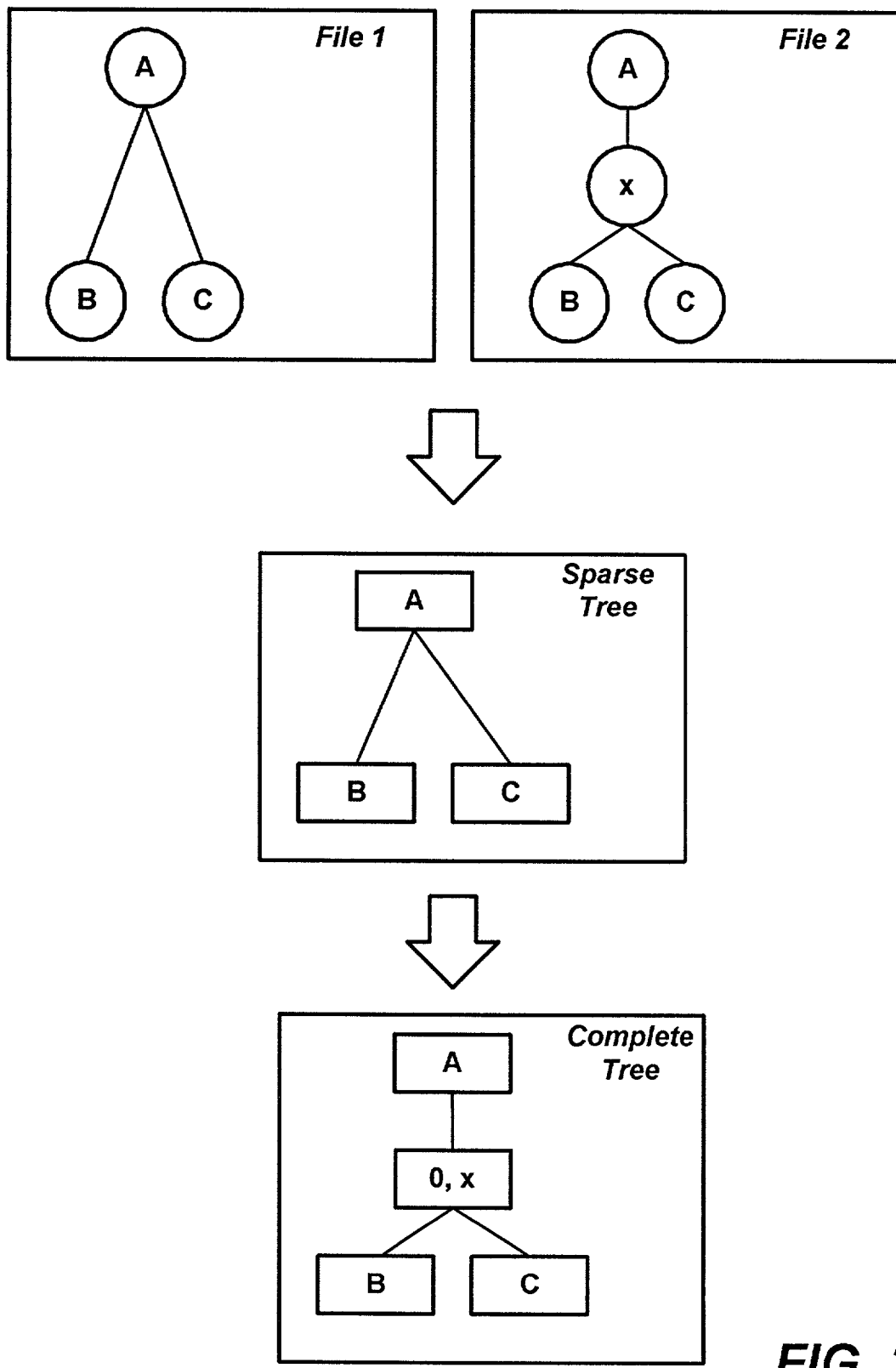
Figure 22:
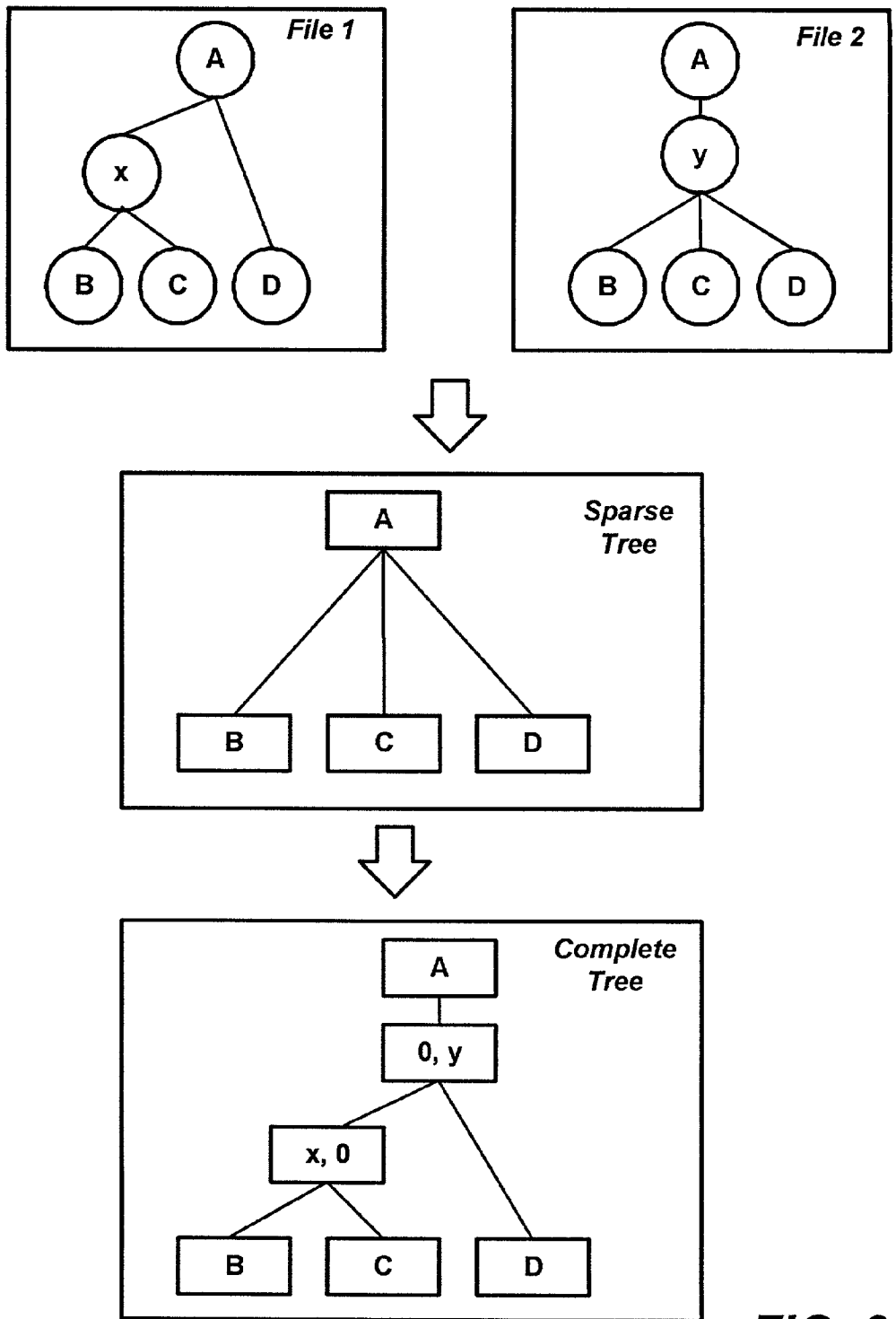

The process then inserts one-way links into the link tree for the roots of groups that occur in one XML tree, but not the other, as generally represented via step 1108 and described below with reference to FIGS. 20-22. Such groups are necessarily the unions of single- or multi-element groups in the other tree. Before the process links any union, the process recursively link any smaller unlinked groups that contain a subset of its members. Linking the groups in bottom-up order ensures that the process has already inserted link objects for the roots of the smaller groups, which makes it easier to determine where to insert the new link object.

FIGS. 12-38D provide examples that represent building a complete link tree from a given sparse link tree, wherein a sparse tree contains link objects only for mapped nodes in the two XML trees, while a complete tree contains link objects for all nodes in the two XML trees. The fact that the two XML trees may have differing numbers of nodes leads to a further difference, namely that a complete tree may contain one-way links, which are link objects that point to only one node.

The solution to building a complete link tree from a given sparse link tree is recursive, and thus the examples in FIGS. 12-38D show how to solve the problem for a subtree comprising a single root node and its immediate children. In FIGS. 12-38D, capital letters identify linked nodes, where A is the root node, while lowercase letters identify unlinked nodes. Also, corresponding (linked) nodes in the (left, right, sparse link and complete link) trees are identified by the same letter. In the drawings, circles represent XML nodes, that is, those in the left and right input trees, while rectangles represent link nodes in the link tree. Further, when a link in the complete tree points to non-matching nodes in the two XML trees, the link caption identifies both nodes, e.g., x,y. When a link node in the complete tree is a one-way node that points to only a node in either the left or right tree but not both, a zero is used to represent a NULL pointer, e.g., 0,x means there is a pointer to the right XML tree, but not the left, whereas x,0 would mean there is a pointer to the left XML tree, but not the right.

Figure 12:
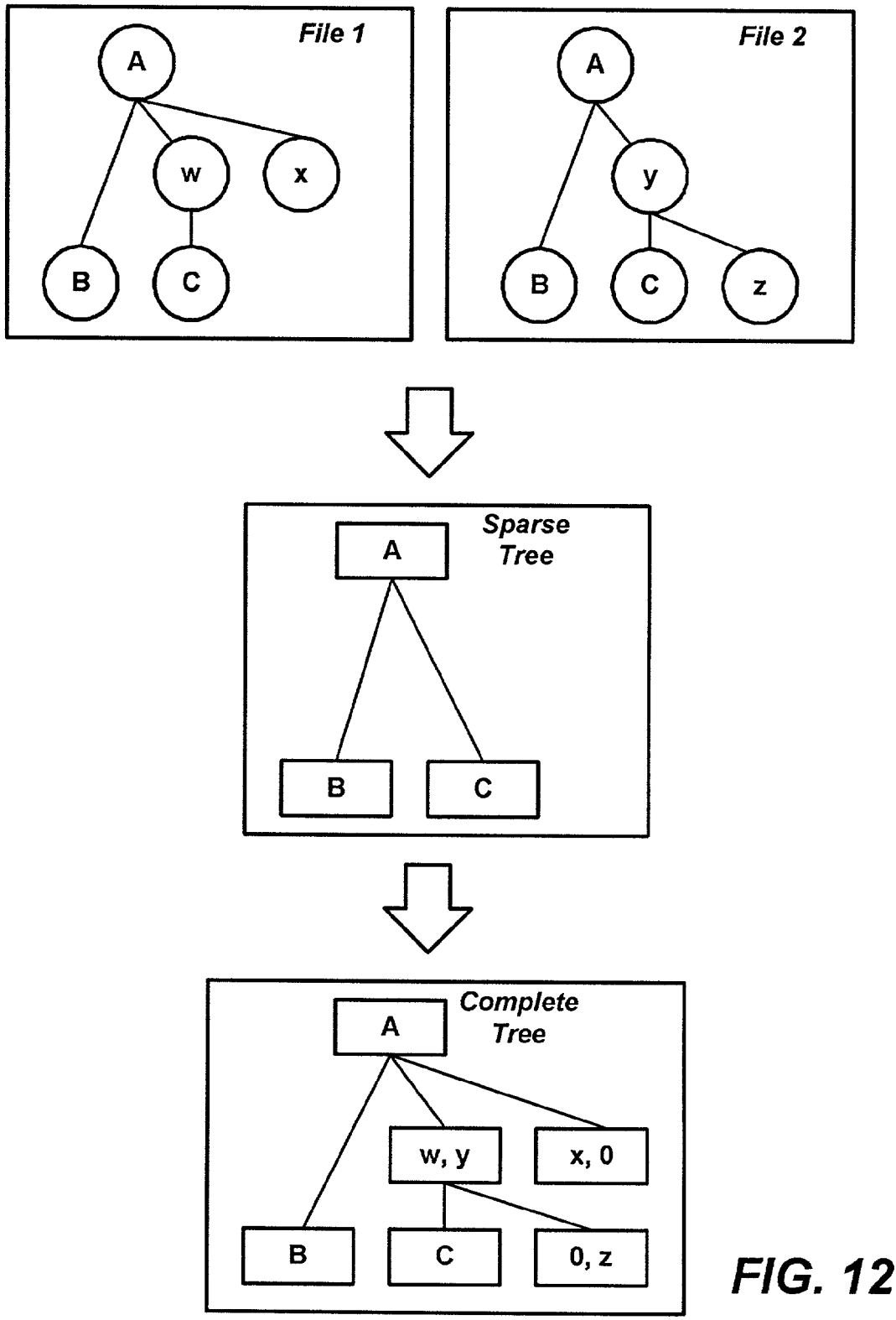
FIG. 12 is a diagram generally representing the construction of a complete link tree from left and right input trees, in accordance with an aspect of the present invention.

FIG. 12 shows an example of two XML trees, constructed from File 1 and File 2, and their corresponding sparse and complete link trees. In FIG. 12, nodes B and C are common to both files and are mapped, thus providing the sparse link tree. As the example of FIG. 12 shows, turning a sparse tree into a complete tree may entail filling both horizontal and vertical gaps. Vertical gaps are created by intervening generations of unlinked nodes between A and its linked descendants (B, C, and so forth); in FIG. 12 the nodes w and y are examples. Horizontal gaps are created by unlinked siblings of linked child nodes (e.g., z) or siblings of unlinked ancestors of linked child nodes (e.g., x). The filling of gaps will be described below, following a description of the linking of groups of nodes, since such groups may need to be linked prior to filling gaps.

More particularly, before filling gaps, the process may need to solve problems that arise when two or more child nodes are grouped by virtue of having a common ancestor between themselves and A. The various examples that follow describe how to account for these groups.

As described above, a group is a set of linked child nodes in an XML tree that is defined by a common ancestor nearer than A. The nearest common ancestor of a group is the root of the group. A group may be denoted as a set of nodes, as in {B,C}, or a group may be denoted as a function of its root, as in G(x). A single-element group is a group of only one node. Every linked node belongs to a single-element group, with the node itself as the root.

Figure 13:
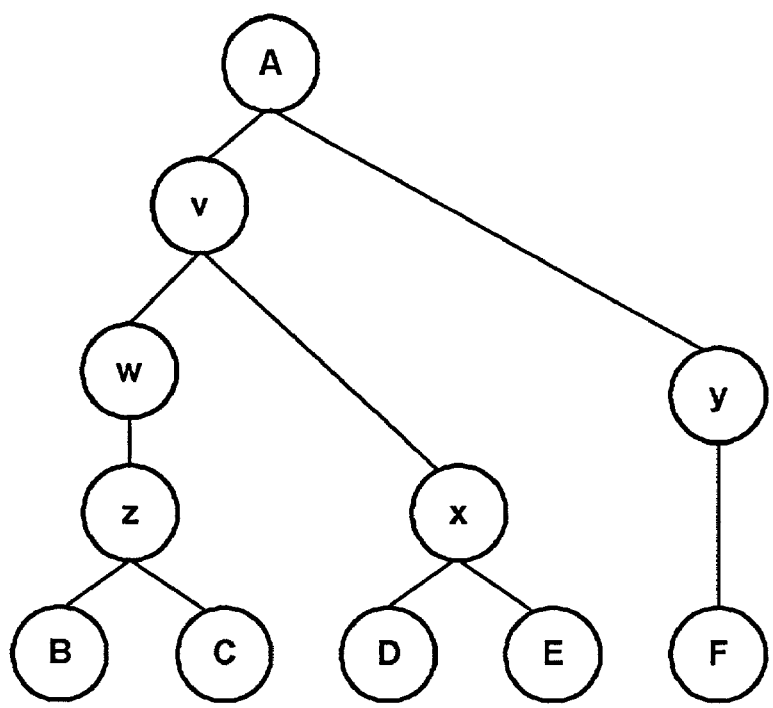
FIG. 13 is a diagram generally representing groups of nodes in input trees.
Figure 14:
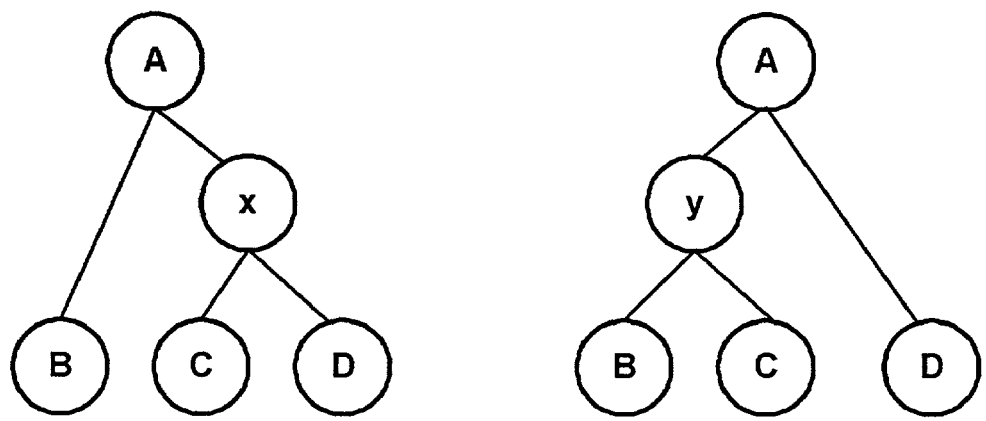
FIG. 14 is a diagram generally representing relationships between groups of nodes in input trees.

The tree in FIG. 13 contains five single-element groups and the following multi-element groups:

$G(z)=\{B,C\}$ $G(x)=\{D,E\}$ $G(v)=\{B,C,D,E\}$

Note that w and y are not the roots of any groups, nor is the set of nodes subordinate to A considered a group.

Group x is considered to contain group y if x and y are different groups, and the root of x is an ancestor of the root of y. A group is a first order group if and only if the nearest common ancestor of any two nodes in the group is the root of the group. A single-element group is always a first-order group. A group has order n (where n>1) if and only if it contains at least one group of order n−1 but no groups of order ≧n. Any group of order greater than one may be generically referred to as a higher-order group.

A node's primary group is the smallest multi-element group containing the node. In the example of FIG. 13, the primary group of B is {B,C}, while G(z) and G(x) are first-order groups, and G(v) is a second-order group.

Relations between groups are the same as between sets. For example, two groups may be equal or may intersect, one group may be a subset of another, a group may the union of two or more other groups, and so forth. Relations between groups are defined in terms of correspondence of nodes, where correspondence is defined as follows:

Node x corresponds to node y (x⇆y) if and only if x and y are the same node or x is linked to y.

Using correspondence rather than identity allows relations between groups in one XML tree and groups in another XML tree to be described. For example, the group {C,D} in FIG. 14 intersects the group {B,C} because the node C in the first tree corresponds to (is linked to) the node C in the second tree.

Figure 15:
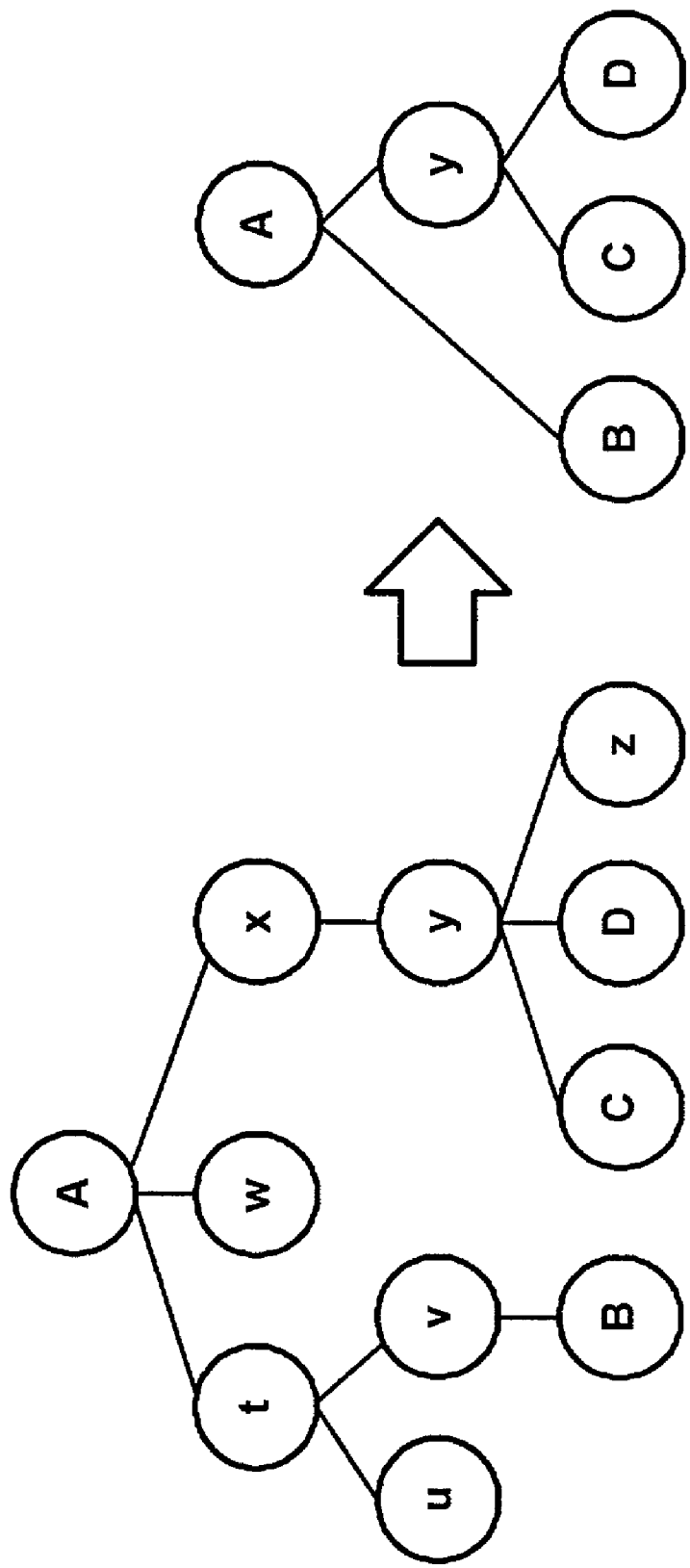
FIG. 15 is a diagram generally representing the simplification of trees.
Figure 16:
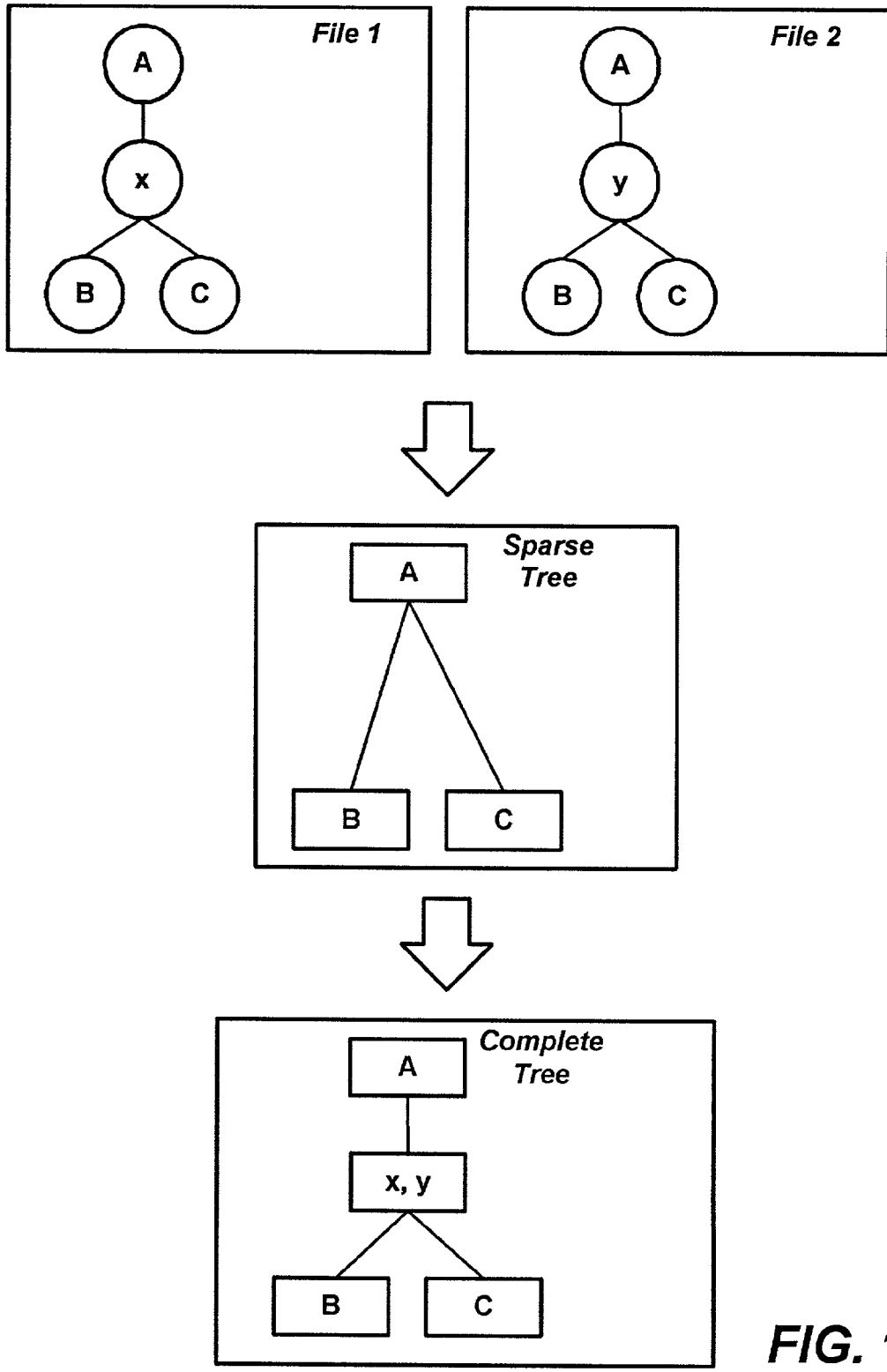

For purposes of simplicity, grouping will be generally described by including only those XML nodes that participate in grouping, namely linked nodes and root nodes. Eliminating all other nodes from an XML tree diagram creates a simplified tree diagram, as is illustrated in FIG. 15. There are an essentially infinite number of possible XML trees that map to any given simplified tree diagram. A simplified tree diagram therefore represents not one specific tree, but a class of trees in which nodes are grouped in a certain way.

As will be understood, it is necessary to consider the various ways in which nodes may be grouped before the gaps in a sparse link tree may be filled in. The following description, with reference to FIGS. 16-38D, will explain various rules that are applied, depending on what relationships exist between groups in the two XML trees, to link groups and fill in the link tree. Note that the rules, referred to as group rules 1-4, are not applied in the order they are numbered and described, however they are generally described herein with the more complex rules last, since the descriptions of the more complex rules refer back to the less complex rules. An order for applying the rules is described below.

FIGS. 16-19 represent a first rule, referred to herein as group rule 1: if a group in one file equals a group in the other file, link the roots of both groups to each other. No action is required if the roots are already linked, as in the case of single-element groups. As a result of applying this rule, the sparse tree in FIG. 16 has link objects A, B, and C therein, while in the complete tree an [x,y] link object links the roots of B and C to each other. The [x,y] link object essentially means that the left input tree has a node x that points to B and C, while the right tree has a node y that points to B and C.

Figure 17:
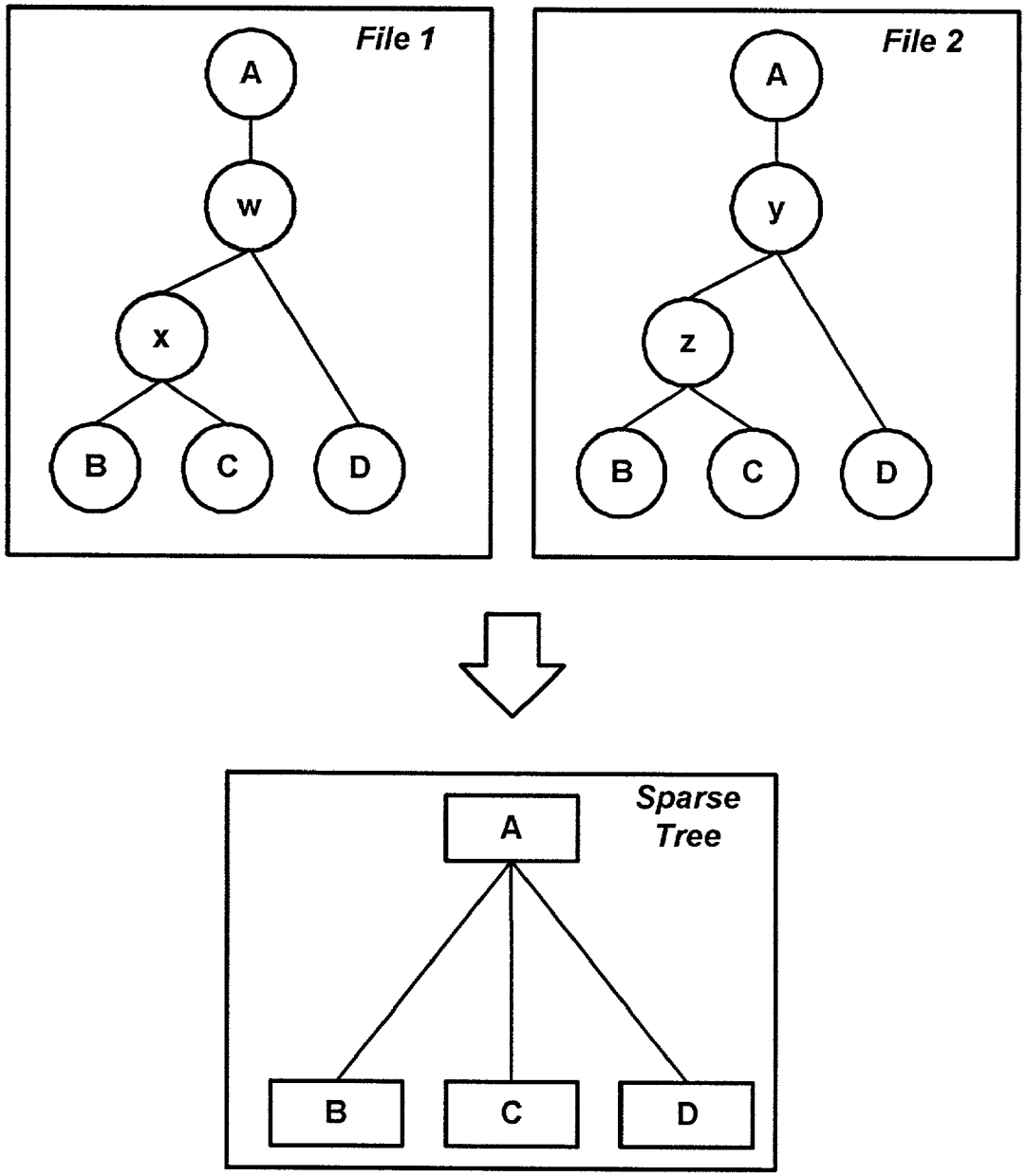
Figure 18:
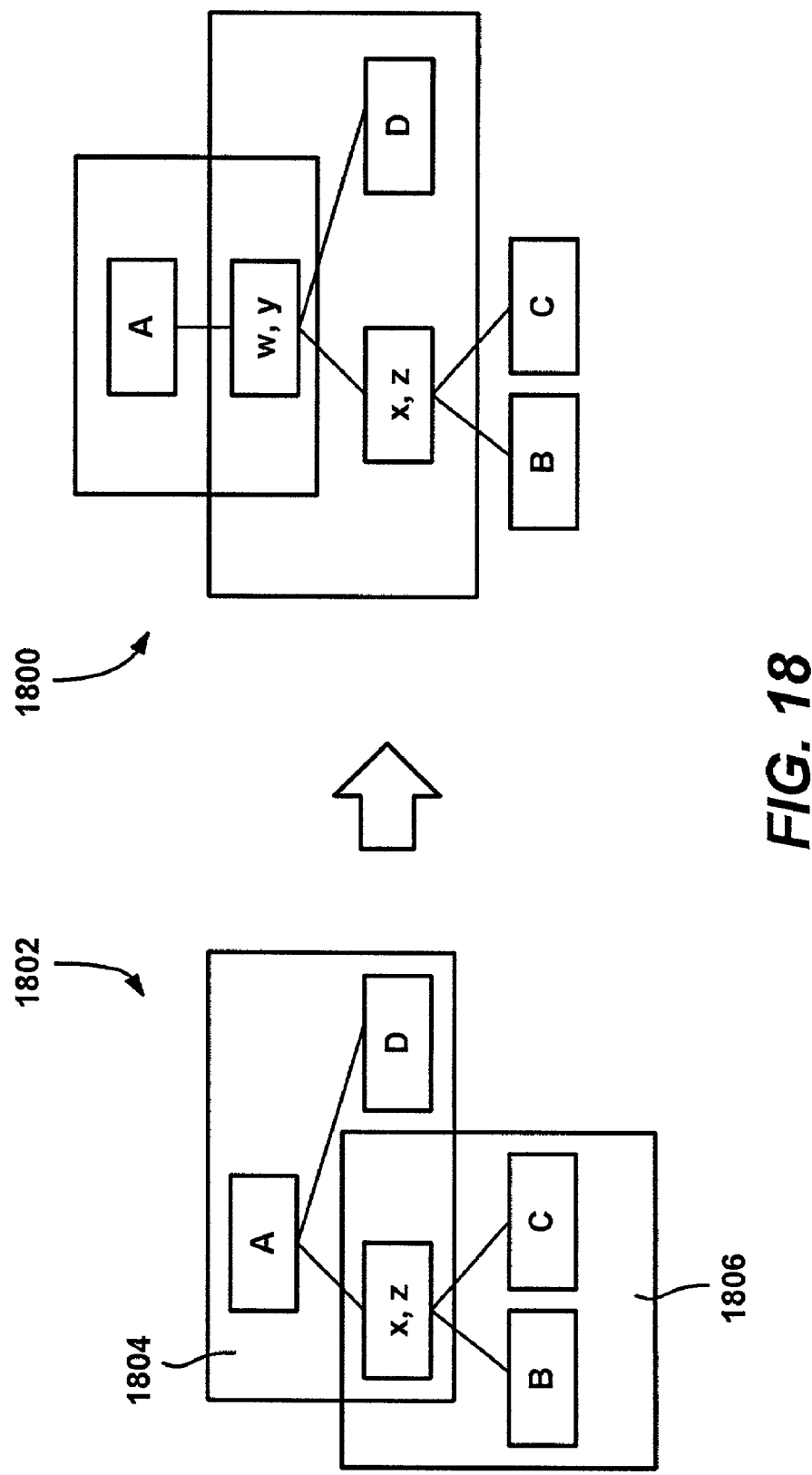

Inserting a new link object divides the subtree in two. The newly linked node becomes a linked child of the original subtree and the root of a new subtree. The significance of this becomes apparent when considering multiple levels of grouping, as represented in FIGS. 17-19. The example in FIG. 17 includes one first-order group and one second-order group.

FIGS. 18 and 19 provide two solutions to constructing the complete tree 1800 or 1900, with the difference between these two solutions being the order in which the groups are processed. The equivalence of the two solutions (completed link tree 1800 equals completed link tree 1900) shows that the order does not matter, as the same result is obtained.

FIG. 18 shows a first possible solution, namely by processing the first-order group first. The first tree 1802 shows the result of linking the roots of {B,C} via an [x,z] link object. The new link object [x,z] link object divides the subtree into the two subtrees 1804 and 1806 shown by the overlapping rectangles. The lower subtree 1806 contains no multi-element groups and requires no further processing. However, the upper subtree 1804 contains the groups {x,D} and {z,D}, which are equal because x corresponds to z. Linking the roots of these groups via the [w,y] link object produces the resultant tree 1800.

FIG. 19 shows a second possible solution, namely processing the second-order group first. In FIG. 19, the first tree diagram 1902 shows the result of linking the roots of {B,C, D}. The new Link object divides the subtree into the two subtrees 1904, 1906. The upper subtree 1904 contains no multi-element groups and requires no further processing. The lower subtree 1906 contains the group {B,C}. Linking the roots of this group produces the resultant complete tree 1900, which is the same as the resultant tree 1800 of FIG. 18.

FIGS. 20-25b represent a second group rule, referred to herein as group rule 2: if a group in one file is the union of two or more groups in the other file, modify the link tree as follows: (1) create a link object for the root of the larger group, if one does not already exist; (2) create link objects for the roots of the smaller groups, if they do not already exist; (3) make the link objects for the smaller groups be children of the link objects for the larger groups. It will become apparent that unlike group rule 1, links inserted by group rule 2 do not split the subtree, because a "one-way" link cannot be the root of a subtree.

Group rule 2 needs to be applied after group rule 1. One reason for this is that group rule 2 introduces one-way links, which would complicate group rule 1. On the other hand, group rule 1 replaces equal groups with single nodes by splitting the subtree. Leaving aside the possibility of intersecting groups, (described below with reference to group rule 3), this means any remaining multi-element groups are unions.

Figure 20:
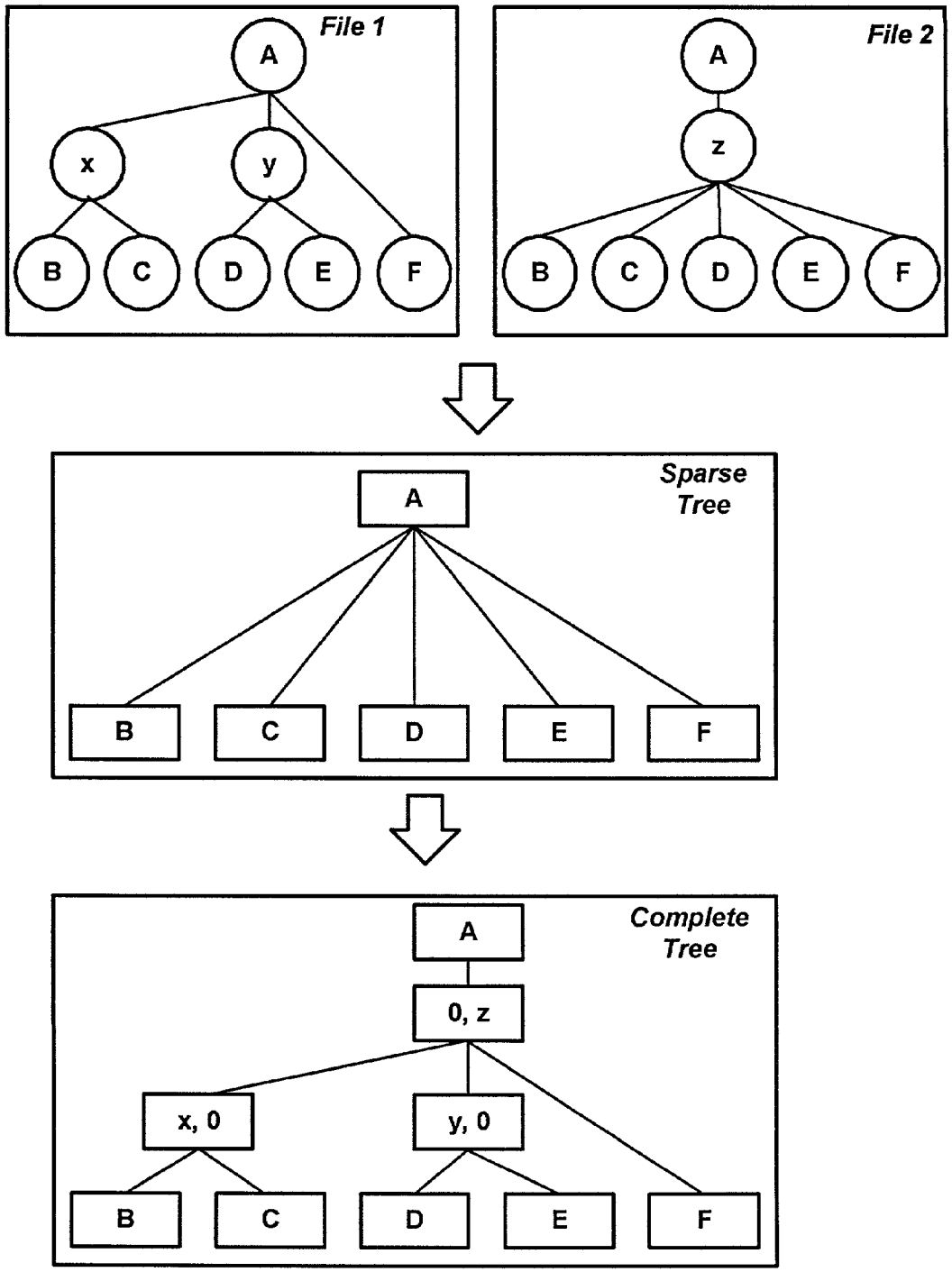
FIGS. 20-23, 24A-24C, 25A and 25B are diagrams generally representing the handling of unions of groups, in accordance with an aspect of the present invention.

In FIG. 20, the group {B,C,D,E,F} in File 1 is the union of {B,C}, {D,E}, and {F} in File 2. A link object is created for the root of each multi-element group, namely, [0,z], [x,0], [y,0]. A link object for group {F} already exists. The process then inserts the links into the tree such that [0,z] is the parent of [x,0], [y,0], and [F].

If a set of elements is grouped in one file but not in another, this may be described as a union of single-element groups. This is represented in the example of FIG. 21.

If a group in one file is the proper subset of a group in the other file, the latter group may be described as the union of the former and one or more single-element groups. Thus, in the example represented in FIG. 22, {B,C,D} is the union of {B,C} and {D}.

Figure 23:
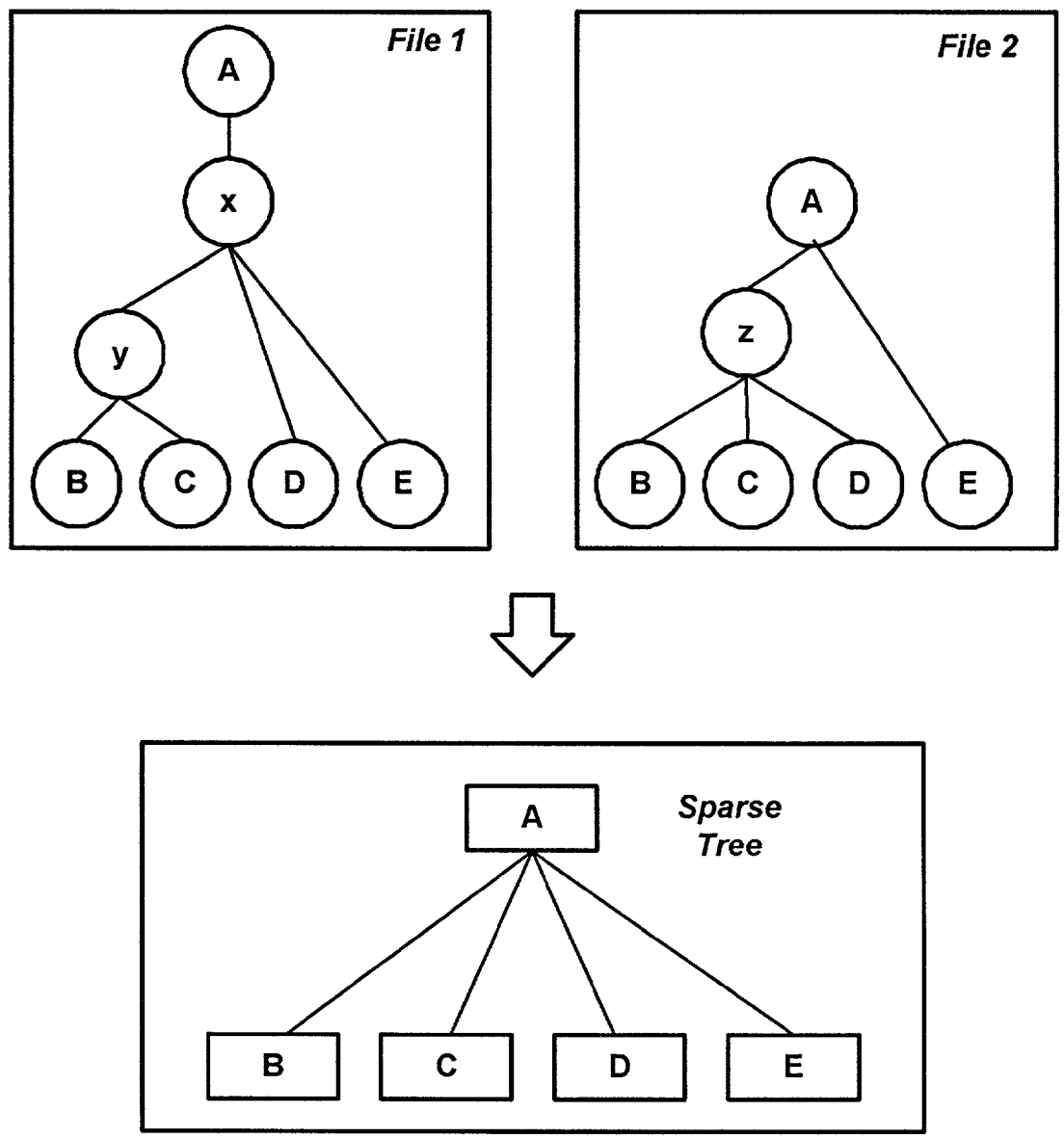

Continuing with group rule 2, FIG. 23 shows an example involving higher-order groups. The example includes the following unions:

{B,C,D,E}={B,C,D}∪{E}

{B,C,D}={B,C}∪{D}

{B,C}={B}∪{C}

As represented in FIG. 23, the unions are related (one group is the subset of another, which is the subset of another), whereby a question arises as to whether the relationship between the unions needs to be taken into account. Two solutions to completing the link tree 208 given example of FIG. 23 are shown below. Both solutions involve separate applications of group rule 2 to each union, but in different orders.

Figure 24A:
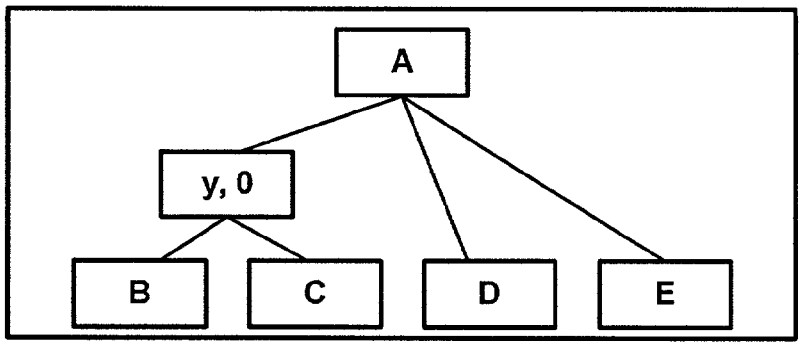
Figure 24B:
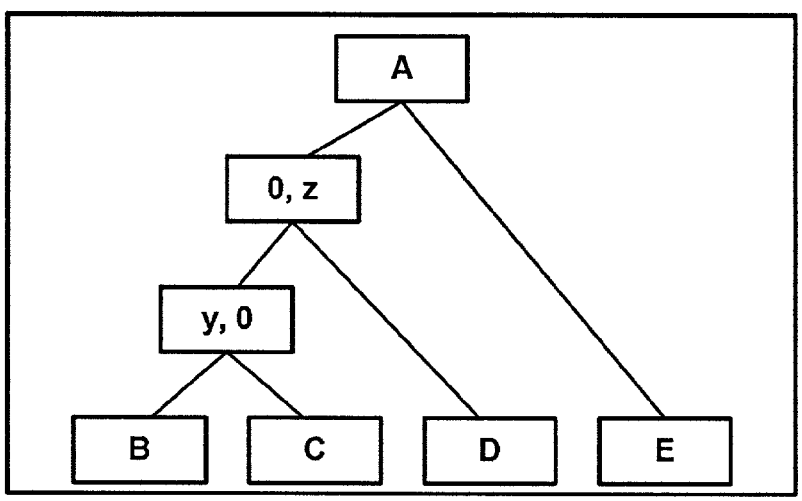
Figure 24C:
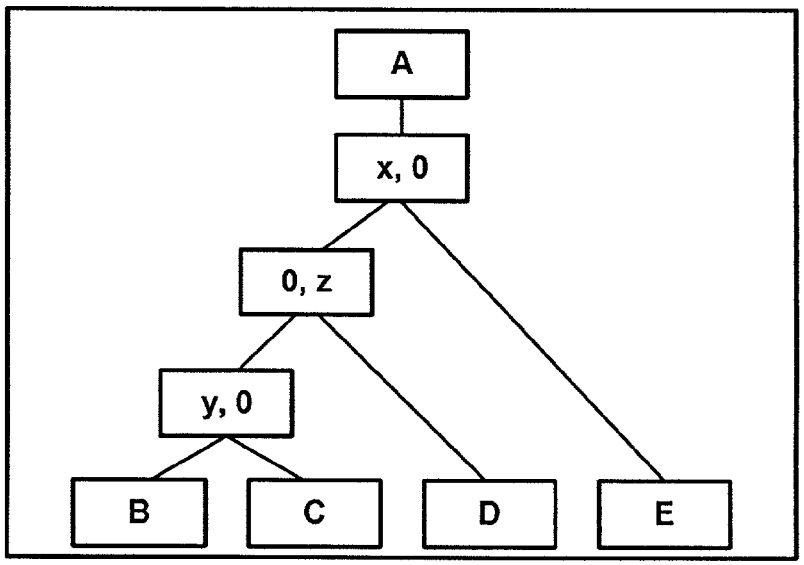

A first solution operates in a bottom-up order, as represented in FIGS. 24A-24C. Applying group rule 2 to the smallest union yields the tree in FIG. 24A. Subsequent application to the second smallest union yields the tree in FIG. 24B, and to the largest union yields the complete tree in FIG. 24C. Note that each new parent link object is always inserted as a child of A. The bottom-up approach ensures this because a link object for a larger union does not already exist. Further, note that each step results in the insertion of exactly one link object. Assuming group rule 1 has already been applied, the bottom-up approach ensures that only one link object is inserted because link objects for the smaller groups already exist.

Figure 25A:
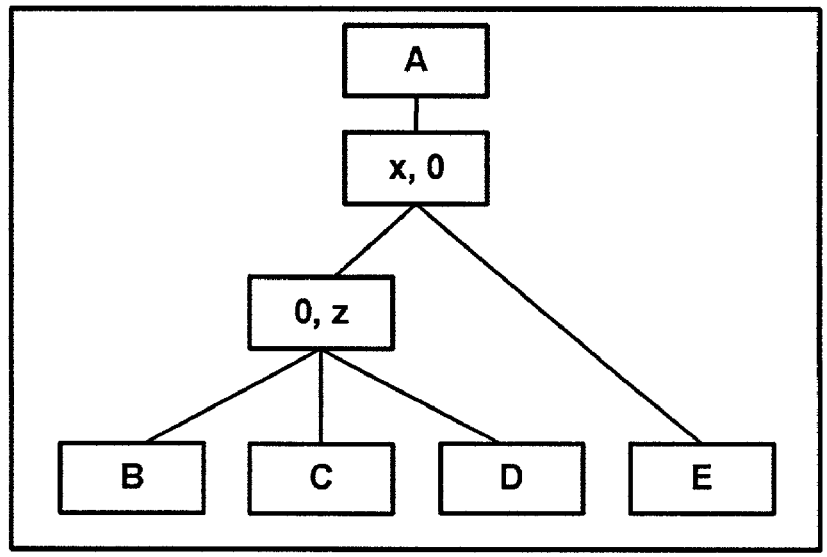
Figure 25B:
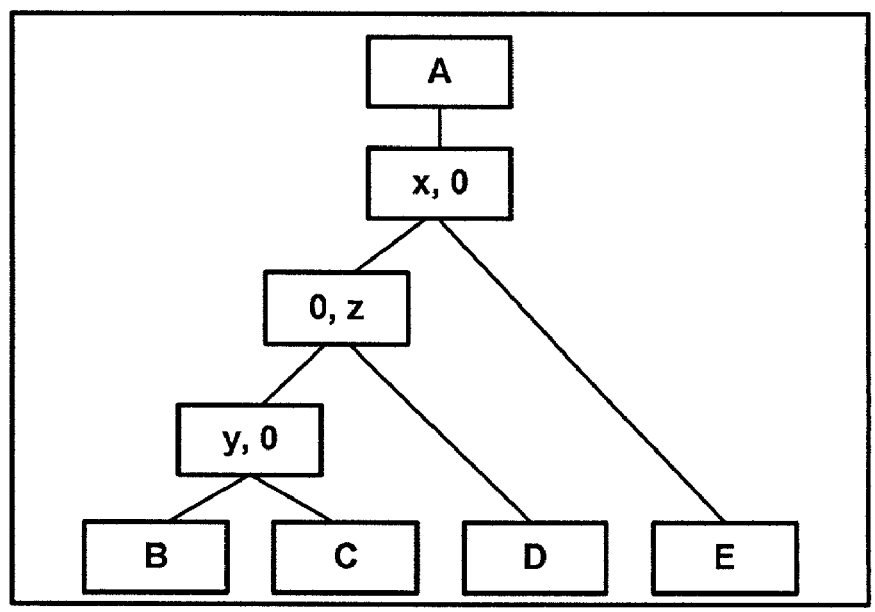

A second solution operates in a top-down order, as represented in FIGS. 25A and 25B. Applying group rule 2 to the largest union yields the tree in FIG. 25A. Subsequent application to the second largest union yields the complete tree FIG. 25B, while application to the smallest union does not modify the tree. Note that in the top-down solution, multiple link objects are sometimes inserted, and the new parent link is not always inserted under the root node A. Instead, the insertion is a child of the link previously pointed to by each of the subsets. As can be appreciated, in some cases, with the top-down order, the correct place to insert a new link might take some effort to determine.

A third possible solution is to consider is arbitrary order, which turns out to be generally the same as the top-down algorithm. Therefore, the choice is between the more complicated algorithm that can process groups in any order, and the simpler bottom-up algorithm.

Turning to an explanation of the handling of intersections between groups, FIGS. 26A-29 provide examples of intersections to describe a third group rule referred to herein as group rule 3: if a group in one file intersects a group in another file, but neither group is a subset of the other, then eliminate the intersection by doing one of the following: (a) unlink nodes that are in both groups, leaving two non-intersecting groups; (b) unlink nodes that are only in the first group, making the first group a proper subset of the second; or (c) unlink nodes that are only in the second group, making the second group a proper subset of the first. The preferred solution in any particular case is the one that minimizes the total value (size) of the unlinked nodes. Note that group rule 3 needs to be applied before group rule 2.

Figure 26A:
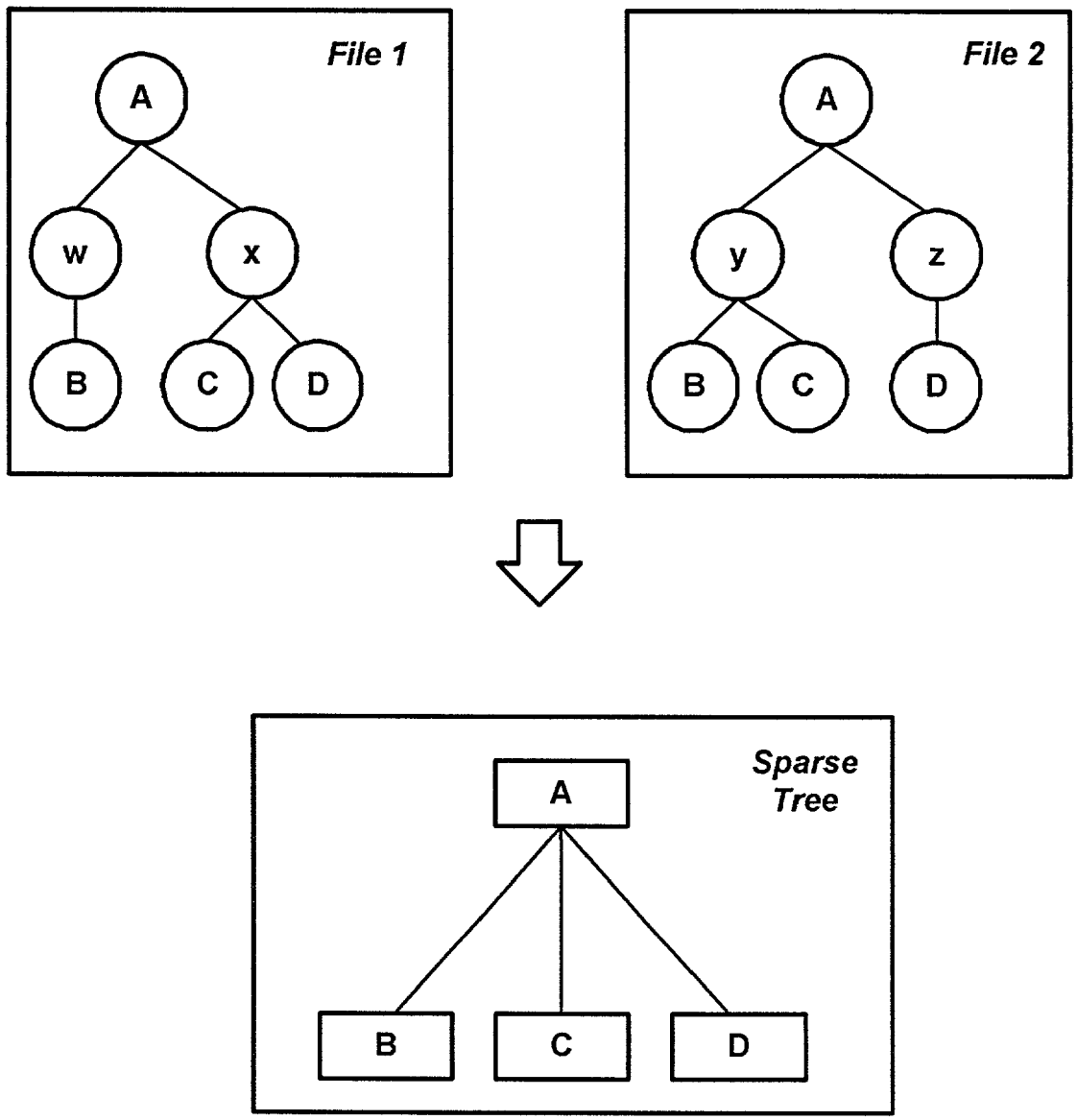
FIGS. 26A-26C and 27-29 are diagrams generally representing the handling of intersecting groups, in accordance with an aspect of the present invention.

Group rule 3 is necessary because a complete valid link tree cannot be constructed as long as groups intersect, such as in FIG. 26A, where the group {C,D} intersects the group {B,C}. The example in FIGS. 26A-26C demonstrates how application of group rule 2 in the presence of intersecting groups would lead to an invalid tree, wherein two parent nodes point to the same child, in a diamond-shaped configuration. The example thus demonstrates the necessity of both group rule 3 and its corollary, i.e., that intersections must be eliminated before group rule 2 is applied. Note that this constraint does not apply to group rule 1, since the invalid tree configuration surfaces only when trying to link the roots of two groups that intersect, whereas group rule 1 deals only with equal groups.

Figure 26B:
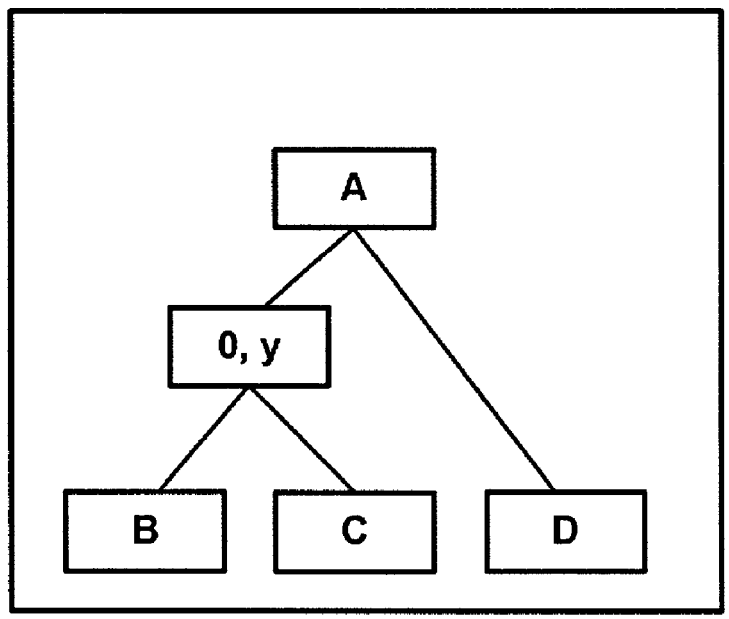
Figure 26C:
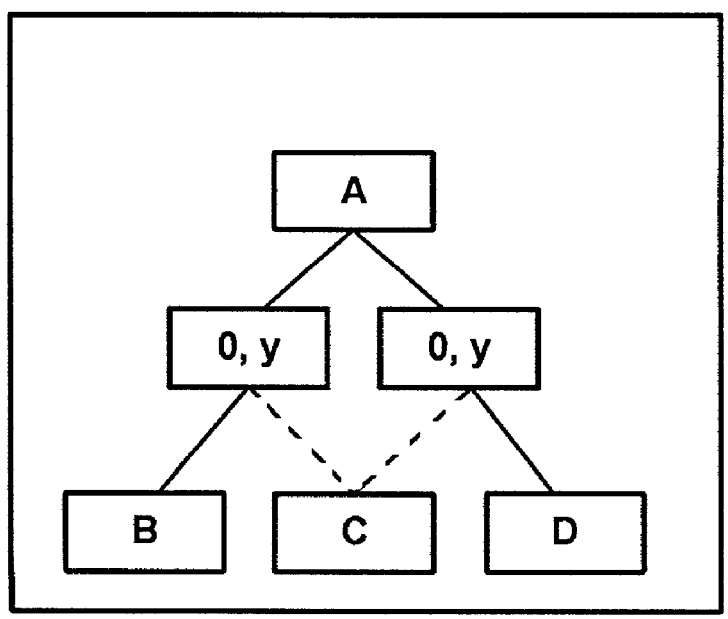

As represented in FIGS. 26B and 26C, if applied prior to group rule 3, group rule 2 would call for [C] to be a child of the new Link object, but [C] is already a child of [0,y]. This problem is eliminated by applying any of the three solutions (a-c) prescribed by group rule 3, as described below with reference to FIGS. 27-29, which correspond to solutions (a-c), respectively. The calculation of the least cost, which may comprise counting characters (or some other unit such as words) to obtain the some of the sizes of each node, may be used to determine which nodes to unmap to eliminate the intersection. For example, one straightforward way to determine a size of a node is to use offsets, i.e., determine the difference of the start of the node to the end of the subtree. Note that this may be done for every node in a preprocessing step, but because such a size comparison is ordinarily not necessary for every node, it may be more efficient to wait until such a comparison is needed before determining the size.

Figure 27:
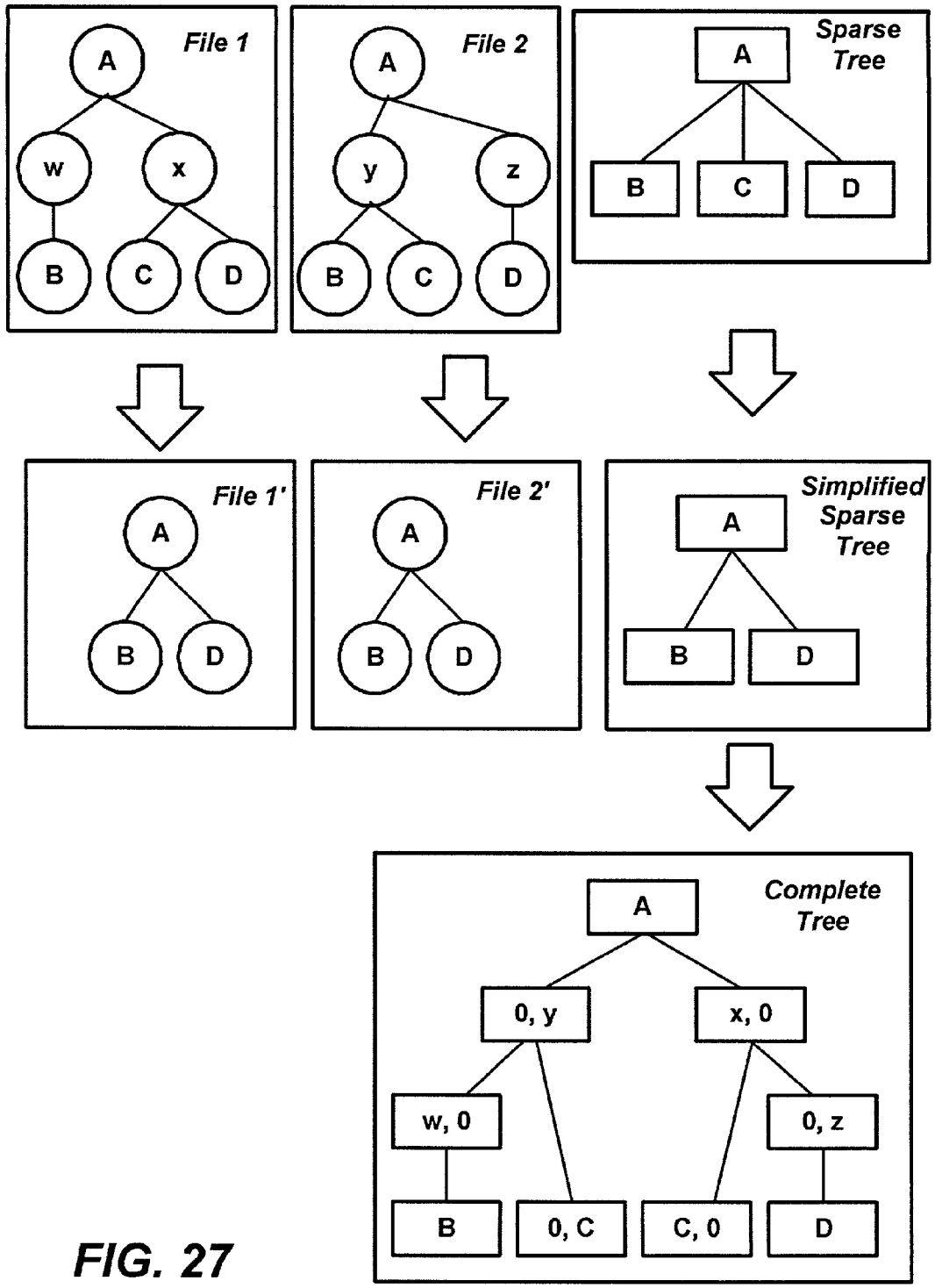

FIG. 27 represents solution (a) of group rule 3, namely unlinking nodes that are in both groups. As shown in FIG. 27, by replacing C with two one-way link nodes, thereby making C no longer a linked node, a simplified sparse tree is provided. Thereafter, applying rule 1 as described above gives the complete tree, including all nodes present in the original diagram.

Figure 28:
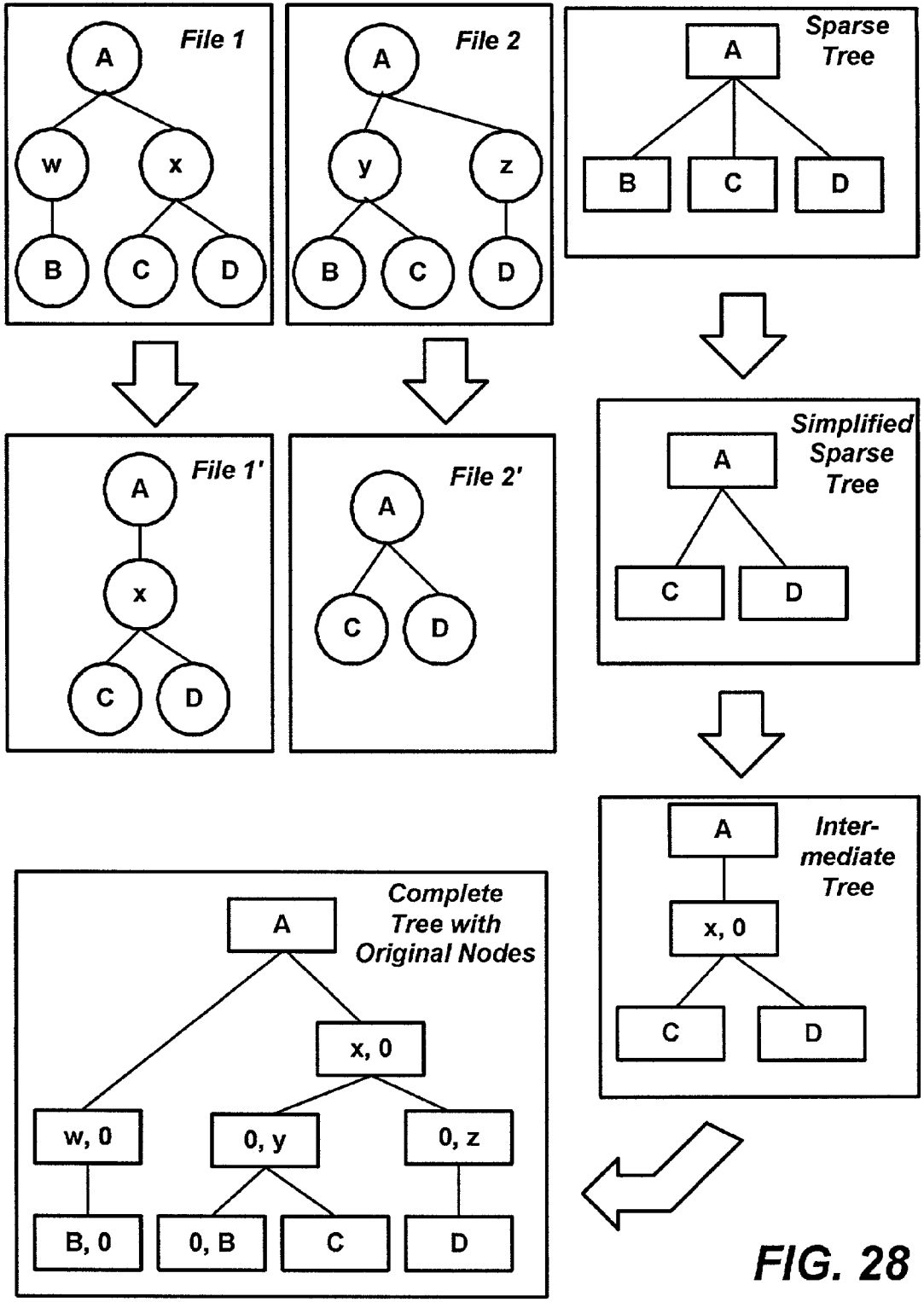

FIG. 28 represents solution (b) of group rule 3, namely unlinking nodes that are only in the first group. As shown in FIG. 28, with B no longer a linked node, the sparse tree is simplified. Thereafter, applying rule 2 as described above gives the complete tree, including all nodes present in the original diagram.

Figure 29:
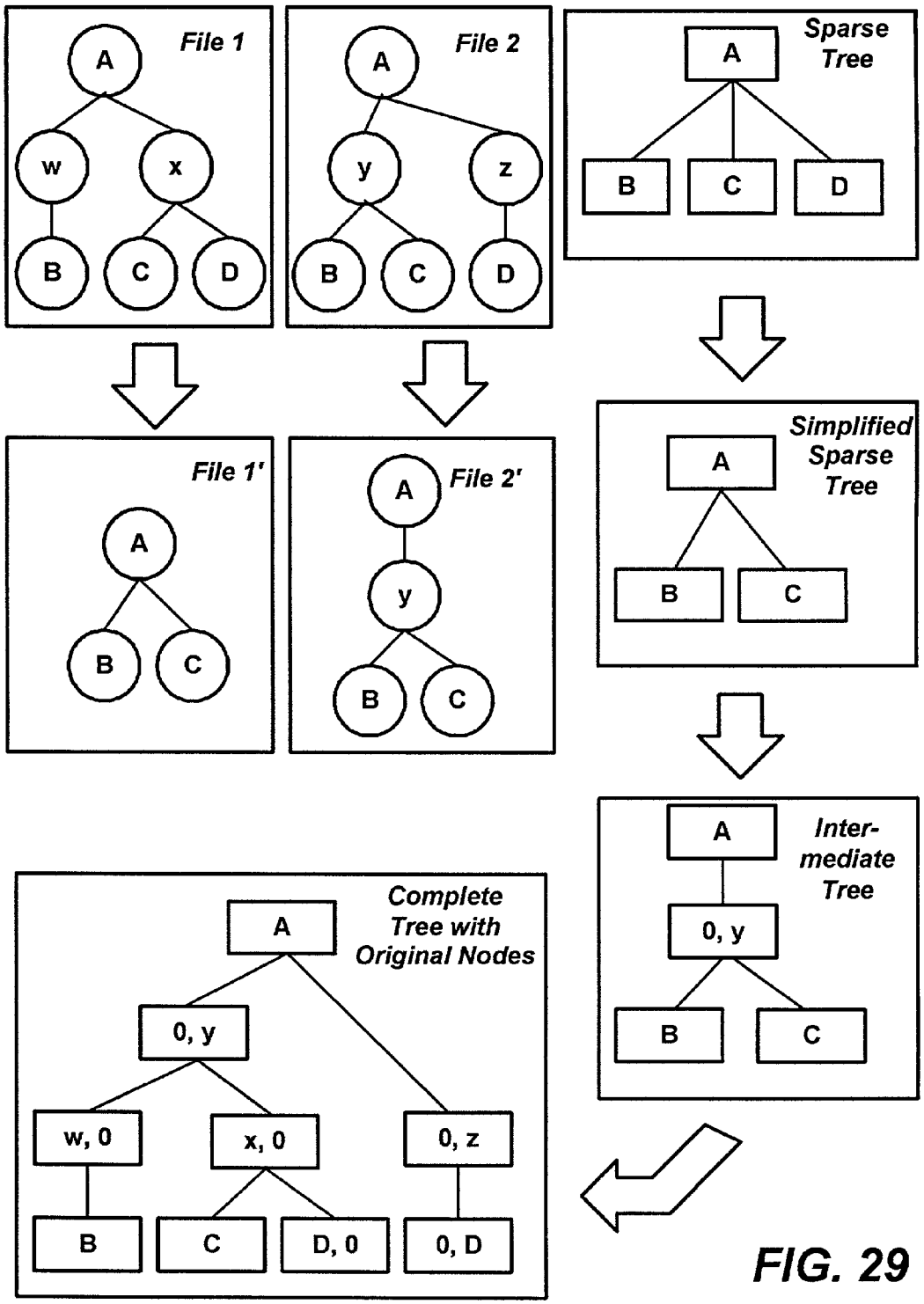

FIG. 29 represents solution (c) of group rule 3, which operates by first unlinking nodes that are only in the second group. As shown in FIG. 29, by unlinking D, the sparse tree is simplified. Thereafter, applying rule 2 as described above gives the complete tree, including all nodes present in the original diagram.

A fourth rule, which is directed to related intersections referred to herein as Group rule 4, is described with reference to FIGS. 30-35B, and generally states: if two or more intersections are related, find the least-cost set of nodes that can be unlinked to eliminate all of the related intersections, and unlink the nodes of that set. Two intersections are related if they involve a common group, i.e., if one group intersects two other groups, then the two intersections are related. Relatedness is transitive; thus, if intersection A is related to B and B is related to C then A is related to C.

To find the least-cost set of nodes, the process (1) constructs a Boolean expression for each intersection, wherein the expression is a disjunction with three terms, representing the three alternate solutions given by rule 3, and each term is a node or conjunction of nodes; (2) combines the Boolean expressions into one large expression in standard conjunctive form; and (3) finds the least-cost set of nodes for which the expression is true.

Figure 30:
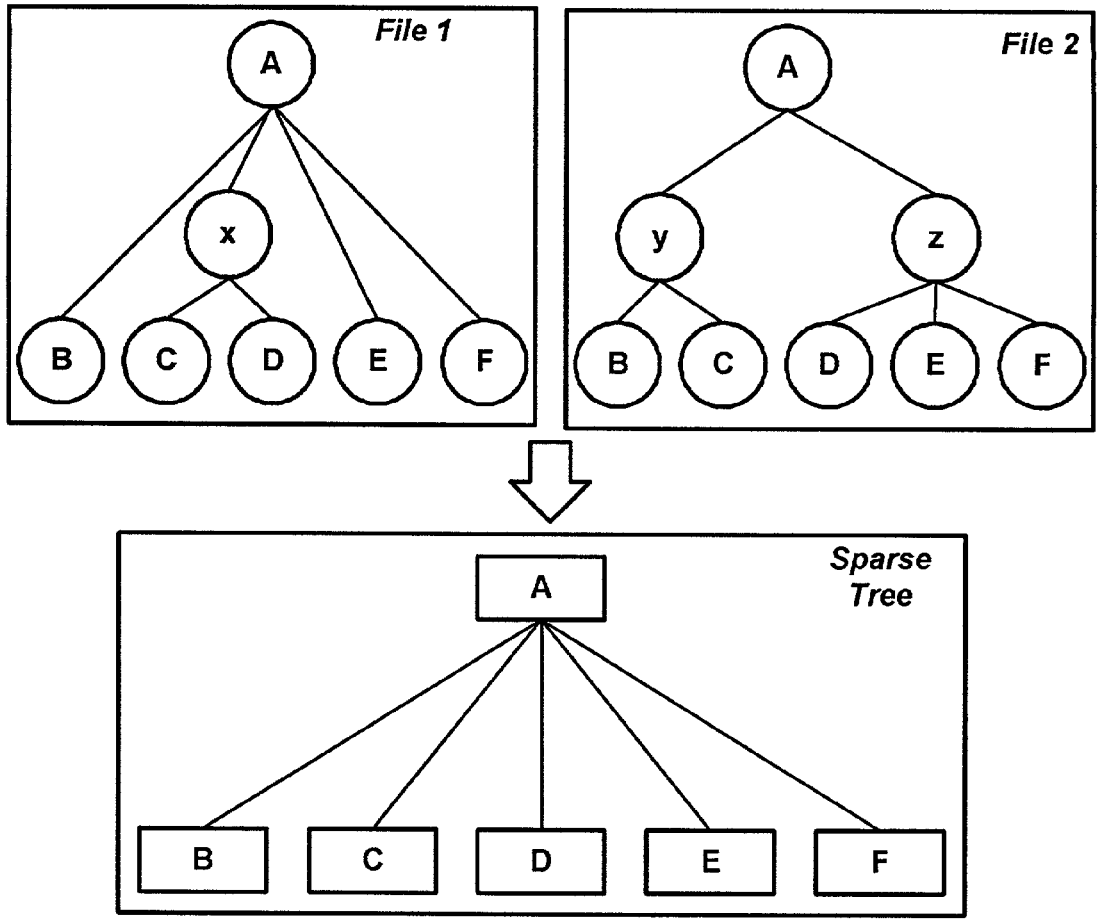

To illustrate this rule, consider the example of FIG. 30, in which the group {C,D} intersects both {B,C} and {D,E,F}. The first step is to construct an expression for each intersection:

{C,D}∩{B,C}→B|C|D

{C,D}∩{D,E,F}→C|D|(E&F)

and a second step combines the Boolean expressions:

(B|C|D) & (C|D|(E&F)).

Figure 32:
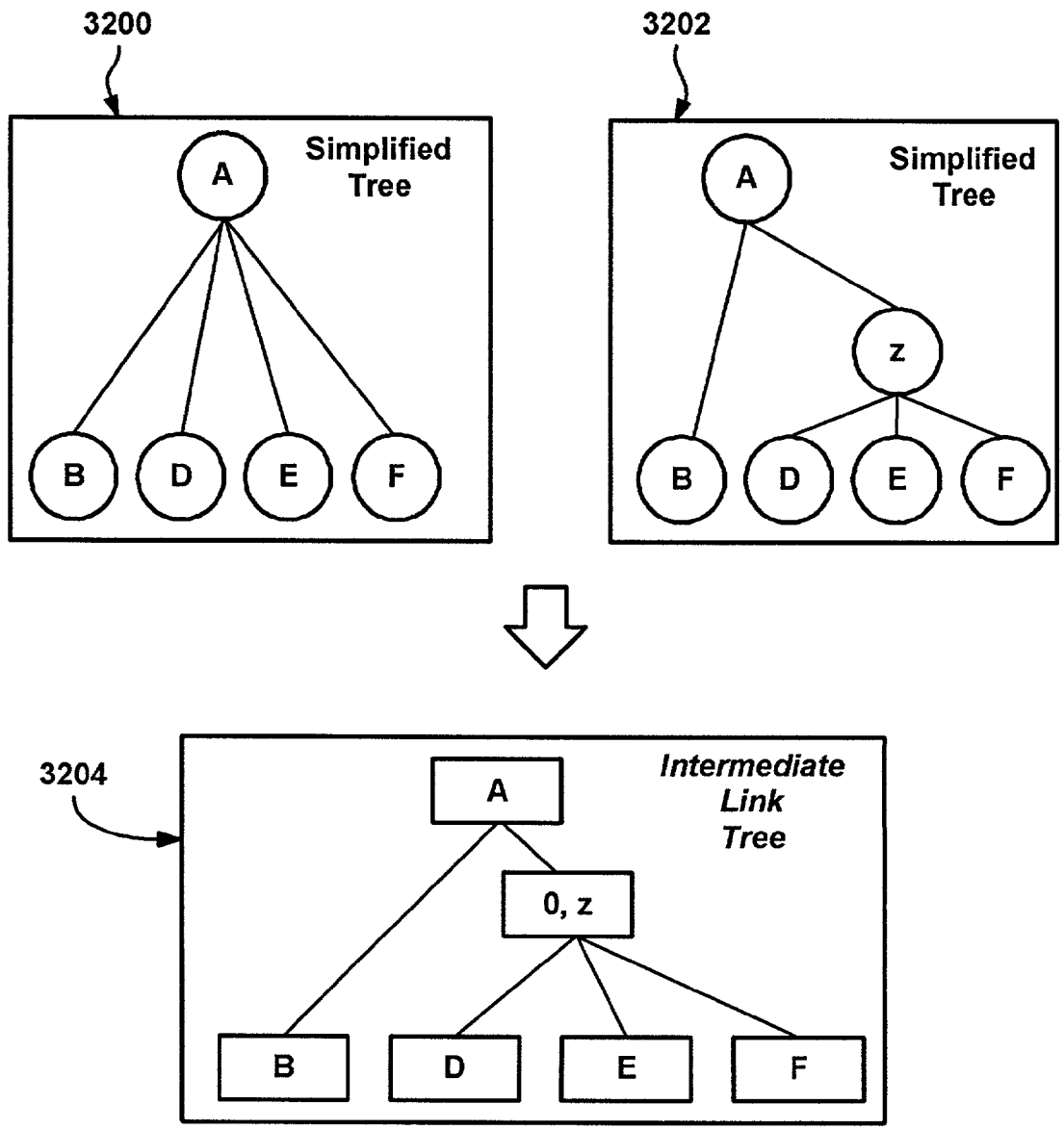
Figure 33:
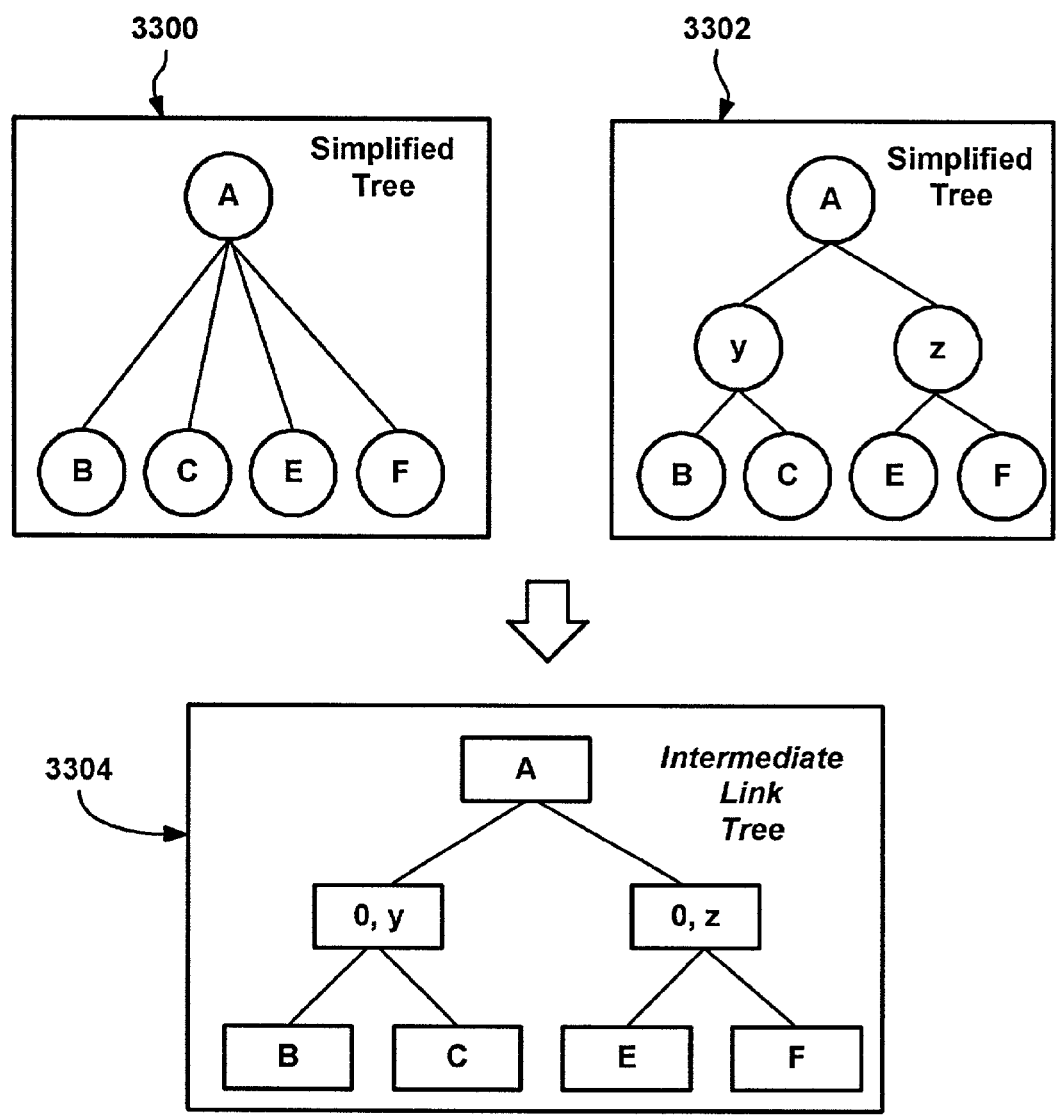
Figure 36:
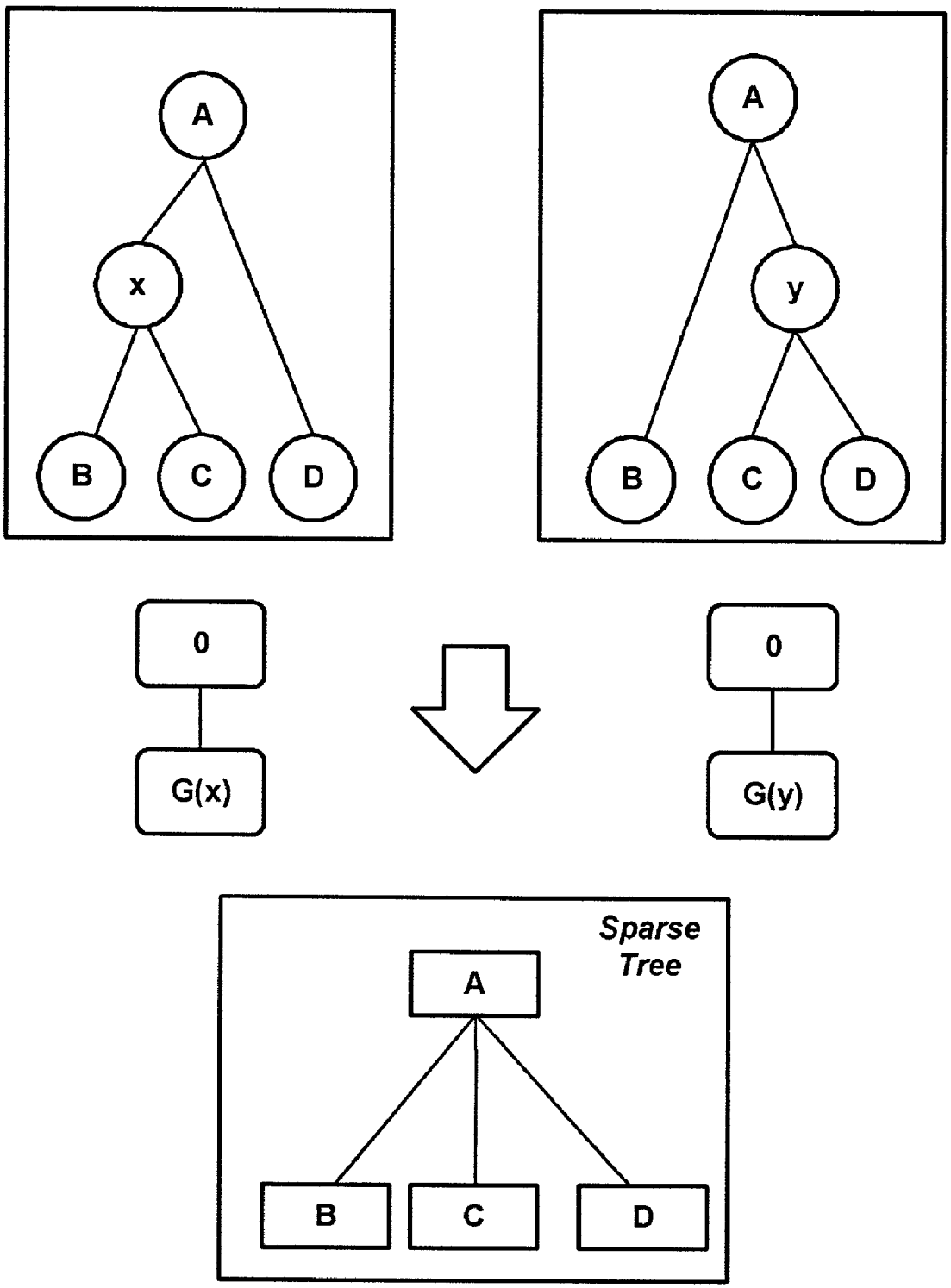
FIG. 36 is a diagram generally representing the unlinking of nodes in accordance with an aspect of the present invention.

In a third step, the least-cost set of nodes for which the expression is true is determined, based on the three possible solutions of {B,E,F}, C, or D. Each solution is illustrated in FIGS. 31-33, with the actual solution being the least costly of these three, as described below.

Figure 31:
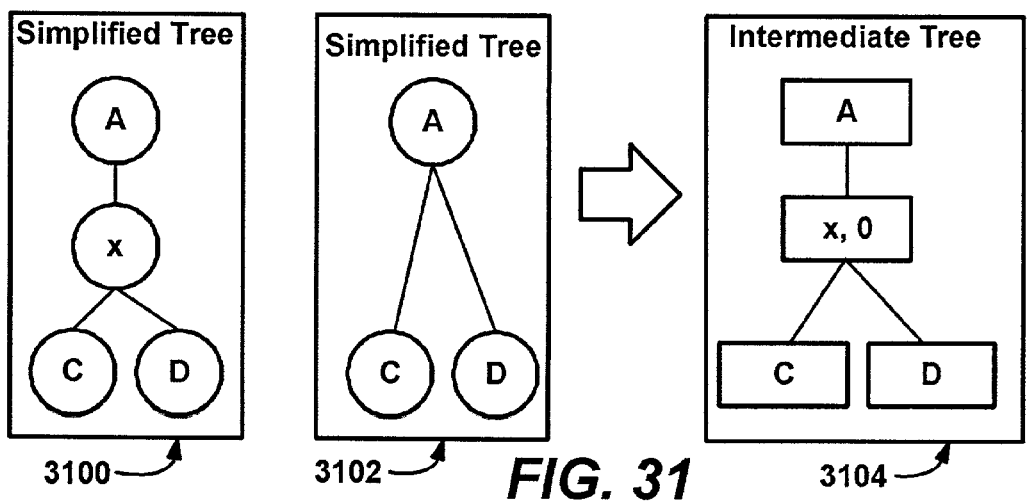

FIG. 31 represents unlinking B, E, and F, which yields the simplified XML trees 3100 and 3102. Thereafter, applying rule 2 gives the intermediate link tree 3104. FIG. 32 represents unlinking C, which yields the simplified XML trees 3200 and 3202. Thereafter, applying rule 2 gives the intermediate link tree 3204. FIG. 33 represents unlinking C, which yields the simplified XML trees 3300 and 3302. Thereafter, applying rule 2 gives the intermediate link tree 3304.

FIGS. 34A and 34B describe handling intersections with higher-order groups. More particularly, it is possible for a group in one file to intersect a group in the other file, as well as one or more of the latter group's ancestors. As will be seen, the correct approach treats the intersections as related intersections according to group rule 4 (as opposed to treating it as one intersection, e.g., between the highest-order groups that intersect). To demonstrate, consider the example of FIG. 34A, in which G(x) intersects both G(y) and G(z). If the two intersections were considered separately, rule 3 gives the following solutions:

$$G(x) \cap G(z) \rightarrow B|C|D$$

$$G(x) \cap G(y) \rightarrow B|C|(D\&E)$$

Although solving the second intersection also solves the first, solving the first does not necessarily solve the second. Always eliminating the intersection involving the highest order group would seem to work as a general rule, however, the counter-example of FIG. 34B demonstrates the error in such a rule. In this example, the two intersections of FIG. 34B have the following solutions:

$$G(x) \cap G(z) \rightarrow B\&C|D|E$$

$$G(x) \cap G(y) \rightarrow B|C\&D|(E\&F)$$

Here, solution (c) to the first intersection is not a solution to the second intersection, and solution (a) to the second intersection is not a solution to the first. Thus, the correct approach is to treat the intersections as related intersections and apply group rule 4.

The third step of the algorithm for group rule 4, i.e., finding the least cost solution to a Boolean expression in standard conjunctive form, is described with reference to FIGS. 35A and 35B. By way of example, consider the following expression:

$$(B|C|D) \& (C|D|(E\&F))$$

Picking one term from each disjunction forms a solution. It is easy to imagine a brute force algorithm that would generate all possible combinations of terms. In the example, because each disjunction has three terms, the number of possible solutions for N intersections is 3N. In this example, the following are the possible solutions for the above equation:

$$\{B,C\}|\{B,D\}|\{B,E,F\}|$$

$$\{C\}|\{C,D\}|\{C,E,F\}|$$

$$\{D,C\}|\{D\}|\{D,E,F\}$$

Since the least cost solution is desired, solutions that are supersets of other solutions may be ruled out. In the present example, six of the above solutions can be eliminated in this way, leaving only $\{B,E,F\}|\{C\}|\{D\}$. However, the brute force algorithm is exponential, and thus narrowing the scope of the search is generally worthwhile in terms of performance. To this end, rather than eliminating the supersets after the solutions are enumerated, the present invention works to initially avoid their enumeration, as described below.

Note that one way to narrow the search might be to simplify the Boolean expression itself, by factoring out common terms. For example, the Boolean expression above can be transformed as follows:

Factor out C: $C|((B|D) \& (C|(E\&F)))$

Factor out D: $C|D|((B) \& (E\&F))$

Rewrite: $C|D|\{B,E,F\}$

Unfortunately, in practical applications, simplifying the original expression might not always be as straightforward as in this example. More particularly, consider three related intersections where the first and second share a common term and the second and third share a different common term; it would be difficult to rewrite the expression to factor out both common terms. Another problematic example is shown in FIGS. 35A and 35B, in which the two disjunctions do not have a term in common, yet three of the nine solutions generated by the brute force algorithm are supersets of simpler solutions.

FIGS. 35A and 35B describe an alternative way to narrow the search, which operates by simply adding some conditional checks to the brute force algorithm. The general idea is to prune the search tree, eliminating branches when proven in advance that they will not yield a least-cost solution. The examples in FIGS. 35A and 35B illustrate this approach.

The example contains the intersections $\{C,D,E\} \cap \{B,C\}$ and $\{C,D,E\} \cap \{E,F\}$. A solution that eliminates both intersections needs to satisfy the expression $(B|C|(D\&E)) \& ((C\&D)|E|F)$. In general, the set of all possible solutions to the Boolean expression (the "solution space") may be thought of as a tree, and the brute force algorithm as an exhaustive traversal of the tree. The root node would thus represent the start of the search as represented in FIG. 35B, and has one child for each of the three solutions to the first intersection; each child node in turn has one child for each of the three solutions to the next intersection, and so on for all N intersections. The height of the tree is thus N+1 and the number of leaf nodes is 3N.

Rather than performing an exhaustive search of the solution space, subtrees known in advance to be "dead-ends" may be skipped. Optimizations that help identify dead ends are described below:

Optimization A: for any given node in the search tree, let the partial solution for that node be the union of the links specified by that node and all of its ancestors. If the partial solution is a superset of any of the solutions for the next intersection, then the next intersection can be skipped. Thus, in FIG. 35B, optimization rule A says the next intersection for D&E (in the dashed box) can be skipped.

Optimization B: if the set of links specified by a node in the search tree is a superset of any solution for any previous intersection then the node can be skipped, unless for each previous intersection where this occurs, the first subset is in the partial solution. Thus, in FIG. 35B, optimization rule B says the subtree rooted in C&D (in the dashed box) can be skipped.

These two optimizations together eliminate solutions which are supersets of other solutions. However, the algorithm remains exponential even with these enhancements. Therefore, for larger N a less costly way to find a reasonable (but not necessarily optimal) solution is desired. In other words, for a small number of intersections, the brute force algorithm described above can be used with or without optimizations, while for larger numbers of related intersections, a fallback algorithm that can efficiently find a reasonable (but not necessarily optimal) solution is needed.

To this end, let the constant K be the largest number of related intersections for which an optimal solution is being sought. For example, reasonable values of K might be in the range 3-6. A solution for N related intersections may be found as follows:

A) Start with the conjunction of N terms, each of which is the disjunction of three terms. The terms should be ordered such that closely related terms are likely to be close to each other.

B) While N>K do the following:
  (1) Apply the brute force algorithm (with or without optimizations) to the first K disjunctions.
  (2) Synthesize a disjunction containing the three lowest-cost solutions produced by the algorithm.
  (3) Replace the first K disjunctions with the newly synthesized disjunction. Note that the loop terminates because each iteration decreases the value of N by K−1.

C) At this point N<=K so apply the brute force algorithm to the remaining disjunctions and select the lowest-cost solution.

This algorithm does require the ability to synthesize a disjunction of three partial solutions, each of which is an arbitrary set of links. This requirement might make the representation of a solution more complex. Any one solution given by rule 3 could be represented by a pair of link pointers, since each solution is always a continuous sequence of sibling link objects. To allow for such a simplified representation, the algorithm can be revised as follows:

(A) Start with the conjunction of N terms, each of which is the disjunction of three terms. The terms should be ordered such that closely related terms are likely to be close to each other.

(B) The partial solution is initially the empty set.

(C) While N>K apply the brute force algorithm to the first K disjunctions, add the lowest-cost solution to the partial solution, and erase the first K disjunctions.

(D) At this point N<=K so apply the brute force algorithm to the remaining disjunctions and select the lowest-cost solution.

The difference between these algorithms is that each time K terms are processed, only one solution (rather than the best three) is retained.

In order to apply rule 3, the process needs to be able to find intersections. The problem can be stated as follows: for any given group, find all other groups that intersect the given group. To this end, the process iterates over the links in the given group, and for each link finds the primary group for the linked XML node in the opposite file. Let the primary group be a candidate group.

Each candidate group has at least one linked node in common with the given group; therefore it either intersects the given group, or is a superset or subset of the given group. It is straightforward to determine which relationship applies.

If a candidate group is a superset of the given group, then its ancestor groups will also be supersets of the given group, whereby the process moves on to the next candidate. If a candidate group intersects the given group, then an intersection is detected. If a candidate either intersects the given group or is a subset, then the candidate group's parent is also treated as a candidate.

Similarly, in order to apply group rule 4, the process needs to be able to find related intersections. Two groups A and B are related if A intersects B, or A intersects another group related to B. These concepts are connected, in that if two related groups do not intersect directly, they are related because there is a set of related intersections involving both groups. Finally, an intersection is related to a given group if the two intersecting groups are related to the given group.

To find the intersections related to a given group, the following algorithm can be used: find all groups that intersect the given group. For each intersecting group, if that group has not already been visited, add the intersection to the set of related intersections and apply the algorithm recursively to the intersecting group. Not revisiting already visited groups avoids infinite recursion. One way in which to determine whether a group has been already visited is to add a Boolean flag to each group.

As described above, a general goal is to build a Boolean expression used in group rule 4. Therefore, for each related intersection found, a new term is added to the expression. The term represents the disjunction of the three possible solutions prescribed by rule 3; it has three members, each of which is a set of links (represented by a beginning and end pointer) to be deleted.

As also described above, the end result of finding related intersections and applying group rule 4 is a set of link objects that need to be deleted, that is, linked nodes that need to be unlinked. Consider the example of FIG. 36, where G(x) and G(y) intersect, and wherein in this example the optimal solution is determined to be the one that unlinks D.

Unlinking D entails deleting the link object and removing it from the link tree. However, the integrity of the relationships between the various trees then needs to be restored. To this end, first, the formerly linked nodes contain pointers to [D], which need to be reset to null. A link destructor (e.g., a function or object) of the comparison mechanism process $204_2$ may be run to perform this task.

Second, when D is either the first or last member of the group, groups that contain node D potentially contain pointers to D. Therefore, starting with the node's primary group and working up the tree, pointers will be adjusted as necessary to account for the change.

If the node's primary group has only one member after the node is unlinked, this group needs to be deleted. In this case, the process deletes G(y), and when deleted, modifies the remaining member node and the root node such that they no longer point to the deleted group. A group destructor (e.g., a function or object) of the comparison mechanism/process $204_1$ may be run to perform this task. In general, an unlink function may be by the called by the comparison mechanism $204_1$ to delete a link and carry out the above-described repairs.

Figure 37:
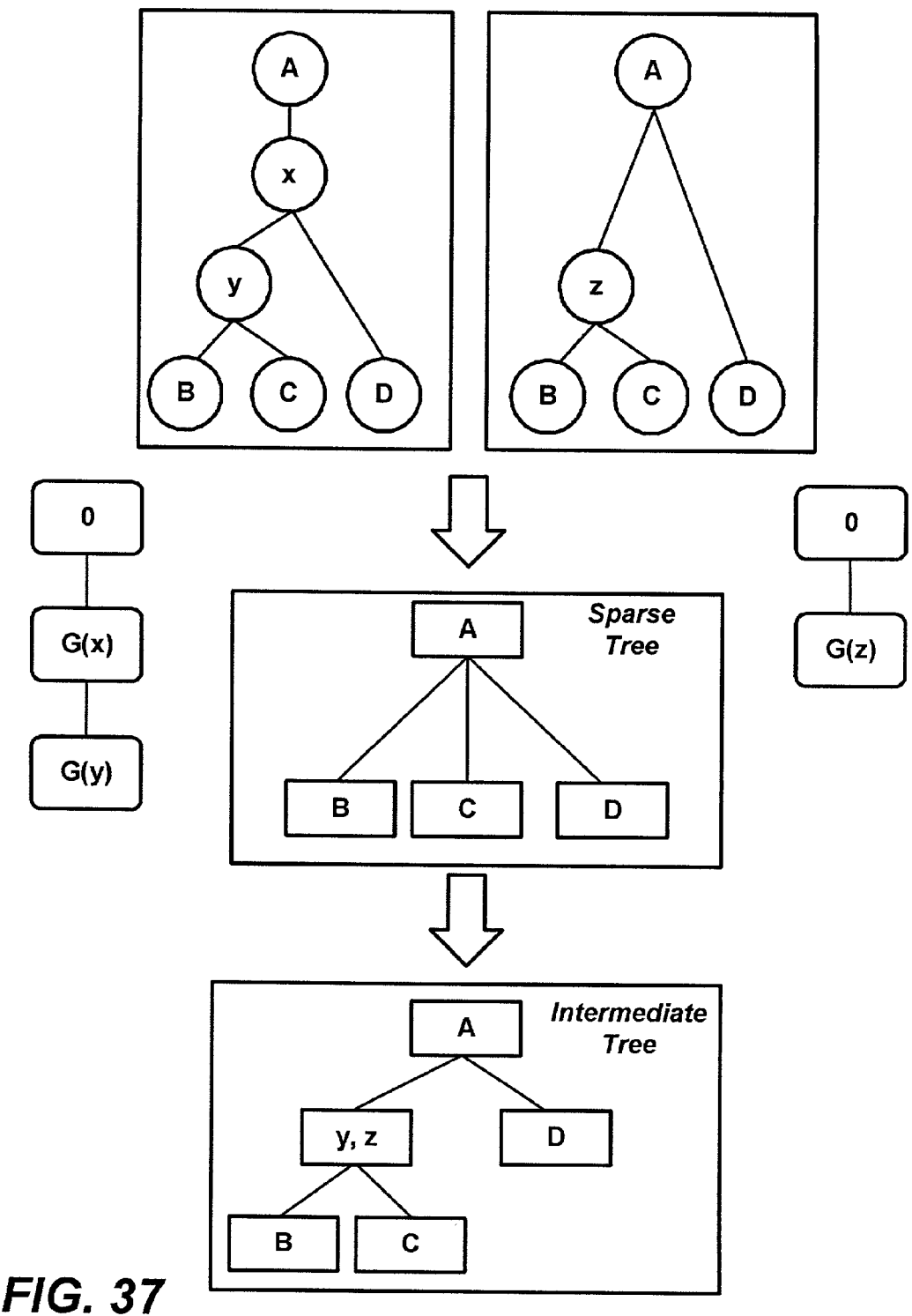
FIG. 37 is a diagram generally representing the linking of equal groups in accordance with an aspect of the present invention.

Turning to a consideration of linking equal groups, given a group in file 1, the comparison mechanism/process $204_1$ can find the equal group (if any) in file 2, as described with reference to FIG. 37. To this end, equal groups must have the same first and last members, and therefore a search may begin with the smallest group in file 2 that contain the first member of the given group, and continue through that group's ancestors. The search can stop when there are no more ancestors, when a match is found, or when the first member of the given group is not the first member of the current group.

If two groups are equal, and neither root is already linked, then the comparison mechanism/process $204_1$ links the roots to one another. A new link object is inserted into the link tree in place of links in the group, and the links in the group become children of the new link. Note that group rule 1 was previously defined only for a simple subtree, not a complete link tree, which would suggest a recursive approach. However, there is a problem in that the method for getting the group associated with a given node does not respect such boundaries. However, the entire link tree can be processed at once without breaking it into subtrees, because, for any two equal groups, the two groups are in the same subtree of the link tree. This is because they contain the same set of links.

After a new link object is inserted, group objects may need to be repaired. More particularly, any group objects that are supersets of the equal groups will need to be repaired. By way of example, FIG. 37 shows left and right trees wherein initially the first and last members of G(x) are [B] and [C], respectively. After linking the roots of y and z, the first member of G(x) should be [y,z]. A LinkGroup function may be called to link the roots of two groups (one of which may be null for a one-way link), and ensures that the changes described above are carried out as necessary.

As described above, by the time rule 2 is applied, the process has already applied rules 3, 4 and 1. Therefore, all groups for which the roots are not already linked are unions. After a union is linked, its root node is linked. Thus, whether a group's root node is linked serves as an indicator for which groups still need to be processed.

To link a particular union, the process enumerates the set of groups (including single-element groups) in which the union is equal to the given group. If any of those multi-element groups is not already linked, then the process applies the link union algorithm to it recursively before proceeding. In this manner, processing the unions in bottom-up order is ensured.

To find the subsets of a group, for each linked node in the group, the process finds the largest group in the opposite file that contains that node and is a subset of the given group. If no such group is found, the process treats the node as a single-element group.

Figure 38A:
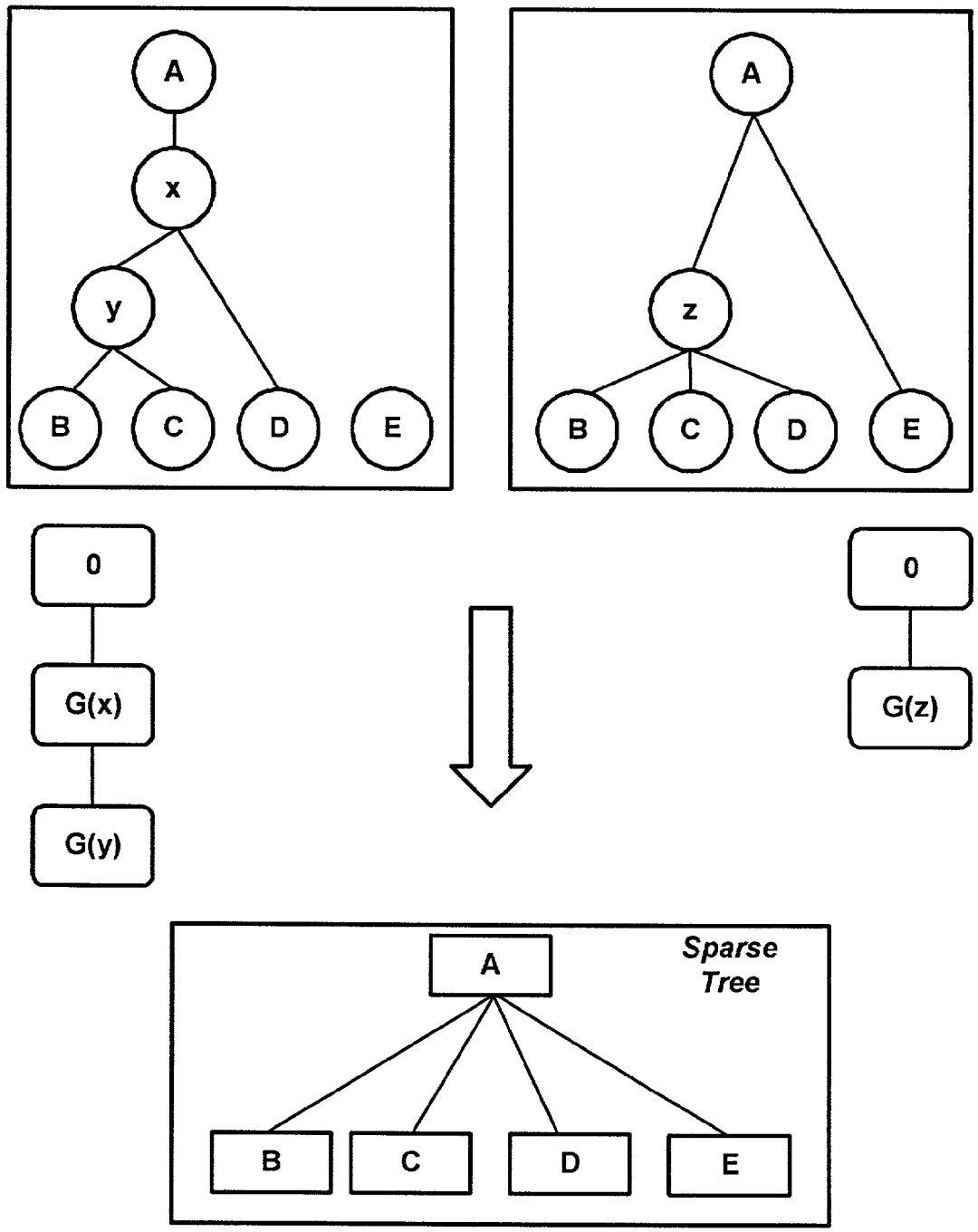
FIGS. 38A-38D are diagrams generally representing the linking of unions of groups in accordance with an aspect of the present invention.
Figure 38B:
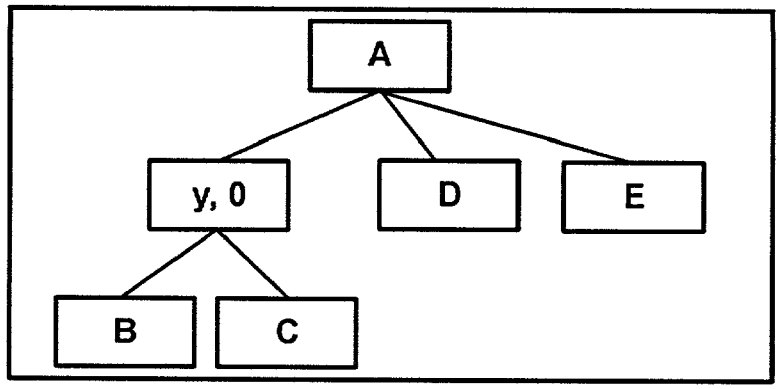
Figure 38C:
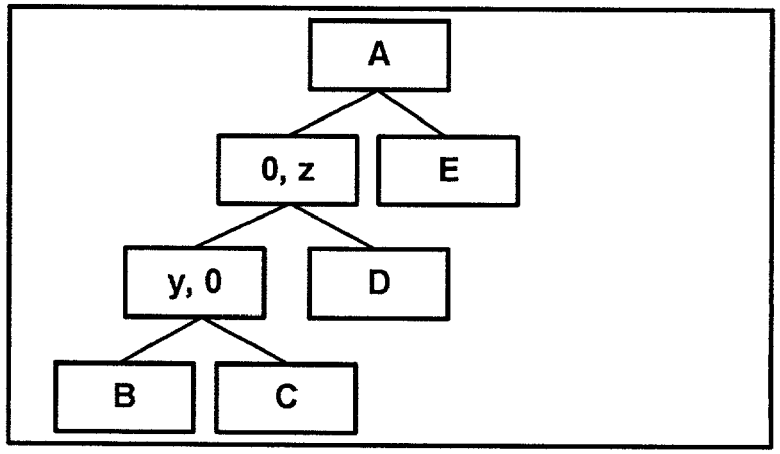
Figure 38D:
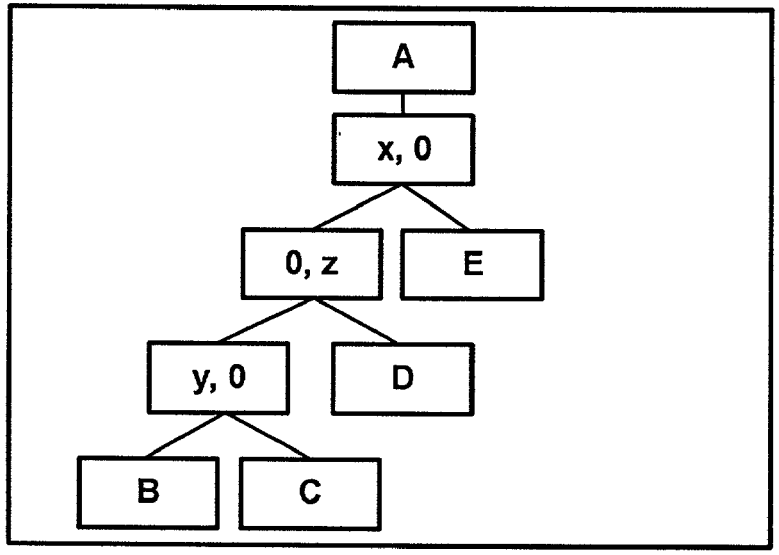

By way of example, consider the process linking G(x) in FIG. 38A. First, the process enumerates the subgroups, namely G(z) and E. The root of G(z) is not already linked, so the process recursively applies the algorithm to G(z). The process links G(z) by enumerating subgroups, thereby giving G(y) and D. The root of G(y) is not already linked, therefore the process applies the algorithm to it.

Figure 39A:
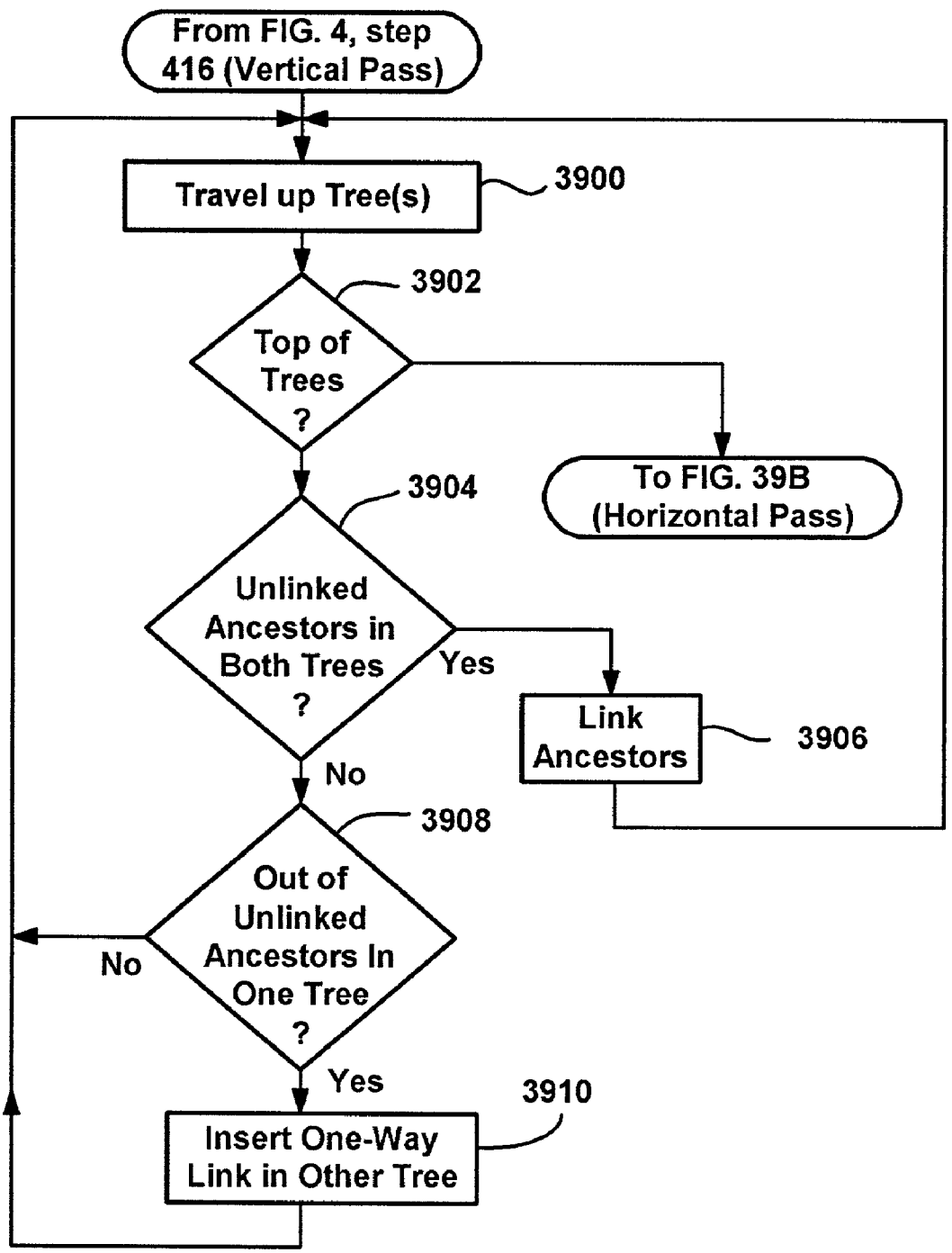

G(y) is linked by enumerating subgroups, which gives B and C. Both are already linked, therefore the process continues by creating a new one-way link for y. The process inserts the new link into the link tree in place of [B] and [C], making the latter children of the new link, as represented in FIG. 39A.

Returning to G(z), the process creates a new one-way link for z, and inserts it as the parent of [y,0] and [D] as represented in FIG. 39B. With respect to G(x), the process creates a new one-way link for x, and insert it as the parent of [0,z] and [E], as represented in FIG. 39C.

When the process recursively link a subgroup of the current group, a new link object replaces a range of links in the current group. For example, G(x) initially contains the links [B], [C], [D], and [E], but linking the subgroup G(z) replaces the first three links with [0,z].

Since a group is defined by a range of sibling link objects, inserting a new link can modify existing groups. Therefore, the new link should be inserted using the same LinkGroup function as was used for group rule 1, described above.

Returning to FIG. 4, step 416, and turning to an explanation of filling in gaps to construct a complete tree, as described above, application of the group rules provides an intermediate link tree that is between a sparse tree and a complete tree. The intermediate tree differs from the sparse tree in that it contains one-way links, and a link object exists for the root of every group.

Given a set of sibling Link objects, to fill in vertical gaps, the process travels up the tree from each XML node referenced by one of those links, in each case stopping just before reaching another linked XML node. As result is that the same XML node will not be visited twice, which is not the case with the sparse tree, where linked child nodes may have an unlinked common ancestor.

Such a tree traversal, described with reference to the flow diagram of FIG. 39A, provides a simple way of filling the vertical gaps in the tree, namely by inserting link objects on the way up each tree. To this end, if from any given starting point the process travels up both XML trees simultaneously (step 3900) until the top is reached (step 3902), unlinked ancestors detected at step 3904 can be linked to each other via step 3906. If there are no more unlinked ancestors in one tree, the process inserts one-way links for the remaining ancestors in the other tree.

Horizontal gaps are filled in a separate pass, represented in the flow diagram of FIG. 39B. To this end, the process visits each link node (step 3920, e.g., using recursion or the inorder traversal method provided by the tree class) to determine whether either referenced XML node has an adjacent unlinked sibling at step 3922. If so, the contiguous unlinked siblings are grouped under a single unlinked node (step 3924), giving at most one unlinked sibling before and after each node. Then, the previous unlinked siblings (if any) are linked to each other via step 3926, and the next unlinked siblings (if any) are linked to each other via step 3928. Step 3930 repeats the pass until the nodes have been visited.

Thus, as described above, the overall process of getting from a sparse tree to a complete tree is to apply the group rules, which results in an intermediate tree, and then fill in gaps to complete the link tree. Note that group rule 2 is applied last, otherwise the order in which the group rules are applied is flexible. One way in which the rules may be applied is to apply rule 1 recursively to every subtree, and when a subtree has no equal groups remaining, apply rules 3 and 4. Then, when a subtree has no intersecting groups remaining, apply rule 2 in bottom-up fashion. Note however, that rules 3 and 4 could be applied before rule 1, or even before linking ancestors. An implementation of rule 1 could even replace linking ancestors, e.g., group rule 1 could be modified to look for matching ancestors. That is, the process need not always link the roots of two equal groups, as each XML tree may have several nodes that are candidates for linking, including the root node of the group but also any of its ancestors that are neither linked nor the roots of other groups.

Once the link tree 208 is constructed, it is relatively straightforward to generate the output file 210 that describes differences between the two files in terms of tree operations. Many output formats are possible. For example, the one described herein is an XML file that matches the second input file, except as follows:

A. Contiguous content that is present only in the second file is treated as an insertion; it is included in the output file bracketed by <rev class="insert"> and </rev> tags.

B. Contiguous content that is present only in the first file is treated as a deletion; it is included in the output file bracketed by <rev class="delete"> and </rev> tags.

C. If an element is present only in the second file but at least some of its content (child elements and/or text) is present in both files, it is treated as a node insertion; it is included in the output file bracketed by <rev class="insNode"> and </rev> tags.

D. If an element is present only in the first file but at least some of its content is present in both files, it is treated as a node deletion; it is included in the output file bracketed by <rev class="delNode"> and </rev> tags.

E. If a tag or any of its attributes is modified, the new tag is included in the output file bracketed by <rev class="changeNode"> and </rev> tags. The old tag and its attributes are specified by the <rev> element's "old" attribute.

Figure 40:
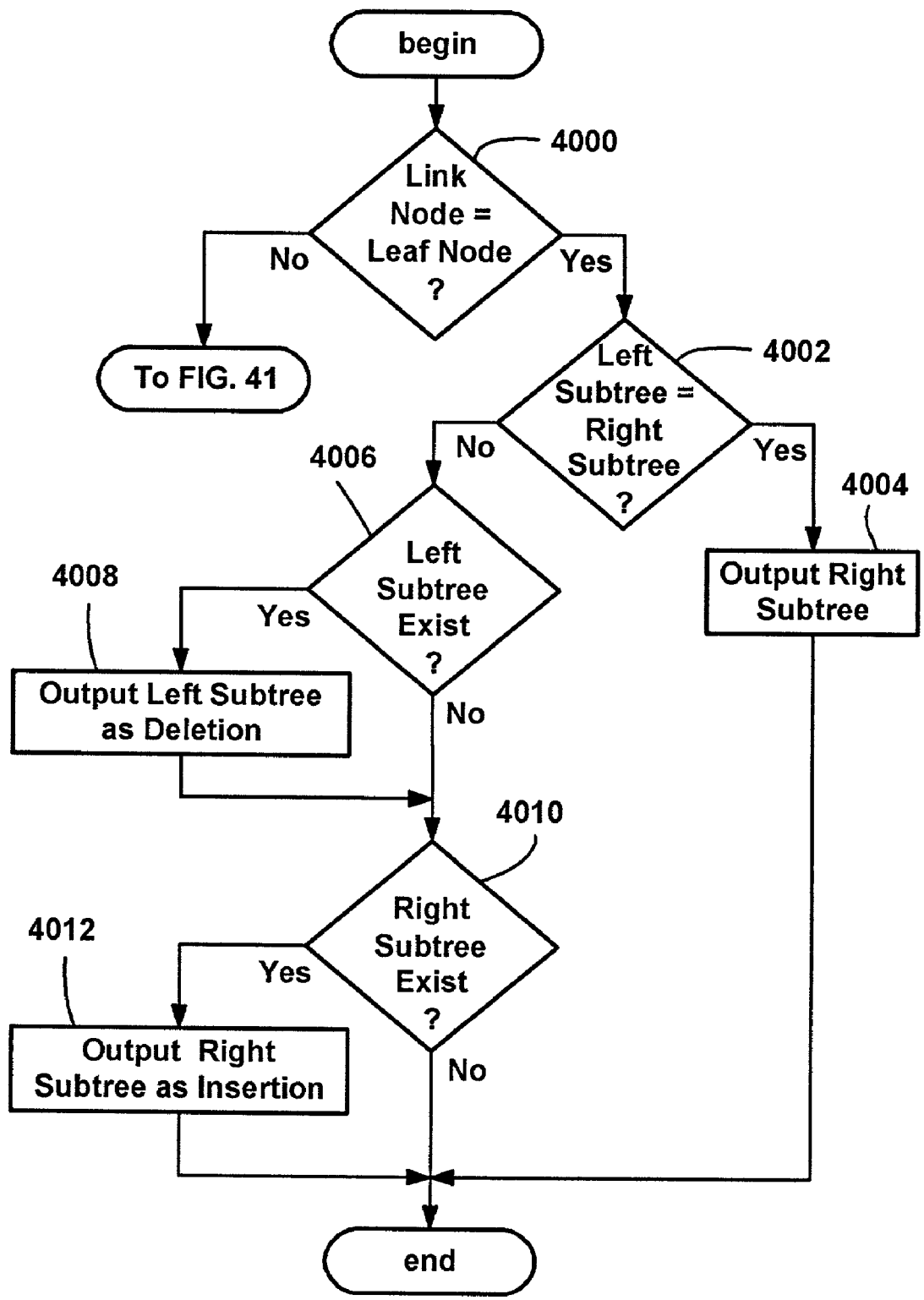
FIGS. 40-42 comprise a flow diagram representing the construction of an output file of tree operations from the link tree, in accordance with an aspect of the present invention.
Figure 41:
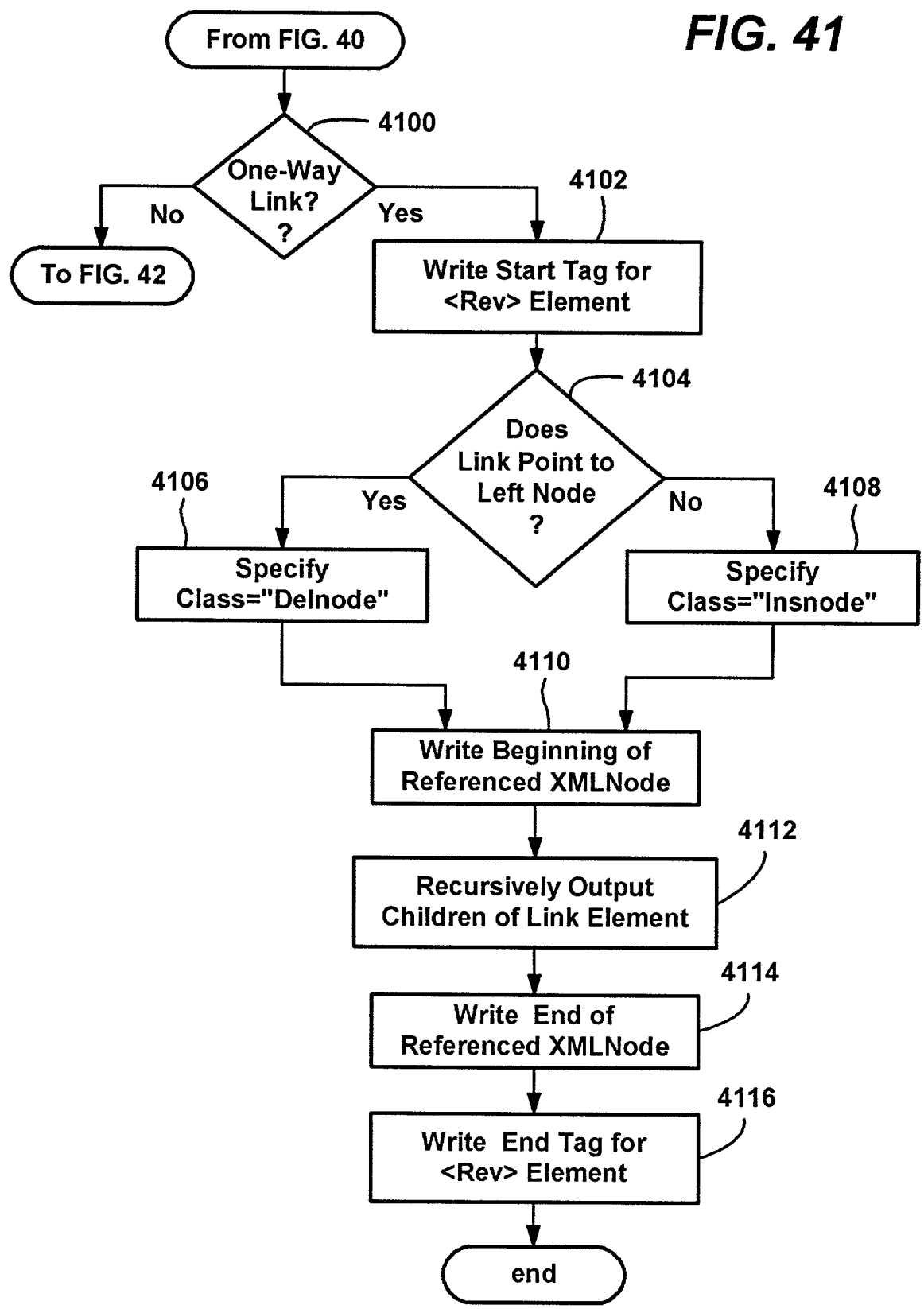
Figure 42:
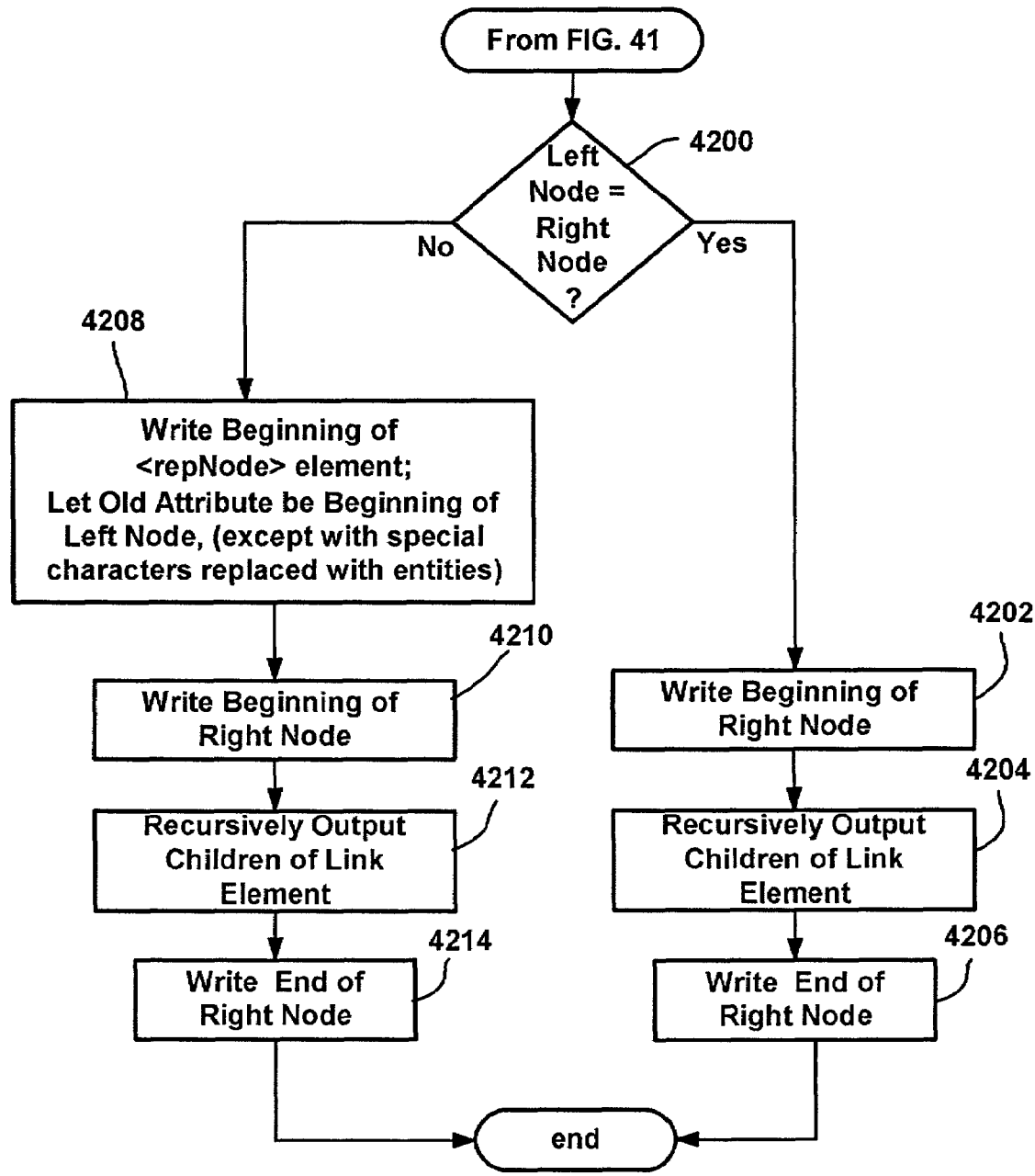

The comparison mechanism/process output phase 204₃ constructs such an output file 210 by recursively applying an algorithm to each link node, starting with the root of the link tree 208, as represented in the pseudocode and FIGS. 40-42:

```
If the Link node is a leaf node (FIG. 40, step 4000) {
    If the left and right subtrees specified by the link are equal
    (step 4002) {
        Output the right subtree (step 4004)
    }
    Otherwise, the subtrees are unequal {
        If there is a left subtree (step 4006), treat it as a
        deletion (step 4008); that is, output the subtree between
        the start and end tags of a <rev class="delete"> element.
        If there is a right subtree (step 4010), treat it as an
        insertion (step 4012); that is, output the subtree between
        the start and end tags of a <rev class="insert"> element.
    }
}
Otherwise, (FIG. 41) the Link node has children {
    If it is a one-way link (step 4100) {
        Write the start tag for the <rev> element (step 4102).
        Specify class="delNode" if the link points to a node in
        the left tree (steps 4104 and 4106), or with
        class="insNode" if the link points to a node in the right
        tree (steps 4104 and 4108).
        Write the beginning of the referenced XML node (step
        4110).
        Recursively output the children of the Link element (step
        4112).
        Write the end of the referenced XML node (step 4114).
        Write the end tag for the <rev> element (step 4116).
    }
    Otherwise it is a two-way link (FIG. 42) {
        If the left and right nodes are equal (step 4200){
            Write the beginning of the right node (step 4202).
            Recursively output the children of the Link element
            (step 4204).
            Write the end of the right node (step 4206).
        }
        Otherwise the left and right nodes are unequal {
            Write the beginning of a <rev class="repNode">
            element. Let the old attribute be the beginning of
            the left node, except with special characters
            replaced with entities (step 4208).
            Write the beginning of the right node (step 4210).
            Recursively output the children of the Link element
            (step 4212).
            Write the end of the right node (step 4214).
        }
    }
}
```

The following tables provide an example of a left XML file, a right XML file, and the resultant output file constructed in accordance with the present invention, respectively, where <p> represents a paragraph, <ul> represents an unordered list, and <ol> represents and ordered list:

Left XML file:

```
<doc>
    <p>One.</p>
    <p>Two.</p>
    <ul>
        <li>Three</li>
        <li>Four.</li>
        <li>Five.</li>
    </ul>
    <ol>
        <p>Six.</p>
        <p>Seven.</p>
    </ol>
    <p>Eight.</p>
</doc>
```

Right XML file:

```
<doc>
    <p>Two.</p>
    <li>Three</li>
    <li>Four.</li>
    <li>Five.</li>
    <ul>
        <p>Six.</p>
        <p>Seven.</p>
        <p>Seven point five.</p>
    </ul>
    <p/>Eight.</p>
    <p>Nine.</p>
</doc>
```

Output XML file:

```
<doc>
    <rev id="EE38B656-ACCA-4A38-A601-CC53B40DE2DB" class="remove">
        <p>One.</p>
    </ rev>
    <p>Two.</p>
    <rev id="EE38B657-ACCA-4A38-A601-CC53B40DE2DB" class="delNode">
        <ul>
            <li>Three</li>
            <li>Four.</li>
            <li>Five.</li>
        </ul>
    </rev>
    <rev id="EE38B658-ACCA-4A38-A601-CC53B40DE2DB" class="repNode" old="<ol>">
        <ul>
            <p>Six.</p>
            <p>Seven.</p>
            <rev id="EE38B659-ACCA-4A38-A601-CC53B40DE2DB" class="add">
                <p>Seven point five.</p>
```

-continued

Output XML file:

```
        </rev>
     </ul>
  </rev>
  <p>Eight.</p>
  <rev id="EE38B65A-ACCA-4A38-A601-CC53B40DE2DB" class="add">
     <p>Nine.</p>
  </rev>
</doc>
```

As is understood, the output (e.g., XML change) file is tree oriented, including tree-related operations, to match the hierarchical structure of structured input documents. As a result, it is possible to apply the change document's contents comprising tree operations to selectively roll back changes to an input file, while still maintaining a well-formed tree. For example, an application can provide users with the capability to interactively accept or reject changes that had previously been made to an XML file.

As can be seen from the foregoing detailed description, there is provided a method and system that output changes between hierarchically structured documents such as XML documents as a set of tree operations, arranged as a tree structure or the like. The method and system are efficient, flexible, extensible, and handle the many possible arrangements of trees and subtrees in a consistent manner, thereby providing a valuable comparison tool.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method, comprising:

accessing a first file of hierarchically structured data;

generating, from the first file, a first tree structure, the first tree structure having at least one first group of data that may be referenced as a group, the at least one first group being less than the whole first tree;

accessing a second file of hierarchically structured data;

generating, from the second file, a second tree structure, the second tree structure having at least second one group of data that may be referenced as a group, the at least one second group being less than the whole second tree;

recursively iterating over and comparing nodes in the first tree structure with nodes in the second tree structure to develop a third tree structure, the third tree structure being a sparse link tree based on a comparison of the first and second tree structures, the sparse link tree comprising link objects relating nodes and groups of the first tree structure to nodes and groups of the second tree structure which are equal as between the first tree structure and the second tree structure, and excluding link objects relating nodes and groups of the first tree structure to nodes and groups of the second tree structure which are not equal as between the first tree structure and the second tree structure, the sparse link tree having gaps therein for unlinked nodes and groups which are not equal as between the first tree structure and the second tree structure;

determining whether any links of the sparse link tree cross and, when links cross, removing at least one link object relating nodes or groups of the first tree structure to nodes and groups of the second tree structure so as to eliminating crossing of links in the sparse tree;

converting the sparse link tree into a fourth tree structure, the fourth tree structure being a complete link tree formed by filling the gaps of unlinked nodes within the sparse link tree, the complete link tree relating the first tree structure to the second tree structure;

linking the at least one group in the first tree to the at least one group in the second tree; and processing the complete link tree to output a set of at least one difference between the first file and the second file such that at least one difference is identified between the at least one first group and the at least one second group.

2. The method of claim 1 wherein developing a sparse link tree comprises, mapping equal subtrees in the first and second trees to each other.

3. The method of claim 1 wherein developing a sparse link tree comprises, detecting a subtree in the first tree that equals a subtree in the second tree, and inserting a link node into the sparse link tree, the link node referencing the subtree in each of the first and second trees.

4. The method of claim 3 wherein determining if any links of the sparse tree cross further comprises determining whether the link node references to the first tree are in the same order as the link node references to the second tree, and if not, removing at least one link object from the sparse link tree.

5. The method of claim 1 wherein linking groups includes, detecting whether a group in one tree equals a group in the other tree, and if so, linking the roots of the groups.

6. The method of claim 1 wherein linking the at least one group in the first tree to the at least one group in the second tree comprises, inserting a link node into the sparse link tree.

7. The method of claim 1 wherein linking groups includes, determining whether a group in one tree structure is the union of two or more groups in the other tree structure, and if so, modifying the complete link tree, including:

creating a link object for the root of a larger group;

creating link objects for the roots of smaller groups; and adjusting pointers in the complete link tree such that the link objects for the smaller groups are children of the link object for the larger group.

8. The method of claim 1 wherein linking groups includes, determining whether a group in one tree structure is the union of two or more groups in the other tree structure, and if so, inserting one-way links into the complete link tree for the root of a group that occurs in one tree structure but not the other.

9. The method of claim 1 wherein removing at least one link object comprises unlinking at least one node in each of the first and second tree structures to eliminate the intersection.

10. The method of claim 9 wherein unlinking at least one node comprises, unlinking nodes that are in both the first and second tree structures.

11. The method of claim 9 wherein unlinking at least one node comprises, unlinking nodes that are only in one of the first and second tree structures.

12. The method of claim 9 wherein unlinking at least one node comprises, determining a first value corresponding to unlinking nodes that are in both the first and second tree structures, determining a second value corresponding to unlinking nodes that are in one of the first and second tree structures, determining a third value corresponding to unlinking nodes that are in the other of the first and second tree structures, and unlinking the nodes that correspond to the lowest of the first, second or third values.

13. The method of claim 9 wherein determining if any links of the sparse link tree cross includes, determining whether two or more intersections are related, finding a least-cost set of nodes that can be unlinked to eliminate the related intersections, and unlinking the nodes of that set.

14. The method of claim 13 wherein finding the least-cost set of nodes comprises constructing a Boolean expression for each intersection, and finding the least-cost set of nodes for which the expression is true.

15. The method of claim 1 wherein filling gaps in the sparse link tree comprises traversing the first and second tree to detect unlinked ancestor nodes, and linking unlinked ancestor nodes.

16. The method of claim 1 wherein filling gaps in the sparse link tree comprises, traversing the first and second tree to detect adjacent unlinked sibling nodes, and grouping unlinked siblings under a single unlinked node.

17. The method of claim 1 wherein processing the complete link tree comprises, outputting a set of tree instructions.

18. The method of claim 1 wherein processing the complete link tree comprises, outputting an insert instruction for content that corresponds to a node present in the second tree structure but not present in the first tree structure.

19. The method of claim 1 wherein processing the complete link tree comprises, outputting a delete instruction for content that corresponds to a node present in the first tree structure but not present in the second tree structure.

20. The method of claim 1, wherein generating, from the first file, a first tree structure comprises placing each element of the first file in the first tree structure, and wherein generating, from the second file, a second tree structure, comprises placing each element of the second file in the second tree structure.

21. The method of claim 1, further comprising:
computing a hash of each node in said first tree structure and said second tree structure;
using the hash of any leaf node in computing a hash for its parent node, such that each subtree has a hash value computed that depends on its child nodes; and
comparing hash values of subtrees of said first tree structure to said second tree structure, wherein if a hash value of a subtree in said first tree structure matches a hash value of a subtree in said second tree structure, said subtree is added to the sparse link tree, wherein if a hash value of a subtree in said first tree structure does not match a hash value of a subtree in said second tree structure, said subtree is not added to said sparse link tree.

22. A computer-readable storage medium having computer-executable instructions for performing a method, comprising:
accessing a first file of hierarchically structured data to provide a first tree structure therefrom;
accessing a second file of hierarchically structured data to provide a second tree structure therefrom;
recursively iterating over and comparing nodes in the first tree structure with nodes in the second tree structure to develop a third tree structure based on a comparison of the first and second tree structures, the third tree structure being a sparse link tree comprising link objects relating nodes and groups of the first tree structure to nodes and groups of the second tree structure which are equal as between the first tree structure and the second tree structure, and excluding link tree objects relating nodes and groups of the first tree structure to nodes and groups of the second tree structure which are not equal as between the first tree structure and the second tree structure, the sparse link tree having gaps therein for unlinked nodes and groups which are not equal as between the first tree structure and the second tree structure;
determining whether any links of the sparse link tree cross and, when links cross, removing at least one link object relating nodes or groups of the first tree structure to nodes and groups of the second tree structure so as to eliminating crossing of links in the sparse tree;
converting the sparse link tree into a fourth tree structure, the fourth tree structure being a complete link tree formed by filling the gaps of unlinked nodes within the sparse link tree, the complete link tree relating the first tree structure to the second tree structure;
linking at least one group in the first tree structure to at least one group in the second tree structure, wherein the at least one first group in the first tree is less than the first file and the at least one group in the second tree is less than the second file; and
processing the complete link tree to output a set of at least one difference between the first file and the second file such that at least one difference is identified between the at least one first group and the at least one second group.

23. The computer-readable storage medium of claim 22 wherein developing a sparse link tree comprises, mapping equal subtrees in the first and second trees to each other.

24. The computer-readable storage medium of claim 22 wherein developing a sparse link tree comprises, detecting a subtree in the first tree that equals a subtree in the second tree, and inserting a link node into the sparse link tree, the link node referencing the subtree in each of the first and second trees.

25. The computer-readable storage medium of claim 24 having further computer-executable instructions comprising, determining whether the link node references to the first tree are in the same order as the link node references to the second tree, and if not, removing at least one link node from the link tree.

26. The computer-readable storage medium of claim 22 wherein linking groups includes, detecting whether a group in one tree equals a group in the other tree, and if so, linking the roots of the groups.

27. The computer-readable storage medium of claim 22 wherein linking at least one group in the first tree structure to at least one group in the second tree structure comprises, inserting a link node into the sparse link tree.

28. The computer-readable storage medium of claim 22 wherein linking groups includes, determining whether a group in one tree structure is the union of two or more groups in the other tree structure, and if so, modifying the complete link tree, including:
- creating a link object for the root of a larger group;
- creating link objects for the roots of smaller groups; and
- adjusting pointers in the complete link tree such that the link objects for the smaller groups are children of the link object for the larger group.

29. The computer-readable storage medium of claim 22 wherein linking groups includes, determining whether a group in one tree structure is the union of two or more groups in the other tree structure, and if so, inserting one-way links into the complete link tree for the root of a group that occurs in one tree structure but not the other.

30. The computer-readable storage medium of claim 22 wherein removing at least one link object comprises unlinking at least one node in each of the first and second tree structures to eliminate the intersection.

31. The computer-readable storage medium of claim 30 wherein unlinking at least one node comprises, unlinking nodes that are in both the first and second tree structures.

32. The computer-readable storage medium of claim 30 wherein unlinking at least one node comprises, unlinking nodes that are only in one of the first and second tree structures.

33. The computer-readable storage medium of claim 30 wherein unlinking at least one node comprises, determining a first value corresponding to unlinking nodes that are in both the first and second tree structures, determining a second value corresponding to unlinking nodes that are in one of the first and second tree structures, determining a third value corresponding to unlinking nodes that are in the other of the first and second tree structures, and unlinking the nodes that correspond to the lowest of the first, second or third values.

34. The computer-readable storage medium of claim 30 wherein determining if any links of the sparse link tree cross includes, determining whether two or more intersections are related, finding a least-cost set of nodes that can be unlinked to eliminate the related intersections, and unlinking the nodes of that set.

35. The computer-readable storage medium of claim 34 wherein finding the least-cost set of nodes comprises constructing a Boolean expression for each intersection, and finding the least-cost set of nodes for which the expression is true.

36. The computer-readable storage medium of claim 22 wherein filling gaps in the sparse link tree comprises traversing the first and second tree to detect unlinked ancestor nodes, and linking unlinked ancestor nodes.

37. The computer-readable storage medium of claim 22 wherein filling gaps in the sparse link tree comprises, traversing the first and second tree to detect adjacent unlinked sibling nodes, and grouping unlinked siblings under a single unlinked node.

38. The computer-readable storage medium of claim 22 wherein processing the complete link tree comprises, outputting a set of tree instructions.

39. The computer-readable storage medium of claim 22 wherein processing the complete link tree comprises, outputting an insert instruction for content that corresponds to a node present in the second tree structure but not present in the first tree structure.

40. The computer-readable storage medium of claim 22 wherein processing the complete link tree comprises, outputting a delete instruction for content that corresponds to a node present in the first tree structure but not present in the second tree structure.

41. A computer-implemented method for comparing hierarchically-structured documents, comprising:
- accessing a first file of hierarchically structure data;
- generating, from the first file, a first tree structure, the first tree structure having at least one first group of data that may be referenced as a group, the at least one first group being less than the whole first tree;
- accessing a second file of hierarchically structure data;
- generating, from the second file, a second tree structure, the second tree structure having at least one second group of data that may be referenced as a group, the at least one second group being less than the whole second tree;
- recursively iterating over and comparing nodes in the first tree structure with nodes in the second tree structure to develop a third tree structure, the third tree structure being a sparse link tree based on a comparison of the first and second tree structures, the sparse link tree comprising link objects specifically pointing to nodes and groups of the first tree structure and to nodes and groups of the second tree structure, and pointing to only those nodes and groups which are equal as between the first tree structure and the second tree structure, and excluding link objects with pointers to nodes and groups of the first tree structure to nodes and groups of the second tree structure, the sparse link tree having gaps therein for unlinked nodes and groups which are not equal as between the first tree structure and the second tree structure;
- determining whether the links objects related to the equal nodes and groups of the first and second tree structures are in the same order as the nodes and groups of both the first and second tree structures, and when they are not, determining that the link objects have crossing links;
- after determining the link objects have crossing links, determining which of the crossing links to remove, wherein determining which of the crossing links to remove comprises determining that one of a pair of link nodes needs to be unlinked and, for each of the pair of link nodes, summing values of subtree members that must also be unlinked if the respective link node is unlinked;
- unlinking the link node of the pair of link nodes which has the lowest summed value;
- repeating the steps of determining that one of a pair of link nodes needs to be unlinked and unlinking the link node until no pairs remain to be checked for crossing links;
- converting the sparse link tree into a fourth tree structure, the fourth tree structure being a complete link tree formed by filling the gaps of unlinked nodes within the sparse link tree, the complete link tree relating the first tree structure to the second tree structure;
- linking the at least one group in the first tree to the at least one group in the second tree; and
- processing the complete link tree to output a set of at least one difference between the first file and the second file such that at least one difference is identified between the at least one first group and the at least one second group.

* * * * *